United States Patent
Walz

(10) Patent No.: US 9,504,260 B2
(45) Date of Patent: Nov. 29, 2016

(54) MULTI-STAGE ROTARY FOOD PRODUCT FOLDER

(71) Applicant: Solbern, Inc., Fairfield, NJ (US)

(72) Inventor: John C. Walz, South Dennis, MA (US)

(73) Assignee: Solbern, Inc., Fairfield, NJ (US)

(*) Notice: Subject to any disclaimer, the term of this patent is extended or adjusted under 35 U.S.C. 154(b) by 735 days.

(21) Appl. No.: 14/029,512

(22) Filed: Sep. 17, 2013

(65) Prior Publication Data
US 2015/0075390 A1    Mar. 19, 2015

(51) Int. Cl.
*A21C 15/00*    (2006.01)
*A21C 9/06*    (2006.01)

(52) U.S. Cl.
CPC ............ *A21C 15/007* (2013.01); *A21C 9/063* (2013.01); *A21C 15/00* (2013.01)

(58) Field of Classification Search
CPC ..... A21C 15/007; A21C 9/063; A21C 15/00
USPC ....................................................... 99/450.6
See application file for complete search history.

(56) References Cited

U.S. PATENT DOCUMENTS

| | | | |
|---|---|---|---|
| 1,891,845 A | 12/1932 | Spitz et al. | |
| 2,107,749 A | 2/1938 | Curtis | |
| 2,574,548 A | 11/1951 | Deutsch | |
| 2,855,867 A | 10/1958 | Zeitlin | |
| 2,256,044 A | 12/1967 | Keathley et al. | |
| 3,669,007 A * | 6/1972 | Pulici | A23G 3/2023 425/110 |
| 3,745,911 A | 7/1973 | Kennedy, Jr. et al. | |
| 3,782,271 A * | 1/1974 | Tobey | A21C 9/066 425/121 |
| 3,912,433 A * | 10/1975 | Ma | A21C 9/04 425/126.1 |
| 3,920,440 A | 11/1975 | Takaoka et al. | |
| 4,084,493 A * | 4/1978 | Quintana | A21C 9/063 426/297 |
| 4,193,373 A | 3/1980 | Hanson, Jr. et al. | |
| 4,388,059 A * | 6/1983 | Ma | A21C 9/063 425/112 |
| 4,393,758 A | 7/1983 | Anmahian | |
| 4,457,225 A | 7/1984 | Bakker | |
| 4,483,242 A | 11/1984 | Goodman et al. | |
| 4,516,487 A | 5/1985 | Madison et al. | |
| 4,608,919 A * | 9/1986 | Prows | A21C 9/063 99/450.2 |
| 4,638,729 A * | 1/1987 | Woodworth | A21C 9/063 99/450.2 |
| 4,691,627 A | 9/1987 | Roberts | |
| 4,913,043 A * | 4/1990 | Cheung | A21C 9/063 425/110 |

(Continued)

FOREIGN PATENT DOCUMENTS

GB    1913/16569 A    0/1914

OTHER PUBLICATIONS

International Search Report mailed on Feb. 18, 2015, issued in connection with International Application No. PCT/US14/55310 (4 pages).

(Continued)

*Primary Examiner* — Sean Michalski
(74) *Attorney, Agent, or Firm* — McCarter & English, LLP

(57) ABSTRACT

Exemplary embodiments are directed to a multi-stage rotary food product folder apparatus for forming a folded food product, generally including a drive system, a cam system and a platform system. The drive system includes at least one motor and a shaft. Rotation of at least one cam of the cam system can be driven by the shaft of the drive system. The platform assembly can be secured to a platform. The platform can be rotatably driven by the drive system. The cam system engages the platform assembly to fold the folded food product.

29 Claims, 43 Drawing Sheets

(56) References Cited

U.S. PATENT DOCUMENTS

| | | | |
|---|---|---|---|
| 4,938,981 A | 7/1990 | Hee | |
| 4,961,948 A | 10/1990 | Hee | |
| 5,085,138 A | 2/1992 | Fehr et al. | |
| 5,190,780 A * | 3/1993 | Fehr | A21C 9/063 426/283 |
| 5,263,407 A | 11/1993 | Pomara, Jr. | |
| 5,289,761 A * | 3/1994 | Spierts | A21C 9/063 99/450.2 |
| 5,405,256 A | 4/1995 | Dalton | |
| 5,912,035 A * | 6/1999 | Grat | A21C 9/063 426/138 |
| 7,487,718 B2 | 2/2009 | Foulon, Jr. et al. | |
| 8,291,815 B2 * | 10/2012 | Lin | A21O 5/006 99/450.6 |
| 2006/0078838 A1 * | 4/2006 | McLemore | A21C 15/00 431/253 |
| 2006/0107846 A1 | 5/2006 | Foulon, Jr. et al. | |
| 2006/0144254 A1 * | 7/2006 | Foulon | A23P 20/20 99/450.4 |
| 2012/0152130 A1 * | 6/2012 | Robert | A21C 9/063 99/450.7 |
| 2015/0128817 A1 * | 5/2015 | Berger | A21C 15/007 99/450.6 |

OTHER PUBLICATIONS

Written Opinion of the International Searching Authority mailed on Feb. 18, 2015, issued in connection with International Application No. PCT/US14/55310 (5 pages).

International Search Report mailed on Feb. 11, 2015, issued in connection with International Application No. PCT/US2014/064633 (2 pages).

Written Opinion of the International Searching Authority mailed on Feb. 11, 2015, issued in connection with International Application No. PCT/US2014/064633 (7 pages).

U.S. Appl. No. 14/536,131, filed Nov. 7, 2014, Food Folding Platform and Components Therefor (66 pages).

PCT International Patent Application No. PCT/US2014/064633 filed Nov. 7, 2014, Food Folding Platform and Components Therefor (65 pages).

PCT International Patent Application No. PCT/US14/55310 filed Sep. 12, 2014, Multi-Stage Rotary Food Product Folder (94 pages).

* cited by examiner

MULTI-STAGE ROTARY FOOD PRODUCT FOLDER

TECHNICAL FIELD

The present disclosure relates to a multi-stage rotary food product folder apparatus and, in particular, to a multi-stage rotary food product folder apparatus including platform assemblies actuated via a cam system and/or other similar actuation systems.

BACKGROUND

A variety of methods of folding food products, such as burritos, are known in the industry. For example, manual folding operations can be used. Manual folding operations can be labor intensive and involve a high degree of dexterity. The time undertaken by an operator to fill and fold, e.g., a tortilla, to produce a folded food product also limits the production rate where the folding operations are carried out by hand.

High speed food product folding machines are also known in the industry, such as those of U.S. Pat. No. 5,912,035 (the "'035 patent") and U.S. Pat. No. 7,487,718 (the "'718 patent").

FIGS. 1 and 2 show an example food product folding machine 10 (hereinafter "machine 10") known in the industry. The machine 10 can include a plurality of platform assemblies 12 for folding the food product (not shown) which travels along a conveyor system 14. The machine 10 includes curved rods 16 extending along the production path and the platform assemblies 12 include followers 18 which travel along the curved rods 16. As the platform assemblies 12 travel along the conveyor system 14, the curved rods 16 actuate the followers 18 such that the movable sections of the platform assemblies 12 can be actuated to create folds of the food product. The machine 10 can include a food filling dispenser 20 for dispensing food filling onto, e.g., a tortilla. The machine 10 can further include a liquid dispenser 22, e.g., a water dispenser, including a solenoid and a nozzle to spray the tortilla after predetermined folds of the tortilla to maintain the folded position of the tortilla.

However, the machine 10 may take up space for installation and utilization and has a large food product production capacity. Also, a machine of the '035 Patent includes a plurality of curved rods 16 which extend the length of the production path for folding of the product.

Thus, despite efforts to date, a need remains for a food product folder with a smaller installation and operation footprint and/or a reduced food product production capacity. These and other considerations are addressed by embodiments of the multi-stage rotary food product folder of the present disclosure.

SUMMARY

In accordance with embodiments of the present disclosure, an exemplary multi-stage rotary food product folder apparatus is provided that generally includes a platform with six self-contained platform assembly stations thereon. A first station can be used to load, e.g., a tortilla, on the platform assembly. The platform can then rotate the platform assembly to the second station, where a food filling can be dispensed onto the tortilla. The platform can then rotate the platform assembly to the third station, where a first fold of the tortilla can be created by a flap of the platform assembly. Optionally, a first hard press can be utilized to assist in imparting a force on the flap of the platform assembly to create the first fold of the tortilla. For example, the flap can fold over the tortilla with a top surface and the hard press can impart the force on the opposing and bottom surface of the flap. The platform can then rotate the platform assembly to the fourth station, where a second fold of the tortilla can be created by a flap of the platform assembly. Optionally, a second hard press can be utilized to assist in imparting a force on the flap of the platform assembly to create the second fold of the tortilla. The platform can then rotate the platform assembly to the fifth station, where a third fold of the tortilla can be created by a flap of the platform assembly. Optionally, a third hard press can be utilized to assist in imparting a force on the flap of the platform assembly to create the third fold of the tortilla. The platform can then rotate the platform assembly to a sixth station, where the thrice-folded tortilla can be lifted and ejected onto, e.g., a conveyor belt assembly. The conveyor belt assembly can include two pairs of folding jaws, e.g., a seventh and eighth station, respectively, for creating the fourth and fifth folds of the tortilla. The folded food product can then be transported by the conveyor belt assembly to the ninth station for ejection from the apparatus for, e.g., packaging, and the like.

In accordance with embodiments of the present disclosure, an exemplary food product folding apparatus for forming a folded food product is provided that generally includes a drive system, a cam system and a platform assembly. The drive system includes at least one motor and a shaft. At least one cam of the cam system can be driven by the shaft of the drive system. The platform assembly can be secured to a platform. The platform can be rotatably driven by the drive system. For example, the platform can be indexed by approximately sixty degrees to angularly rotate. The cam system engages the platform assembly to fold the folded food product.

The drive system can include an indexing drive to regulate rotation of the platform. In some embodiments, the cam system includes a first cam, a second cam, a third cam and a fourth cam in a stacked configuration. The first cam, the second cam, the third cam and the fourth cam can define an asymmetrical and disc-shaped configuration. The fourth cam of the cam system rotates with the shaft of the drive system. The first cam, the second cam and the third cam can be fixedly secured relative to the rotatable platform assembly and the rotatable platform. The platform assembly can include a first actuating mechanism, a second actuating mechanism, a third actuating mechanism, and a fourth actuating mechanism. The first actuating mechanism engages the first cam to position a first flap of the platform assembly into a first fold position to form a first fold of the folded food product. The second actuating mechanism engages the second cam to position a second flap of the platform assembly into a second fold position to form a second fold of the folded food product. The third actuating mechanism engages the third cam to position a third flap of the platform assembly into a third fold position to form a third fold of the folded food product. The fourth actuating mechanism engages the fourth cam to position a lift arm of the platform assembly into an extended position to eject the folded food product onto a conveyor belt assembly.

In some embodiments, the conveyor belt assembly includes a first pair of folding jaws and a second pair of folding jaws. The first pair of folding jaws can rotate the folded food product to form a fourth fold of the folded food product. The second pair of folding jaws can rotate the folded food product to form a fifth fold of the folded food product.

In some embodiments, the apparatus includes one or more hard presses, each hard press including a hard press roller and a spring. The spring provides a bias force of the hard press roller against at least one flap of the platform assembly to form folds of the folded food product. For example, the spring of a first hard press can provide a bias force of the hard press roller against a first flap of the platform assembly to form a first fold of the folded food product. As a further example, the spring of a second hard press can provide a bias force of the hard press roller against a second flap of the platform assembly to form a second fold of the folded food product. As a further example, the spring of a third hard press can provide a bias force of the hard press roller against a third flap of the platform assembly to form a third fold of the folded food product.

In some embodiments, the apparatus includes an attachment mechanism, e.g., a quick-release locking mechanism, secured to the platform configured and dimensioned to receive the platform assembly to secure the platform assembly to the platform.

In some embodiments, the cam system includes an actuator. The actuator can include a slide rod translatable through a slide track. The slide rod can include a roller secured thereon for actuation by a fourth cam of the cam system. Actuation of the roller by the fourth cam of the cam system can translate the slide rod through the slide track to actuate a fourth actuating mechanism of the platform assembly with an actuating tip of the slide rod.

In accordance with embodiments of the present disclosure, an exemplary method of forming a folded food product is provided that generally includes providing a food product folding apparatus. The food product folding apparatus includes a drive system, a cam system and a platform assembly. The drive system includes at least one motor and a shaft. The platform can be secured to a platform. The method includes rotating at least one cam of the cam system with the shaft of the drive system. The method includes rotatably driving the platform with the drive system. The method further includes actuating the platform assembly with the cam system to fold the folded food product.

In some embodiments, the method includes engaging a first actuating mechanism of the platform assembly with a first cam of the cam system to position a first flap of the platform assembly into a first fold position to form a first fold of the folded food product. In some embodiments, the method includes engaging a second actuating mechanism of the platform assembly with a second cam of the cam system to position a second flap of the platform assembly into a second fold position to form a second fold of the folded food product. In some embodiments, the method includes engaging a third actuating mechanism of the platform assembly with a third cam of the cam system to position a third flap of the platform assembly into a third fold position to form a third fold of the folded food product. In some embodiments, the method includes engaging a fourth actuating mechanism of the platform assembly with a fourth cam of the cam system to position a lift arm of the platform assembly into an extended position to eject the folded food product onto a conveyor belt assembly.

In some embodiments, the method includes rotating the folded food product with a first pair of folding jaws of the conveyor belt assembly to form a fourth fold of the folded food product. In some embodiments, the method includes rotating the folded food product with a second pair of folding jaws of the conveyor belt assembly to form a fifth fold of the folded food product. In some embodiments, the method includes providing a force with a hard press roller of at least one hard press onto a flap of the platform assembly to form folds of the folded food product. For example, the method includes providing a force with a hard press roller of a first hard press onto a first flap of the platform assembly to form a first fold of the folded food product. As a further example, the method includes providing a force with a hard press roller of a second hard press onto a second flap of the platform assembly to form a second fold of the folded food product. As a further example, the method includes providing a force with a hard press roller of a third hard press onto a third flap of the platform assembly to form a third fold of the folded food product.

In accordance with embodiments of the present disclosure, an exemplary platform assembly for forming a folded food product is provided that generally includes a top surface, a first flap, a second flap, a third flap and a lift arm. The first flap can be hingedly connected to the top surface. The second flap can be hingedly connected to the top surface. The third flap can be hingedly connected to the top surface. The lift arm can be hingedly connected to the top surface. The platform assembly includes a first actuating mechanism for positioning the first flap into a first fold position. The platform assembly includes a second actuating mechanism for positioning the second flap into a second fold position. The platform assembly includes a third actuating mechanism for positioning the third flap into a third fold position. The platform assembly includes a fourth actuating mechanism for positioning the lift arm into an extended position.

The first actuating mechanism, the second actuating mechanism, the third actuating mechanism and the fourth actuating mechanism can be configured to be engaged by a cam system. In some embodiments, the first actuating mechanism, the second actuating mechanism, the third actuating mechanism and the fourth actuating mechanism can include a roller, a plurality of linkages, and a rack and pinion mechanism. In some embodiments, the fourth actuating mechanism includes a slide rod and a slide track configured and dimensioned to mechanically interact with an actuator of the cam system to position the lift arm into the extended position. The lift arm can include a solid section and a pair of forks protruding from the solid section.

In accordance with embodiments of the present disclosure, an exemplary method of forming a folded food product is provided that generally includes providing a platform assembly. The platform assembly includes a top surface, a first flap, a second flap, a third flap and a lift arm. The first flap can be hingedly connected to the top surface. The second flap can be hingedly connected to the top surface. The third flap can be hingedly connected to the top surface. The lift arm can be hingedly connected to the top surface. The method can include engaging a first actuating mechanism with at least one cam of a cam system for positioning the first flap into a first fold position. The method can include engaging a second actuating mechanism with the at least one cam of the cam system for positioning the second flap into a second fold position. The method can include engaging a third actuating mechanism with the at least one cam of the cam system for positioning the third flap into a third fold position. The method can include engaging a fourth actuating mechanism with the at least one cam of the cam system for positioning the lift arm into an extended position. The method can include actuating the first actuating mechanism, the second actuating mechanism, the third actuating mechanism and the fourth actuating mechanism with a cam system.

In accordance with embodiments of the present disclosure, an exemplary cam system for actuating a platform assembly for forming a folded food product is provided. The platform assembly includes a first actuating mechanism, a second actuating mechanism, a third actuating mechanism and a fourth actuating mechanism. The cam system includes a first cam, a second cam, a third cam and a fourth cam. The actuator can be secured to at least one of the first cam, the second cam, and the third cam. The first cam, the second cam and the third cam can be fixedly secured relative to each other. The fourth cam can rotate relative to the first cam, the second cam and the third cam. The first cam can be configured to engage the first actuating mechanism of the platform assembly. The second cam can be configured to engage the second actuating mechanism of the platform assembly. The third cam can be configured to engage the third actuating mechanism of the platform assembly. The fourth cam can be configured to engage the fourth actuating mechanism of the platform assembly.

In some embodiments, the first cam, the second cam, the third cam, and the fourth cam can be disposed in a stacked configuration. In some embodiments, the first cam, the second cam, the third cam, and the fourth cam can define a disc-shaped configuration. In some embodiments, the first cam, the second cam, the third cam and the fourth cam can define an asymmetrical configuration. In some embodiments, the actuator can include a slide rod translatable through a slide track. The slide rod can include a roller secured thereon for engagement by the fourth cam of the cam system. Engagement of the roller by the fourth cam of the cam system can translate the slide rod through the slide track to actuate a fourth actuating mechanism of the platform assembly with an actuating tip of the slide rod.

In accordance with embodiments of the present disclosure, an exemplary method of actuating a platform assembly for forming a folded food product is provided. The platform assembly includes a first actuating mechanism, a second actuating mechanism, a third actuating mechanism and a fourth actuating mechanism. The method includes providing a cam system. The cam system includes a first cam, a second cam, a third cam, and a fourth cam. The cam system can include an actuator secured to at least of the first cam, the second cam, and the third cam. The method includes fixedly securing the first cam, the second cam and the third cam relative to each other. The method includes rotating the fourth cam relative to the first cam, the second cam and the third cam. The method further includes engaging the first actuating mechanism of the platform assembly with the first cam. The method includes engaging the second actuating mechanism of the platform assembly with the second cam. The method includes engaging the third actuating mechanism of the platform assembly with the third cam. The method includes engaging the fourth actuating mechanism of the platform assembly with the fourth cam.

Engaging the fourth actuating mechanism of the platform assembly with the fourth cam can include engaging a roller disposed on the actuator with the fourth cam to translate a slide rod through a slide track of the actuator. Translation of the slide rod through the slide track of the actuator can engage the fourth actuating mechanism of the platform assembly with an actuating tip of the slide rod.

In accordance with embodiments of the present disclosure, an exemplary hard press for providing a force to a platform assembly for forming a folded food product is provided. The platform assembly includes a first flap, a second flap and a third flap. The hard press includes a fixed linkage hingedly connected to a movable linkage. The hard press includes a spring disposed between the fixed linkage and the movable linkage. The hard press includes a roller disposed on a distal end of the movable linkage. The spring can create a bias force to the movable linkage upon rotation of the movable linkage relative to the fixed linkage. The bias force can provide the force to at least one of the first flap, the second flap and the third flap of the platform assembly with the roller to assist in folding or closing the folded food product.

In accordance with embodiments of the present disclosure, an exemplary method of providing a force to a platform assembly for forming a folded food product is provided. The platform assembly includes a first flap, a second flap and a third flap. The method includes providing a hard press. The hard press includes a fixed linkage hingedly connected to a movable linkage. The hard press includes a spring disposed between the fixed linkage and the movable linkage. The hard press includes a roller disposed on a distal end of the movable linkage. The method includes positioning the platform assembly underneath the hard press. The method includes rotating the movable linkage relative to the fixed linkage with the platform assembly to create a bias force with the spring. The method includes providing the force to at least one of the first flap, the second flap and the third flap of the platform assembly with the roller to assist in folding or closing the folded food product.

In accordance with embodiments of the present disclosure, an exemplary food product folding apparatus for forming a folded food product is provided that includes a rotary platform and a drive system. The rotary platform can include six platform assemblies secured thereto. The drive system can include at least one motor and a shaft. A first platform assembly of the six platform assemblies can represent a first station. A second platform assembly of the six platform assemblies can represent a second station. A third platform assembly of the six platform assemblies can represent a third station. A fourth platform assembly of the six platform assemblies can represent a fourth station. A fifth platform assembly of the six platform assemblies can represent a fifth station. A sixth platform assembly of the six platform assemblies can represent a sixth station. The drive system can index rotation of the platform about the shaft between the first station, the second station, the third station, the fourth station, the fifth station, and the sixth station.

In accordance with embodiments of the present disclosure, an exemplary method of forming a folded food product is provided that includes providing a food product folding apparatus. The food product folding apparatus can include a rotary platform and a drive system. The rotary platform can include six platform assemblies secured thereto. The drive system can include at least one motor and a shaft. A first platform assembly of the six platform assemblies can represent a first station. A second platform assembly of the six platform assemblies can represent a second station. A third platform assembly of the six platform assemblies can represent a third station. A fourth platform assembly of the six platform assemblies can represent a fourth station. A fifth platform assembly of the six platform assemblies can represent a fifth station. A sixth platform assembly of the six platform assemblies can represent a sixth station. The method can include indexing rotation of the platform about the shaft with the drive system between the first station, the second station, the third station, the fourth station, the fifth station, and the sixth station.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed multi-stage rotary food product folder apparatus, reference is made to the accompanying figures, wherein.

DESCRIPTION OF EXEMPLARY EMBODIMENTS

It should be understood that the relative terminology used herein, such as "front", "rear", "left", "top", "bottom", "vertical", and "horizontal" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions. Thus, any dimensions provided herein are merely for an exemplary purpose and are not intended to limit the invention to embodiments having particular dimensions.

Figure 3:
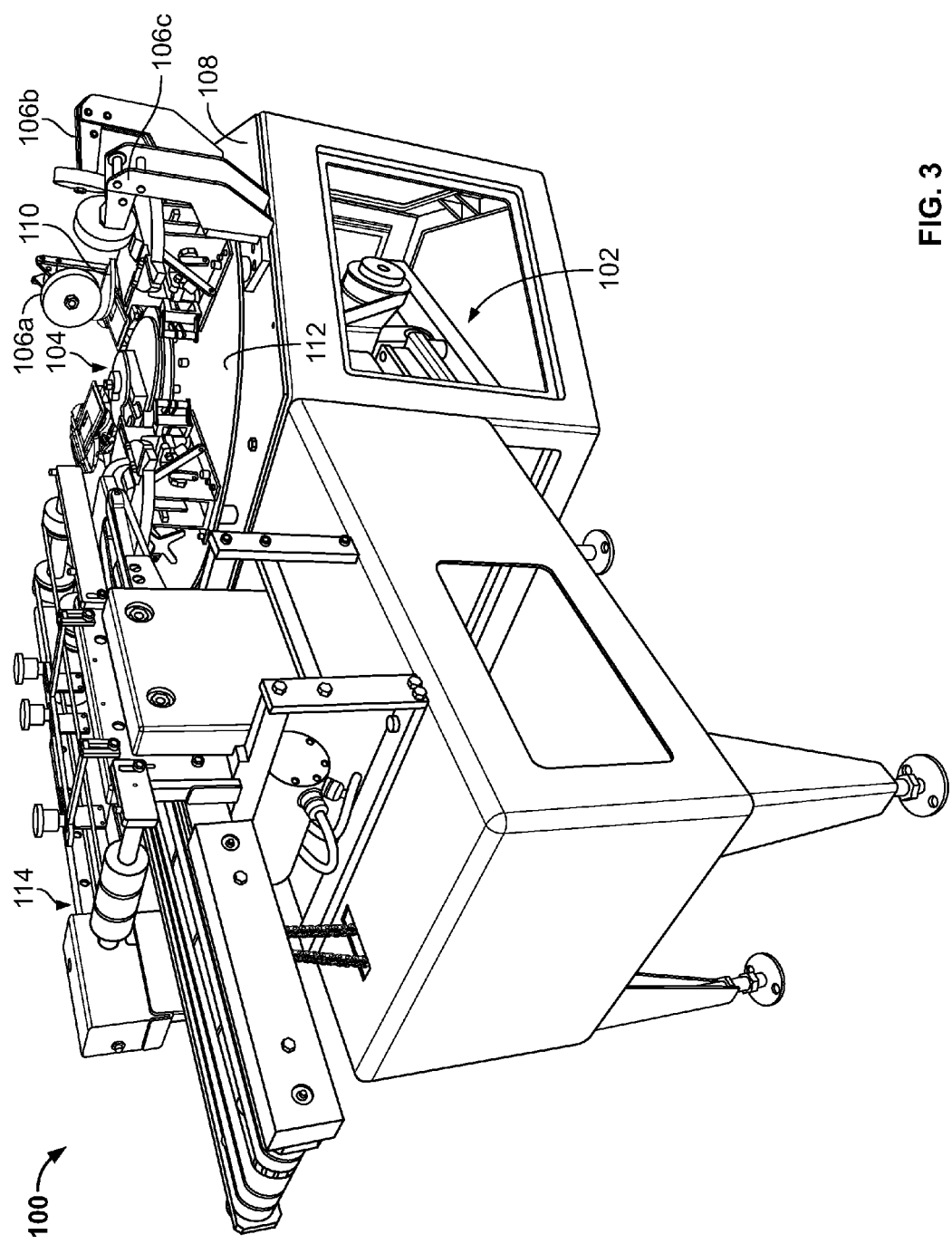
FIG. 3 is a perspective view of an exemplary multi-stage rotary food product folder apparatus according to the present disclosure.
Figure 4:
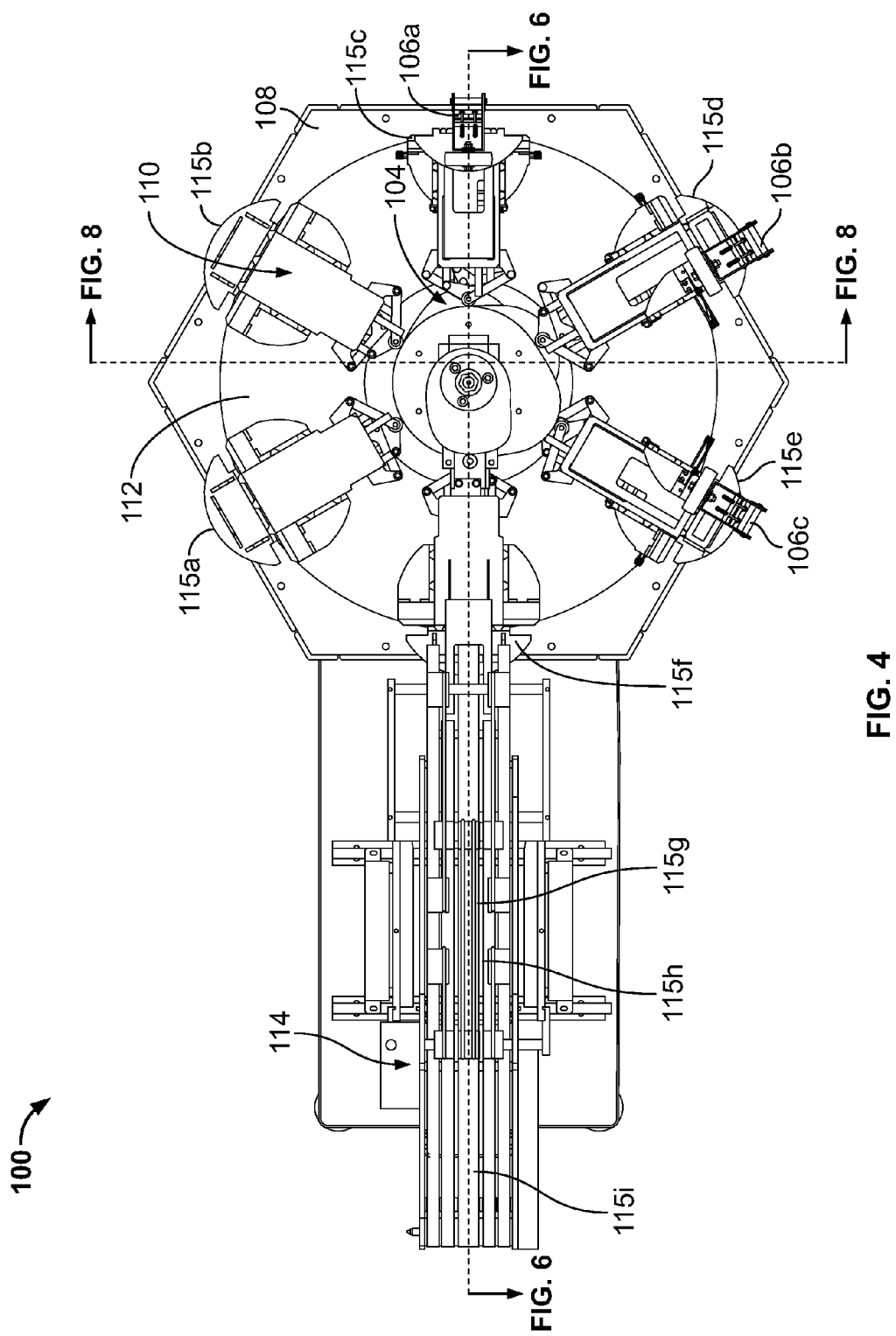
FIG. 4 is a top view of an exemplary multi-stage rotary food product folder apparatus of FIG. 3.
Figure 5:
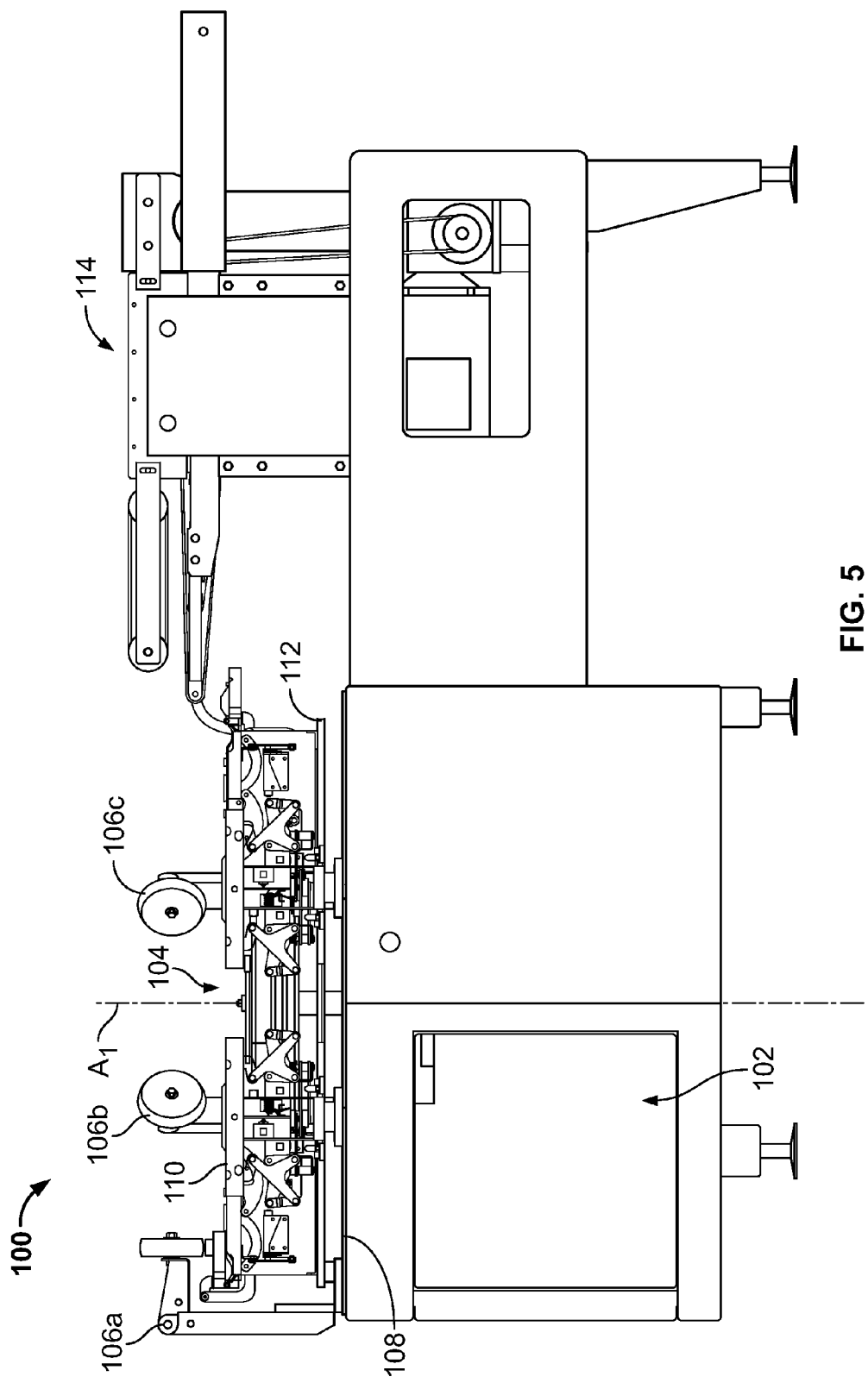
FIG. 5 is a side view of an exemplary multi-stage rotary food product folder apparatus of FIGS. 3 and 4.

With reference to FIGS. 3-5, perspective, top and side views, respectively, of an exemplary multi-stage rotary food product folder apparatus 100 (hereinafter "apparatus 100"), e.g., a multi-stage rotary folder, are provided. The apparatus 100 can include a drive system 102, a cam system 104, a plurality of platform assemblies 110 mounted to an upper platform 112, and a conveyor belt assembly 114. Optionally, the apparatus 100 can include a plurality of hard presses 106a-c mounted to a lower platform 108. Each of the above components will be discussed in greater detail below.

Figure 6:
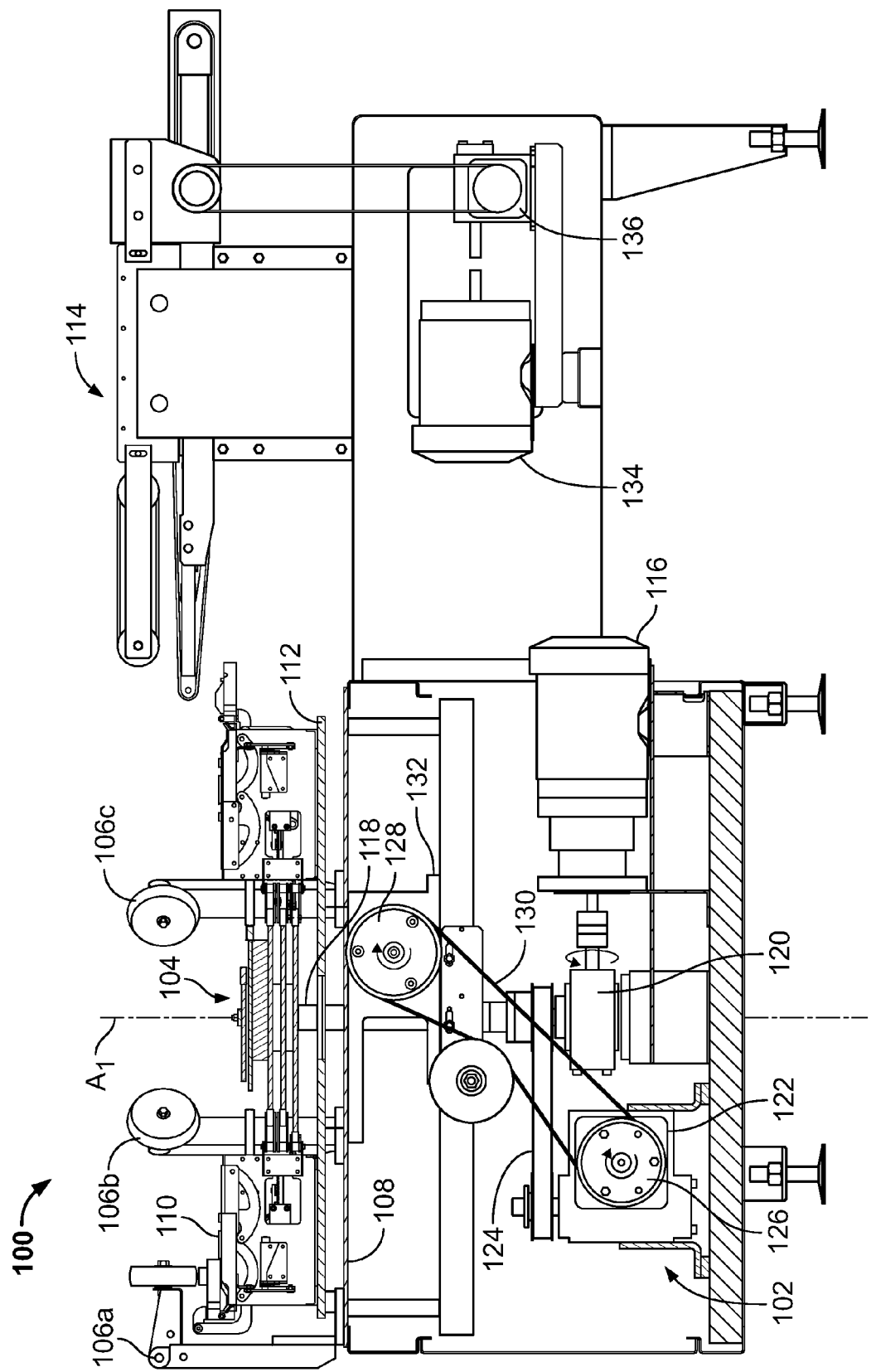
FIG. 6 is a cross-sectional side view of an exemplary multi-stage rotary food product folder apparatus of FIGS. 3-5.

Still with reference to FIGS. 3-5 and with reference to the cross-sectional side view of the apparatus 100 shown in FIG. 6, the drive system 102 can be an indexing drive mechanism. In particular, the drive system 102 can include a drive motor 116 which drives a central shaft 118 about a central vertical axis $A_1$. In some embodiments, a gearbox 120 can be utilized to convert the rotational motion of the drive motor 116 to the rotational motion of the central shaft 118. As will be discussed in greater detail below, the central shaft 118 can be mechanically connected to at least one cam of the cam system 104, e.g., a stacked cam system. Thus, for each full rotation of the central shaft 118, at least one cam of the cam system 104 can also undergo a full rotation. In some embodiments, the gear ratio for the gearbox 120 can be selected by methods known in the art such that for each index of the platform assemblies 110, e.g., a sixty degree index between stations, the fourth cam 144 (see, e.g., FIG. 7) of the cam system 104 undergoes a full rotation, e.g., 360 degrees, on the central shaft 118, to eject the food product onto the conveyor belt assembly 114.

The central shaft 118 can be connected to a second gearbox 122 via a belt 124. The gearbox 122 can include a drive pulley 126 connected to a pulley 128 via a belt 130. The ratio of the gearbox 122 can be different from the ratio of the gearbox 120. In particular, the gearbox 122 and the drive pulley 126 can act as an indexing drive for driving the upper platform 112 to rotate about the central vertical axis $A_1$. Thus, the lower platform 108 can remain stationary relative to the frame of the apparatus 100, while the upper platform 112 can rotate relative to the frame of the apparatus 100 about the central vertical axis $A_1$. In some embodiments, the drive motor 116 can run continuously and a disengagement drive 132, e.g., an indexer, a solenoid air clutch, engaged with the pulley 128 can be used to start and stop, e.g., dwell, the rotation of the upper platform 112 to control the angular position of the upper platform 112 relative to the lower platform 108 (see, e.g., FIG. 6). In some embodiments, a servomotor and/or an air clutch (not shown) can be used as a rotary actuator to control the angular position of the upper platform 112 relative to the lower platform 108. Each of the platform assemblies 110 can be detachably secured to the upper platform 112. In some embodiments, the platform assemblies 110 can be circumferentially spaced on the upper platform 112 about the central vertical axis $A_1$ at approximately sixty degrees relative to each other. Thus, six platform assemblies 110 can be detachably secured to the upper platform 112. Although discussed herein as including six platform assemblies 110 secured to the upper platform 112, in some embodiments, more or less platform assemblies 110 can be secured to the upper platform 112.

As the upper platform 112 is actuated (e.g., indexed) by approximately sixty degrees to angularly rotate, the platform assemblies 110 rotate about the central vertical axis $A_1$ and can thereby be positioned in the predetermined stations for folding and producing a food product. As will be discussed in greater detail below, a first station 115a can represent a loading station, a second station 115b can represent a food filling dispensing station, a third station 115c can represent a first fold station, a fourth station 115d can represent a second fold station, a fifth station 115e can represent a third fold station, and a sixth station 115f can represent an eject station. Optionally, the third station 115c can include a hard press 106a, the fourth station 115d can include a hard press 106b, and the fifth station 115e can include a hard press 106c. After ejection from the apparatus 100 to a conveyor belt assembly 114, a seventh station 115g can represent a fourth fold station, an eighth station 115h can represent a fifth fold station, and a ninth station 115i can represent a fully folded food product discharge station. In some embodiments, an alternative motor 134 can be utilized in combination with a gearbox 136 to drive the conveyor belt assembly 114. In some embodiments, the drive motor 116 can be utilized to drive the central shaft 118, the upper platform 112 and the conveyor belt assembly 114. In some embodiments, different motors can be utilized to drive each of the central shaft 118, the upper platform 112 and the conveyor belt assembly 114.

Figure 7:
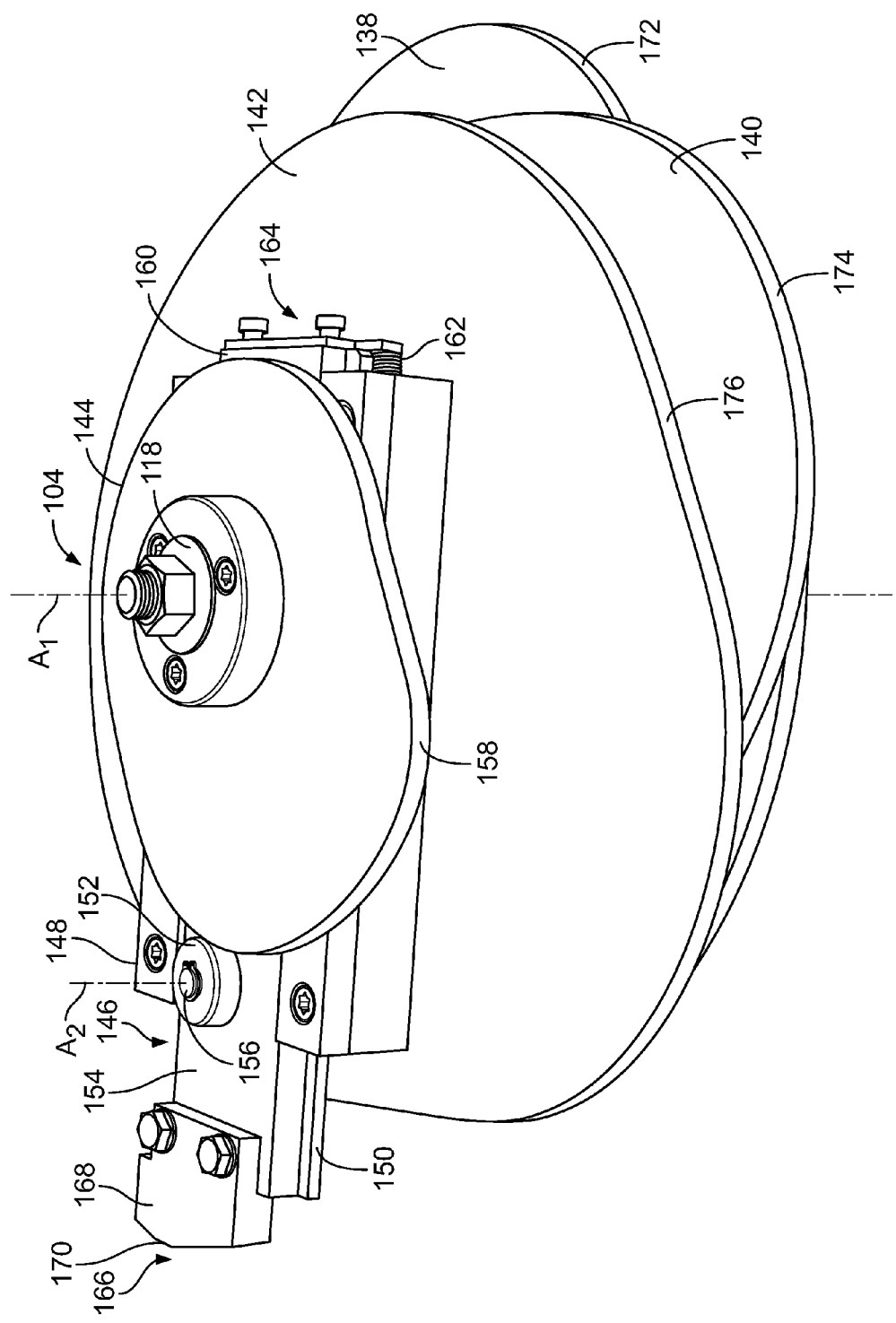
FIG. 7 is a top, perspective view of an exemplary cam system of an exemplary multi-stage rotary food product folder apparatus of FIGS. 3-5.
Figure 8:
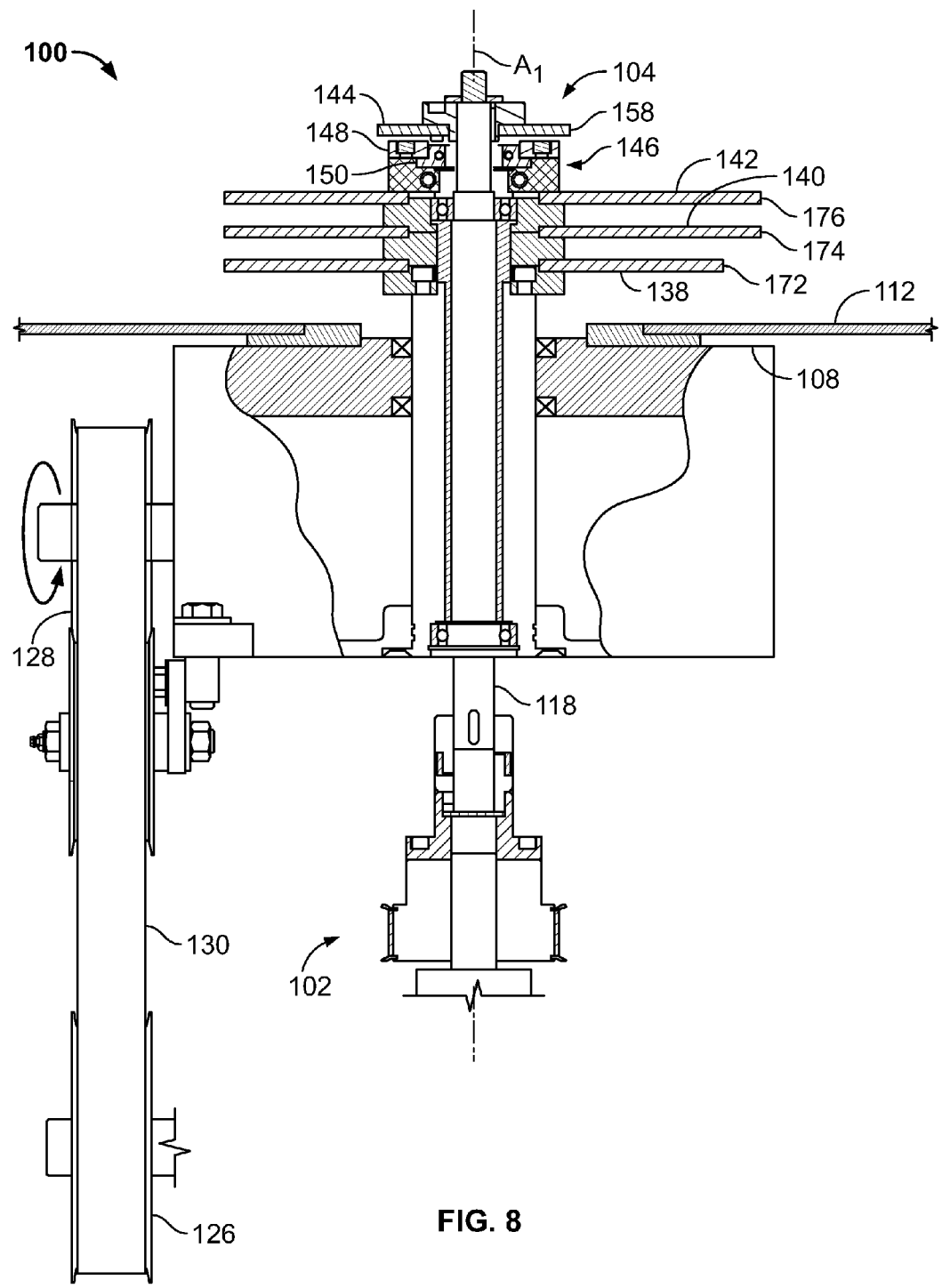
FIG. 8 is a partial cross-sectional side view of an exemplary cam system and drive system of an exemplary multi-stage rotary food product folder apparatus of FIG. 7.

FIGS. 7 and 8 show top perspective and partial cross-sectional views, respectively, of an exemplary cam system 104 and drive system 102 of the apparatus 100. In particular, each individual platform assembly 110 can be engaged by the cam system 104 as described herein. The cam system 104 can include four cams for regulating actuation of the platform assemblies 110. A first cam 138, e.g., the lowest cam, can actuate the platform assembly 110 into a first fold position. A second cam 140, e.g., a central cam, can actuate the platform assembly 110 into a second fold position. A third cam 142, e.g., a central cam, can actuate the platform assembly 110 into a third fold position. A fourth cam 144, e.g., a top and ejector cam, can actuate the platform assembly 110 to eject the food product from the upper platform 112 onto the conveyor belt assembly 114.

The asymmetrical configuration of the first, second and third cams 138, 140, 142 can actuate respective actuating mechanisms of any given platform assembly 110 to actuate the platform assembly 110 into the desired folding positions. Each of the first, second and third cams 138, 140, 142, 144 can define a substantially flat, disc shape. In particular, each of the first, second and third cams 138, 140, 142 can define a base curvature, e.g., a non-actuation zone, and an extended and asymmetrical tip extending from the base curvature, e.g., an actuation zone. The first, second and third cams 138, 140, 142 can be positioned such that the asymmetrical portions, e.g., extended tips, of the first, second and third cams 138, 140, 142 are oriented in different directions, e.g., separated by approximately sixty degrees. Thus, the first cam 138 can actuate the platform assembly 110 during a different point of rotation than the second and third cams 140, 142, the second cam 140 can actuate the platform assembly 110 during a different point of rotation than the first and third cams 138, 142, and the third cam 142 can actuate the platform assembly 110 during a different point of rotation than the first and second cams 138, 140. As discussed above, the drive system 102 can drive the rotation of the central shaft 118. The central shaft 118 can be secured to the fourth cam 144 through a 1:1 gear ratio to maintain rotation of the fourth cam 144 relative to the lower platform 108. In some embodiments, the fourth cam 144 can be notched to rotate with the central shaft 118. In contrast, the first cam 138, the second cam 140 and the third cam 142 can be in a fixed position relative to the lower platform 108. The fourth cam 144 also defines an asymmetrical configuration, e.g., a base curvature and an extended tip, for actuation of the platform assembly 110 during each 360 degree rotation of the fourth cam 144.

The cam system 104 further includes an actuator 146. The actuator 146 can include a slide track 148, e.g., a ball bearing slide track, secured to an upper surface of the third cam 142 and a slide rod 150 slidably positioned within the slide track 148. In particular, the slide rod 150 can be configured and dimensioned to fit within the opening of the slide track 148 and can slide along a path perpendicular to the central vertical axis $A_1$. The slide rod 150 includes a roller 152 secured to an upper surface 154 of the slide rod 150. The roller 152 can be secured to the slide rod 150 by a shaft 156 such that the roller 152 can rotate about the shaft 156 and about the vertical axis $A_2$.

As shown in FIG. 7, as the fourth cam 144 rotates about the central vertical axis $A_1$, the fourth cam 144 and the roller 152 can be in a substantially adjoining relationship. In particular, as the fourth cam 144 rotates, the roller 152 can ride along the edge 158 of the fourth cam 144. It should be understood that as the asymmetrical configuration of the fourth cam 144 rotates about the central vertical axis $A_1$, the adjoining position of the roller 152 can actuate the slide rod 150 to slide within the slide track 148. In some embodiments, the slide rod 150 can include a stop 160 and return springs 162 secured to the slide rod 150 at a proximal end 164. The stop 160 and/or the springs 162 can provide a limit to the distance which the slide rod 150 can travel through the slide track 148. In addition, the springs 162 can provide a bias force to actuate the slide rod 150 for retraction into a neutral position within the slide track 148. Thus, as the asymmetrical fourth cam 144 rotates, the slide rod 150 can initially be actuated to slide within the slide track 148 in a distal end 166 direction and the springs 162 can actuate the slide rod 150 to slide back in a proximal end 164 direction when permitted by the rotating fourth cam 144. In some embodiments, rather than or in combination with the return springs 162, the roller 152 can be connected to the edge 158 of the fourth cam 144 such that the fourth cam 144 can push on the roller 152 to translate the slide rod 150 within the slide track 148 in a distal end 166 direction and pull on the roller 152 to translate the slide rod 150 in a proximal end 164 direction (not shown).

As will be discussed in greater detail below, the distal end 166 of the slide rod 150 can include an actuating tip 168 secured thereto defining an actuating surface 170 for actuation of the platform assembly 110 into an eject position at the sixth station 115f. In some embodiments, the slide rod 150 can be fabricated from a stiff material, e.g., a metal, and the actuating tip 168 can be fabricated from an elastic material, e.g., a rubber, to prevent damage to components of the platform assembly 110. In some embodiments, the slide rod 150 and the actuating tip 168 can be fabricated from a substantially similar material. As will be discussed below, similar to the interaction of the roller 152 of the slide rod 150 with the edge 158 of the fourth cam 144, the edges 172, 174, 176 of the first, second and third cams 138, 140, 142, respectively, can interact with rollers of the platform assemblies 110 to create the desired folds of the food product.

Figure 9:
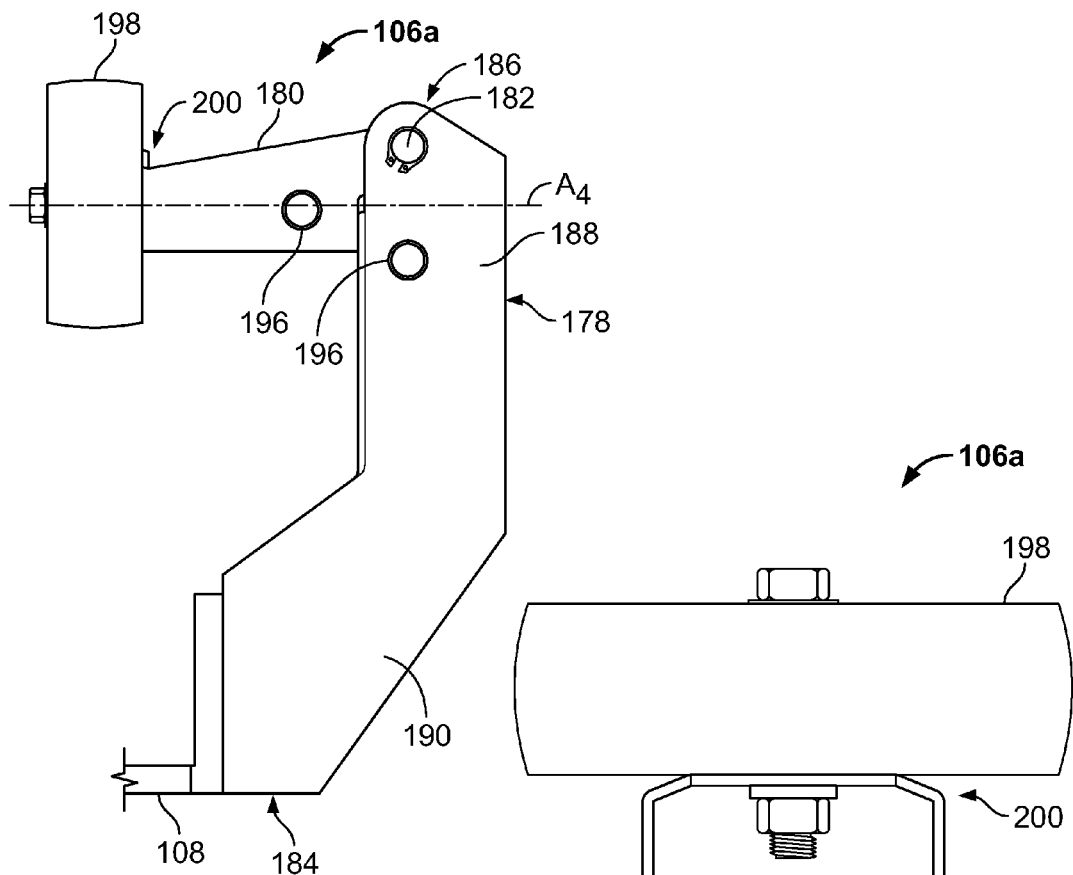
FIG. 9 is a side view of an exemplary hard press of an exemplary multi-stage rotary food product folder apparatus of FIGS. 3-5.
Figure 10:
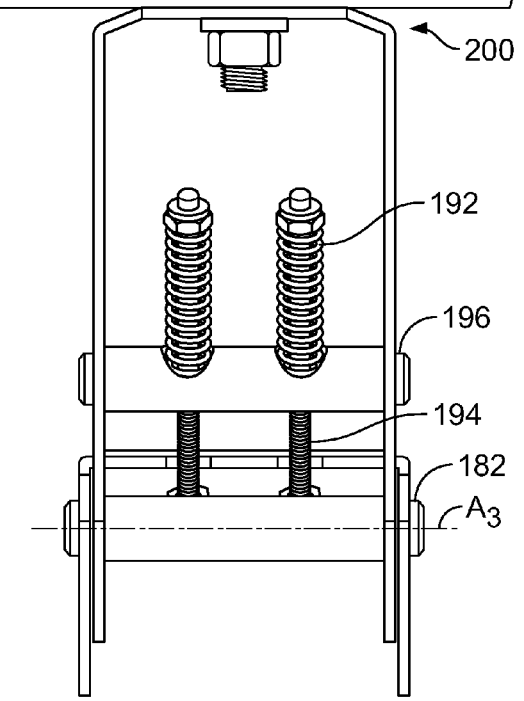
FIG. 10 is a top view of an exemplary hard press of an exemplary multi-stage rotary food product folder apparatus of FIGS. 3-5.

Turning now to FIGS. 9 and 10, side and top views of an exemplary hard press 106a in a neutral position, e.g., a non-extended position, are provided. Although discussed herein with respect to the hard press 106a, it should be understood that the hard presses 106b, 106c can be substantially similar in structure and/or function. Each hard press 106 (e.g., 106a, 106b, 106c) of the apparatus 100 can represent a hard press station for providing an additional force to flaps of the platform assemblies 110 to reinforce folding or closing of the food product with the flap. The hard press 106a includes a fixed linkage 178 and a movable linkage 180 rotationally connected to the fixed linkage 178. In particular, the movable linkage 180 can be rotationally connected to the fixed linkage 178 at a shaft 182 such that the movable linkage 180 can rotate about the shaft 182 and about the axis $A_3$. The fixed linkage 178 can be secured to the lower platform 108 at a proximal end 184 and the movable linkage 180 can be rotationally connected to the fixed linkage 178 at a distal end 186. In some embodiments, a height of the fixed linkage 178 and, thereby, a height of the movable linkage 180 over the platform assembly 110, can be adjusted based on the food product being formed and/or the amount of reinforcing pressure desired from the hard press 106a. For example, the height of the fixed linkage 178 can be increased to reduce the reinforcing pressure imparted by the hard press 106a on a flap of the platform assembly 110. As a further example, the height of the fixed linkage 178 can be reduced to increase the reinforcing pressure imparted by the hard press 106a on a flap of the platform assembly 110. The fixed linkage 178 can define a substantially vertical section 188 extending from a midpoint to the distal end 186 which is parallel to the central vertical axis $A_1$ of the apparatus 100 and a substantially diagonal section 190 extending form the midpoint to the proximal end 184. When positioned in a neutral position, the movable linkage 180 can extend from the fixed linkage 178 in the direction of the central vertical axis $A_1$ of the apparatus 100 in a substantially perpendicular manner along axis $A_4$. The hard press 106a includes one or more springs 192 positioned around one or more fasteners 194, e.g., bolts, and secured to connectors 196 such that the springs 192 and fasteners 194 extend between the fixed linkage 178 and the movable linkage 180. The springs 192 can provide a biasing force to maintain the movable linkage 180 in a substantially perpendicular position relative to the fixed linkage 178, e.g., the neutral position along axis $A_4$.

Figure 11:
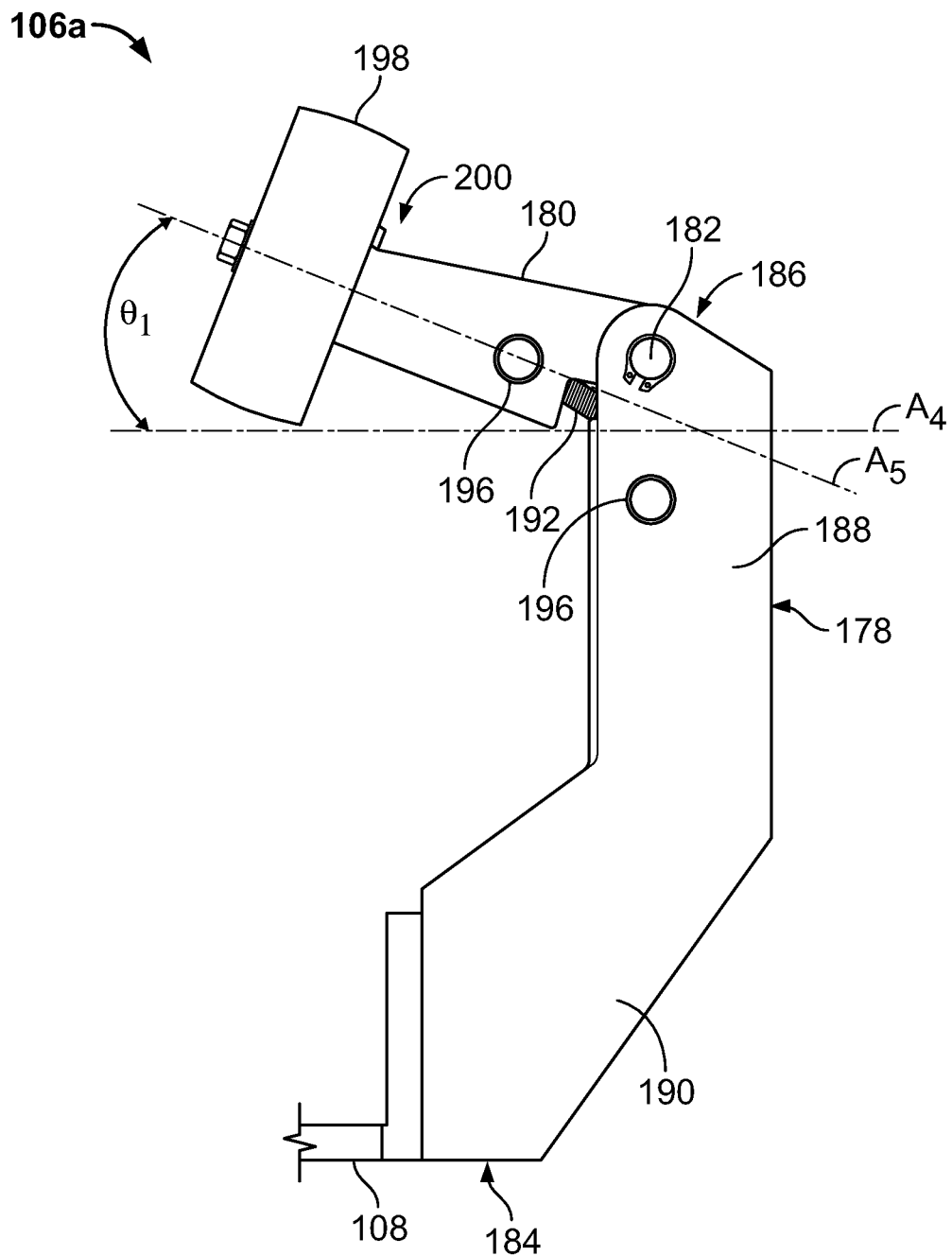
FIG. 11 is a side view of an exemplary extended hard press of an exemplary multi-stage rotary food product folder apparatus according to the present disclosure.

The hard press 106a includes a hard press roller 198 secured to a distal end 200 of the movable linkage 180. The hard press roller 198 can be fabricated from an elastic material, e.g., a rubber, and can interact with the platform assemblies 110 at the third station 115c, the fourth station 115d and the fifth station 115e. As will be discussed in greater detail below, as flaps of the platform assemblies 110 are actuated at the third, fourth and fifth stations 115c, 115d, 115e into folding positions to fold the food product, the hard press roller 198 of the hard press 106a can provide a force onto the flaps of the platform assemblies 110 to assist the flaps in folding and/or closing the food product. In particular and as shown in FIG. 11, as the platform assembly 110 is rotated on the upper platform 112 to be positioned under the hard press 106a, the hard press roller 198 can ride along an upper surface of a flap of the platform assembly 110 and be actuated into an extended position. The extended position extends the movable linkage 180 in an upward direction such that rather than being perpendicular to the fixed linkage 178 at axis $A_4$, the movable linkage 180 can be extended by angle $\theta_1$ relative to the axis $A_4$ to extend along axis $A_5$, e.g., non-perpendicular to the fixed linkage 178. In particular, the hard press roller 198 can be extended slightly in an upward direction as the flap of the platform assembly 110 is positioned beneath the hard press roller 198. Thus, while the springs 192 can be expanded to allow the movable linkage 180 to extend along axis $A_5$, the bias force from the springs 192 can maintain a downward predetermined force on the flap of the platform assembly 110 to assist the flap in folding or closing the food product.

In some embodiments, the reinforcing load of the hard press 106a on the flaps of the platform assemblies 110 can be utilized to reduce or remove the pressure on the linkages of the platform assemblies 110 by reducing or removing the requisite force to be imparted by the linkage on the flaps of the platform assemblies 110 for forming the fold of the food product. In some embodiments, rather than or in combination with the springs 192, the bias force of the hard press roller 198 against the platform assembly 110 can be generated by, e.g., a motor, an air cylinder with compressed air pressure, and the like (not shown). In some embodiments, rather than being driven in an upward direction away from the upper platform 112, the hard press roller 198 of the hard press 106a can be extended along axis $A_5$ in the neutral position and can be driven in a downward position in a direction of alignment relative to axis $A_4$ (not shown). In some embodiments, rather than providing pressure directly against a flap of the platform assembly 110, the flaps of the platform assembly 110 can include a wearable block against which the hard press roller 198 can provide pressure (not shown). For example, the wearable block can allow wear over time and the springs 192 of the hard press 106a can maintain the desired pressure against the wearable block. In some embodiments, the wearable block can be interchangeable such that a wearable block of a different height can be utilized to regulate the amount of pressure imparted by the hard press roller 198 against the flaps of the platform assembly 110, e.g., depending on the type of food product fold desired. In some embodiments, the wearable block can include a lead-in ramp on one or more sides to assist in receiving the hard press roller 198 thereon.

Figure 12:
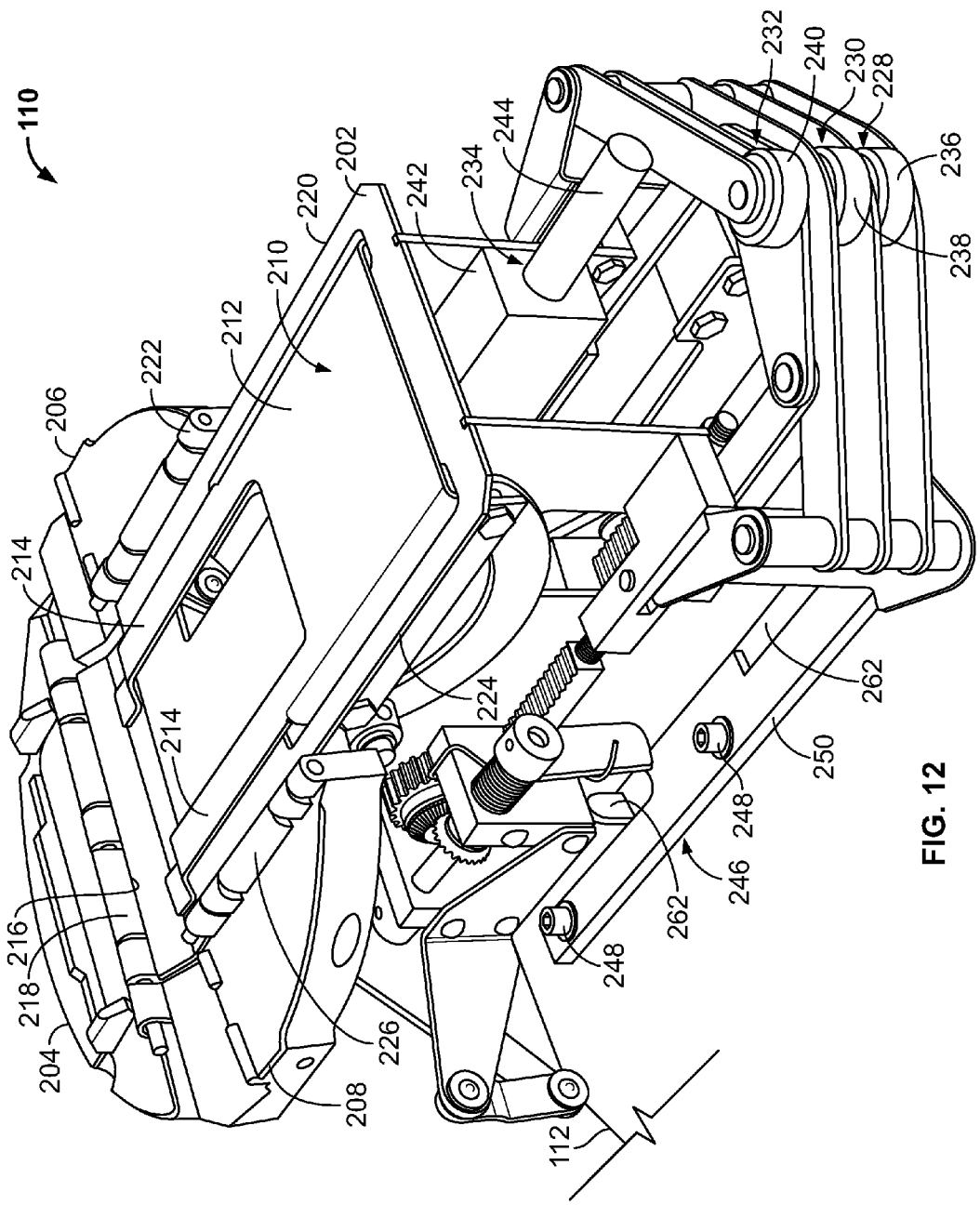
FIG. 12 is a rear, perspective view of an exemplary platform assembly of an exemplary multi-stage rotary food product folder apparatus of FIGS. 3-5.
Figure 13:
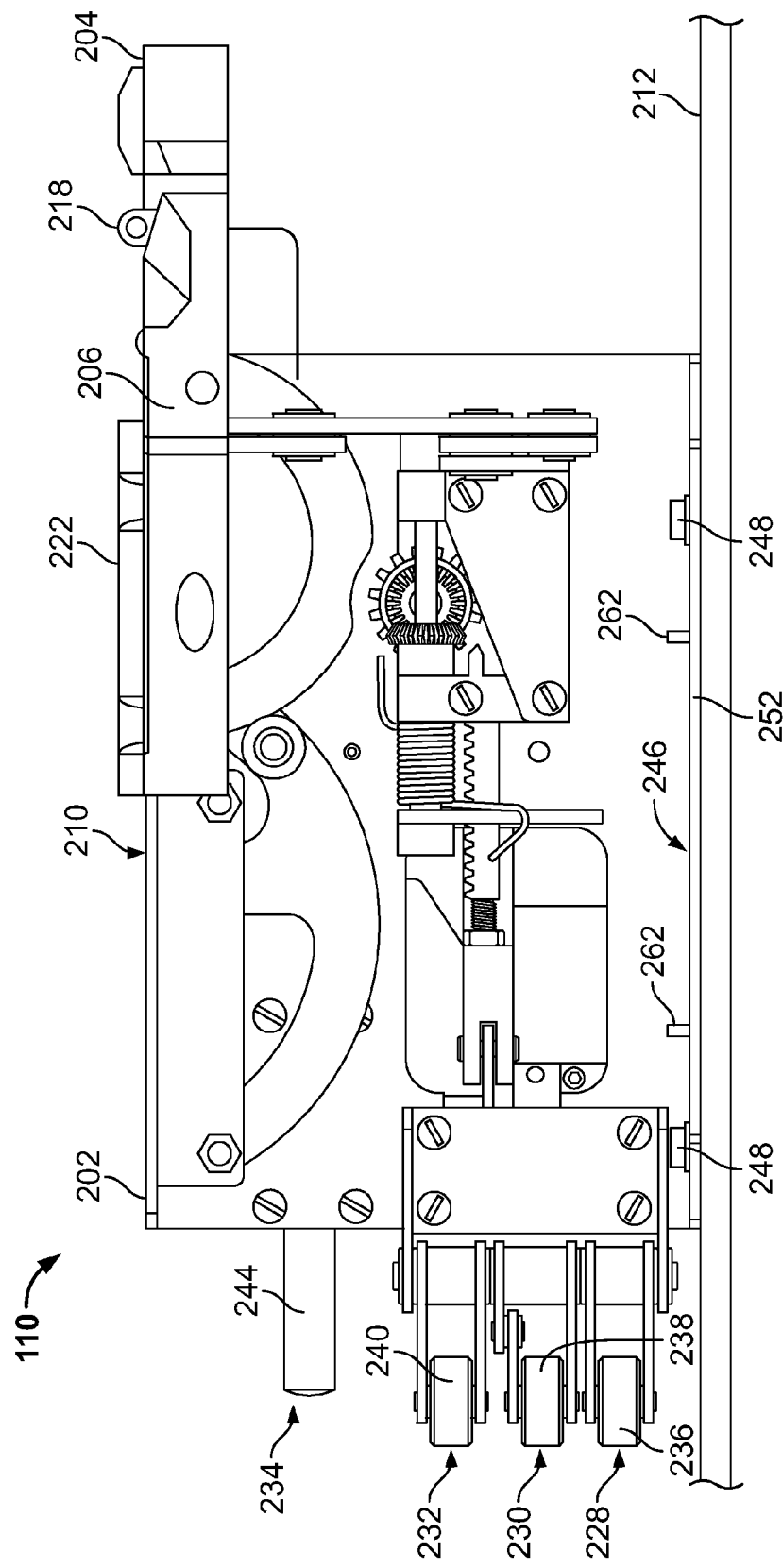
FIG. 13 is a side view of an exemplary platform assembly of an exemplary multi-stage rotary food product folder apparatus of FIG. 12.
Figure 14:
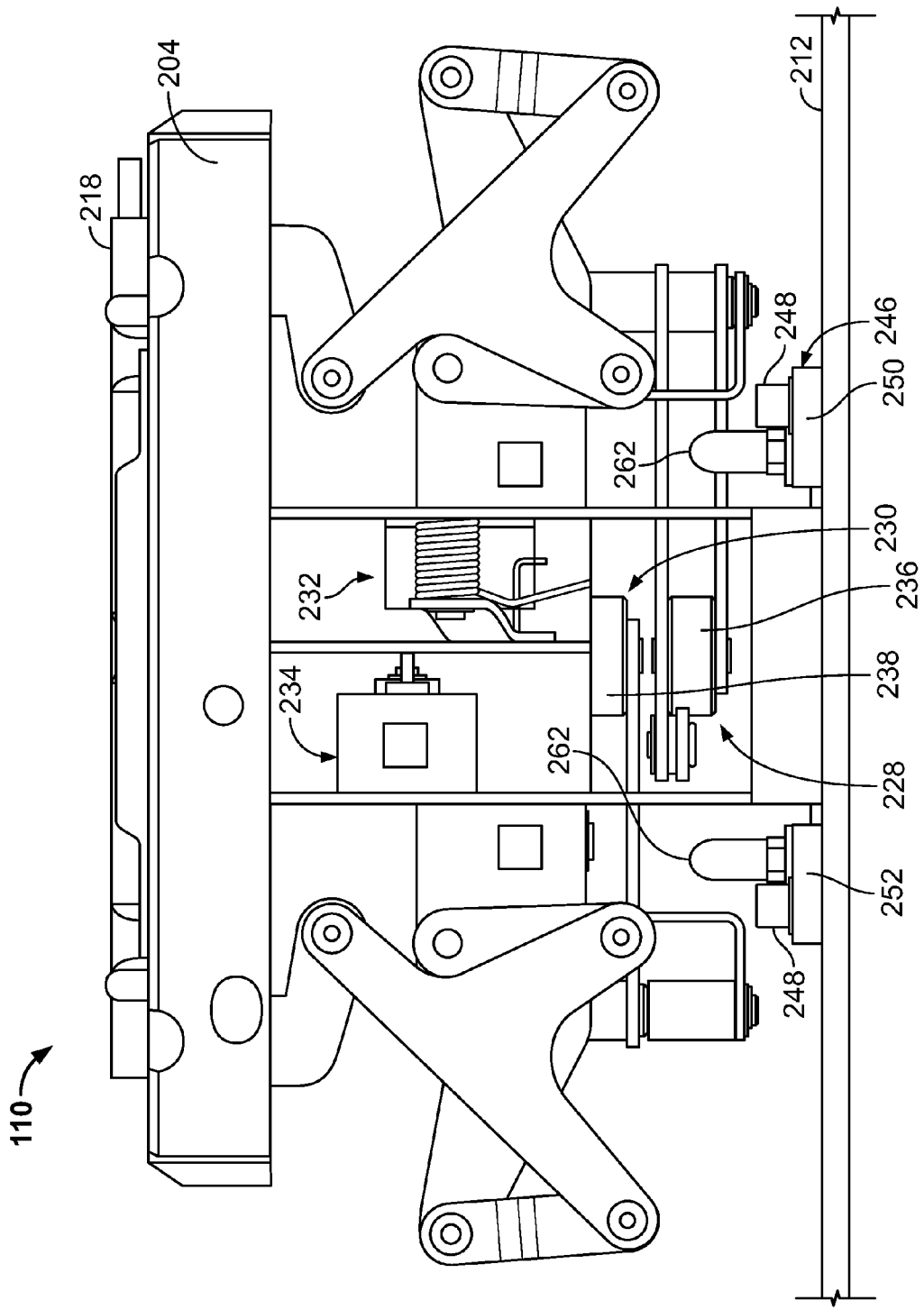
FIG. 14 is a front view of an exemplary platform assembly of an exemplary multi-stage rotary food product folder apparatus of FIG. 12.
Figure 15:
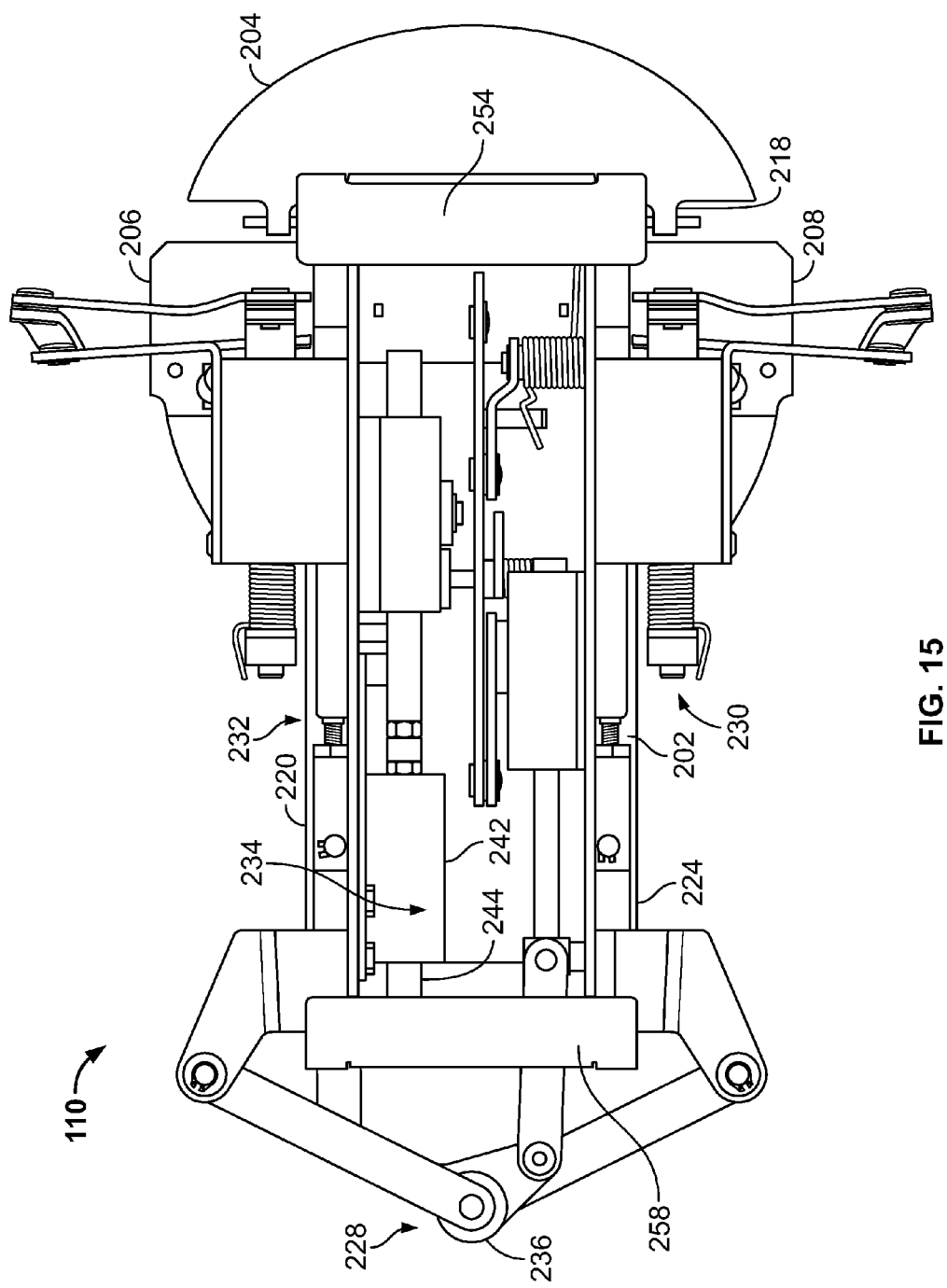
FIG. 15 is a bottom view of an exemplary platform assembly of an exemplary multi-stage rotary food product folder apparatus of FIG. 12.

Turning now to FIGS. 12-15, perspective, side, front and bottom views, respectively, of an exemplary platform assembly 110 are provided. In particular, FIGS. 12-14 show the platform assembly 110 secured to the upper platform 112, while FIG. 15 shows the platform assembly 110 detached from the upper platform 112. As will be discussed herein, the platform assembly 110 can be self-contained and can be implemented at each of the six stations, e.g., first to sixth stations 115a-115f, to perform the desired steps of producing the food product. The platform assembly 110 can include a top surface 202, a first flap 204, a second flap 206, a third flap 208, and a lift arm 210. The top surface 202 can be a stationary or non-movable flap. The first flap 204 can be a top movable flap for forming the first fold of the food product at the third station 115c. The second flap 206 can be a right movable flap for forming the second fold of the food product at the fourth station 115d. The third flap 208 can be a left movable flap for forming the third fold of the food product at the fifth station 115e. The lift arm 210 can include a lower solid section 212 and a pair of forks 214 extending therefrom for lifting and ejecting the food product from the upper platform 112 to the conveyor belt assembly 114 at the sixth station 115f.

The first flap 204 can be hingedly connected to the top side 216 of the top surface 202 via a hinge 218. The second flap 206 can be hingedly connected to the right side 220 of the top surface 202 via a hinge 222. The third flap 208 can be hingedly connected to the left side 224 of the top surface 202 via a hinge 226. When assembled relative to each other, the top surface 202, the first flap 204, the second flap 206 and the third flap 208, and the lift arm 210 can define a substantially common plane. Upon actuation into a folding position, the first flap 204 can rotate about the hinge 218 up to approximately 180 degrees such that the first flap 204 can rest upon the top surface 202, the second flap 206 and/or the third flap 208. Upon actuation into a folding position, the second flap 206 can rotate about the hinge 222 up to approximately 180 degrees such that the second flap 206 can rest upon the top surface 202 and/or the lift arm 210. Upon actuation into a folding position, the third flap 208 can rotate about the hinge 226 up to approximately 180 degrees such that the third flap 208 can rest upon the top surface 202 and/or the lift arm 210.

The mechanisms for actuating the first, second and third flaps 204, 206, 208 into the folding positions and for actuating the lift arm 210 into an extended position can be located below the top surface 202. A first actuating mechanism 228 can be utilized to actuate the first flap 204 into a folding position. A second actuating mechanism 230 can be utilized to actuate the second flap 206 into a folding position. A third actuating mechanism 232 can be utilized to actuate the third flap 208 into a folding position. A fourth actuating mechanism 234 can be utilized to actuate the lift arm 210 into an extended position. The first actuating mechanism 228 includes a roller 236 rotationally positioned to interact with or engage the edge 172 of the first cam 138. The second actuating mechanism 230 includes a roller 238 rotationally positioned to interact with or engage the edge 174 of the second cam 140. The third actuating mechanism 232 includes a roller 240 rotationally positioned to interact with or engage the edge 176 of the third cam 142. The fourth actuating mechanism 234 includes a slide track 242, e.g., a ball bearing track, configured and dimensioned to slidably receive therein a slide rod 244. As discussed above and as will be discussed in greater detail below, the slide rod 244 can be actuated or engaged by the actuating surface 170 of the actuating tip 168 of the slide rod 150 of the cam system 104 to translate within the slide track 242. For clarity, the separate components of the first, second, third and fourth actuating mechanisms 228, 230, 232, 234 will be discussed separately below.

Figure 16:
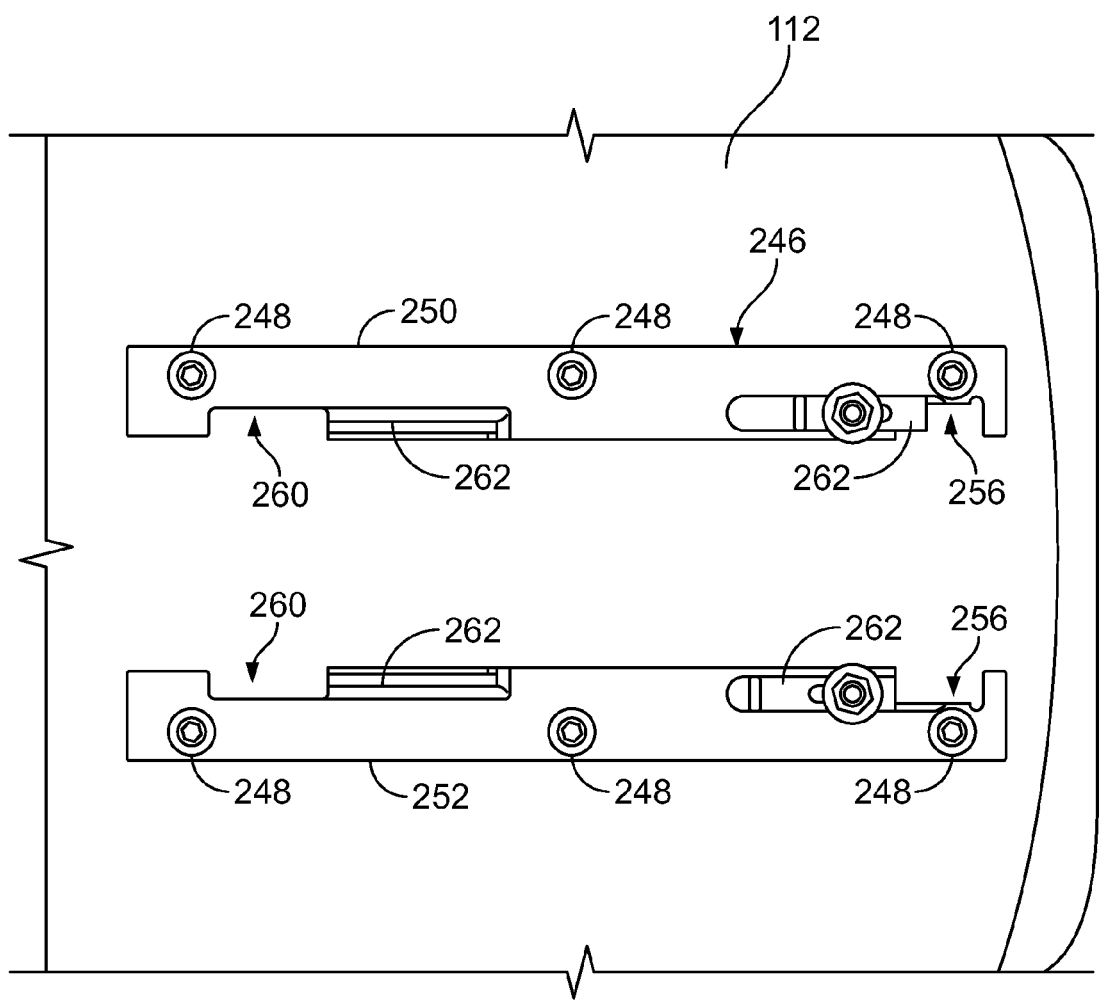
FIG. 16 is a top view of an exemplary attachment mechanism for an exemplary platform assembly of an exemplary multi-stage rotary food product folder apparatus of FIG. 12.

Still with reference to FIGS. 12-15 and also with reference to FIG. 16, in some embodiments, the upper platform 112 can include an attachment mechanism 246, e.g., a quick release mechanism, for detachably securing the platform assembly 110 to the upper platform 112. The attachment mechanism 246 can be secured to the upper platform 112 with a plurality of fasteners 248, e.g., screws, and the like, through complementary apertures (not shown) in the upper platform 112 surface. In particular, a first half 250 and a second half 252 of the attachment mechanism 246 can be secured to the upper platform 112 such that a first platform base 254 can be positioned within a first complementary slot 256 formed by the attachment mechanism 246 and a second platform base 258 can be positioned within a second complementary slot 260 formed by the attachment mechanism 246. Once the first and second platform bases 254, 258 have been positioned within the first and second complementary slots 256, 260, locking mechanisms 262, e.g., sliding brackets, can be slid into the first and second complementary slots 256, 260 to cover and retain the first and second platform bases 254, 258 within the first and second complementary slots 256, 260. The platform assembly 110 can thereby be detachably secured to the attachment mechanism 246 and, in turn, to the upper platform 112. In some embodiments, rather than implementing the attachment mechanism 246, the platform assembly 110 can be secured directly to the upper platform 112 with fasteners, e.g., screws, and the like.

Figure 17:
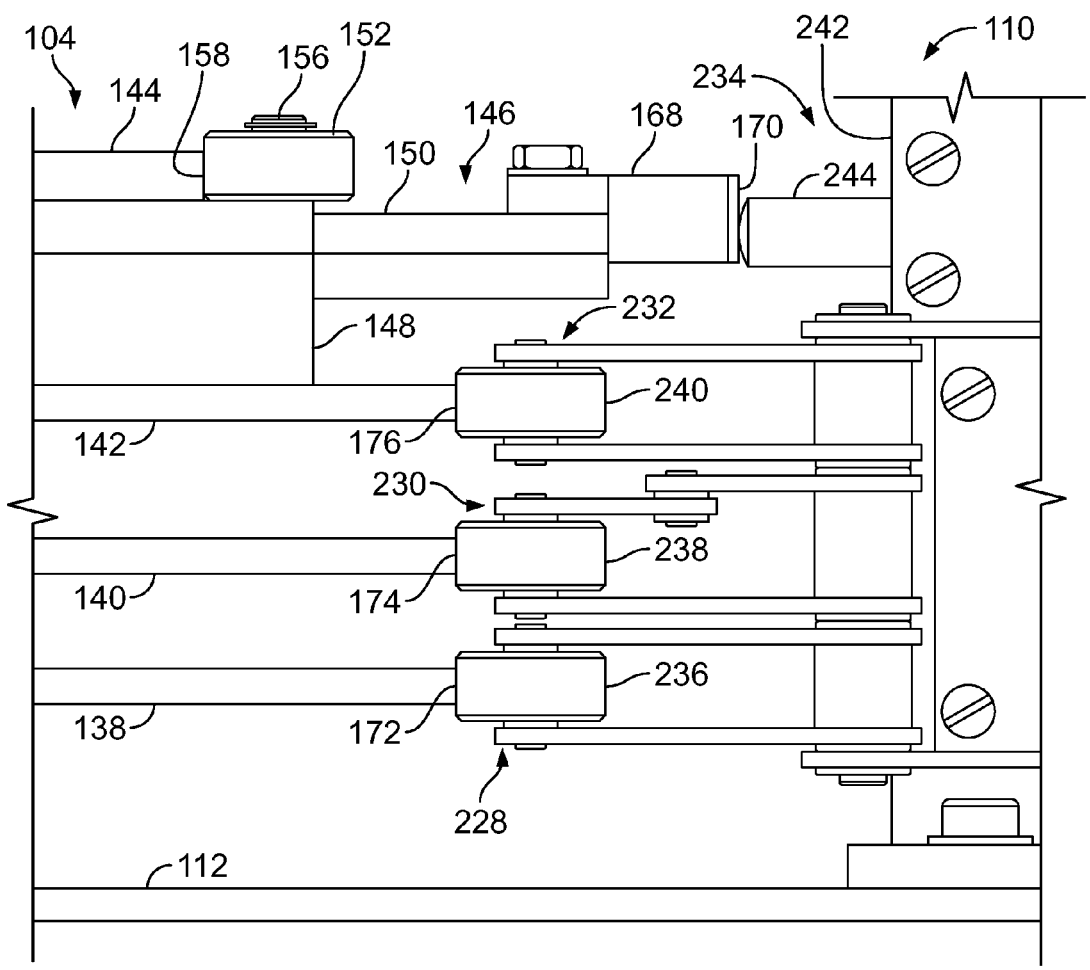
FIG. 17 is a detailed view of an exemplary platform assembly and an exemplary cam system of an exemplary multi-stage rotary food product folder apparatus of FIGS. 7 and 12.

FIG. 17 shows a detailed view of an exemplary platform assembly 110 interacting with an exemplary cam system 104. In particular, as the upper platform 112 and the platform assemblies 110 secured thereto are indexed (e.g., approximately sixty degrees from station to station) to rotate about the central vertical axis $A_1$, the first cam 138, the second cam 140 and the third cam 142 can remain in a fixed position. Similarly, as the fourth cam 144 is actuated to rotate with the central shaft 118, the slide track 148 of the actuator 146 can remain in a fixed position. As the platform assembly 110 rotates about the central vertical axis $A_1$, the roller 236 of the first actuating mechanism 228 can ride along the edge 172 of the first cam 138. Similarly, as the platform assembly 110 rotates about the central vertical axis $A_1$, the roller 238 of the second actuating mechanism 230 can ride along the edge 174 of the second cam 140. Similarly, as the platform assembly 110 rotates about the central vertical axis $A_1$, the roller 240 of the third actuating mechanism 232 can ride along the edge 176 of the third cam 142.

As discussed above, the asymmetrical configuration of the first, second and third cams 138, 140, 142 can actuate or engage the first, second and third actuating mechanisms 228, 230, 232, respectively, of the platform assembly 110 to actuate or engage the platform assembly 110 into the desired folding positions. In particular, the first, second and third cams 138, 140, 142 can be positioned such that the asymmetrical portions, e.g., extended tips, of the first, second and third cams 138, 140, 142 are oriented in different directions. In some embodiments, the asymmetrical portions of the first, second and third cams 138, 140, 142 can be oriented approximately sixty degrees away from each other. Thus, the first cam 138 can actuate or engage the platform assembly 110 during a different point of rotation than the second and third cams 140, 142, e.g., the third station 115c, the second cam 140 can actuate or engage the platform assembly 110 during a different point of rotation than the first and third cams 138, 142, e.g., the fourth station 115d, and the third cam 142 can actuate or engage the platform assembly 110 during a different point of rotation than the first and second cams 138, 140, e.g., the fifth station 115e. It should be understood that the platform assemblies 110 located in the first station 115a and the second station 115b can remain in a substantially flat configuration, e.g., not actuated into a folded position.

The asymmetrical configuration of the fourth cam 144 can actuate the actuator 146 to actuate the lift arm 210 of the platform assembly 110 into an extended position at the sixth station 115f. In some embodiments, the disengagement drive 132 of the drive system 102, e.g., the indexing drive, can regulate the rotation of the upper platform 112 about the central vertical axis $A_1$ such that the upper platform 112 rotates approximately sixty degrees between each station for each full revolution, e.g., 360 degrees, of the fourth cam 144. Thus, for each sixty degree rotation of the upper platform 112 and the platform assemblies 110 secured thereon, the fourth cam 144 can rotate approximately 360 degrees to actuate the lift arm 210 of the platform assembly 110 in the sixth station 115f. The timing between rotation of the upper platform 112 and actuation of the actuator 146 with the fourth cam 144 can be different or separate. In some embodiments, the index time can be approximately one second for rotation of the upper platform 112 between each station. In some embodiments, the disengagement drive 132 can maintain the upper platform 112 in a fixed position relative to the lower platform 108, thereby maintaining the platform assemblies 110 at each station, for approximately one second before a subsequent rotation.

Figure 18:
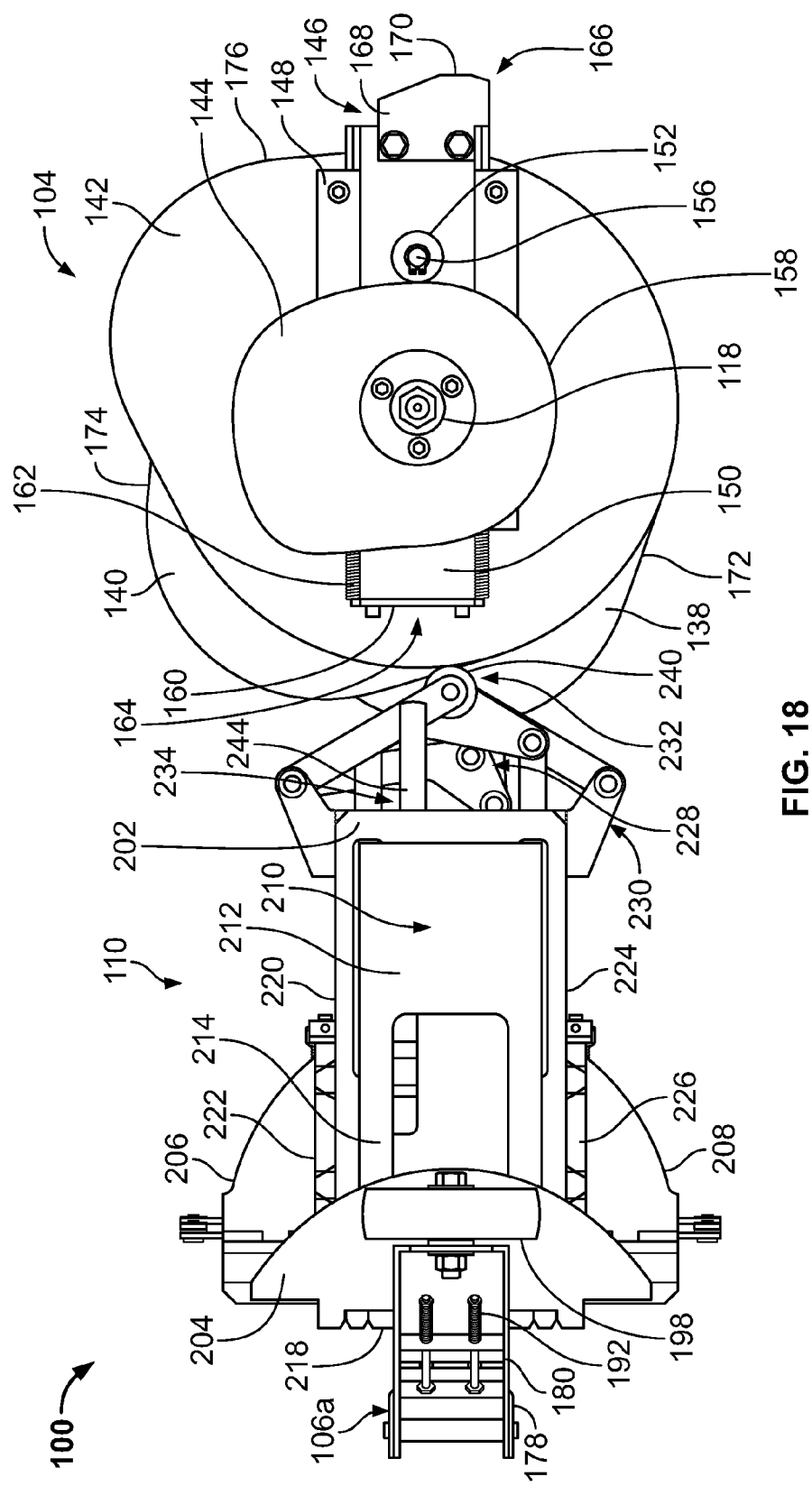
FIG. 18 is a top view of an exemplary platform assembly actuated into a first fold position by an exemplary cam system of an exemplary multi-stage rotary food product folder apparatus of FIGS. 3-5.
Figure 19:
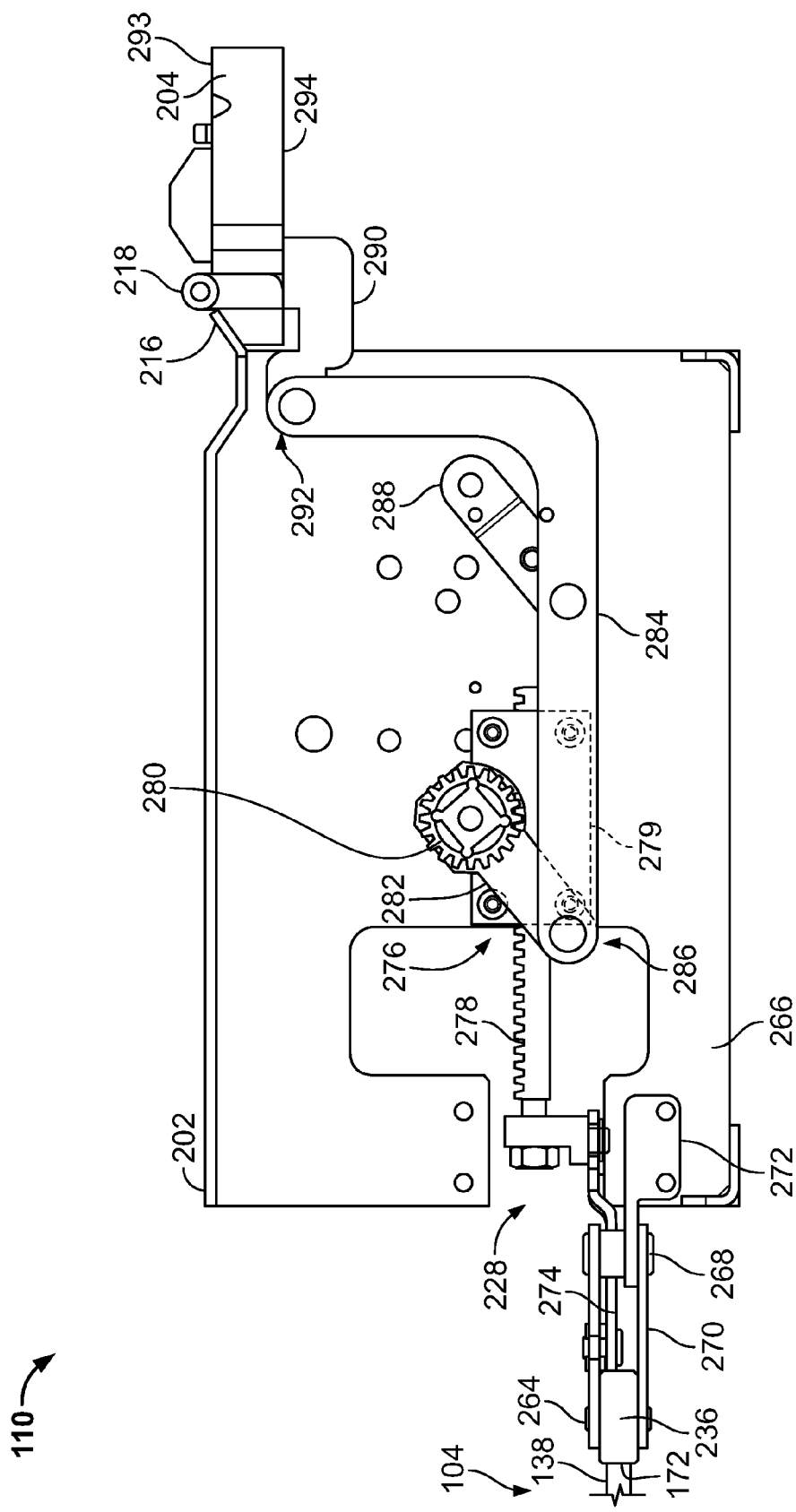
FIG. 19 is a partial side view of an exemplary platform assembly including components for actuating an exemplary platform assembly into a first fold position of an exemplary multi-stage rotary food product folder apparatus of FIG. 18.
Figure 20:
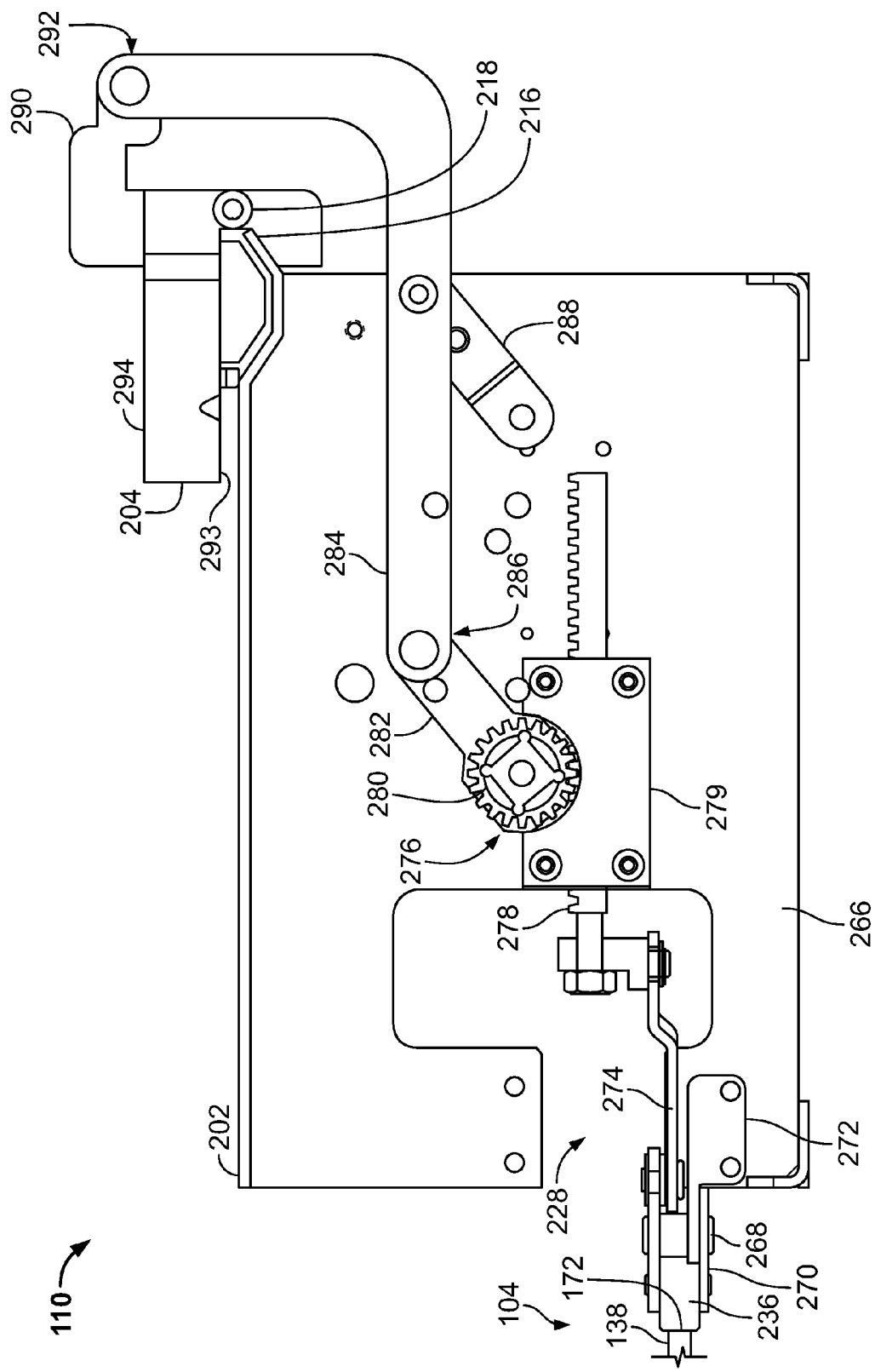
FIG. 20 is a partial side view of an exemplary platform assembly including components actuating an exemplary platform assembly into a first fold position of an exemplary multi-stage rotary food product folder apparatus of FIG. 18.
Figure 21:
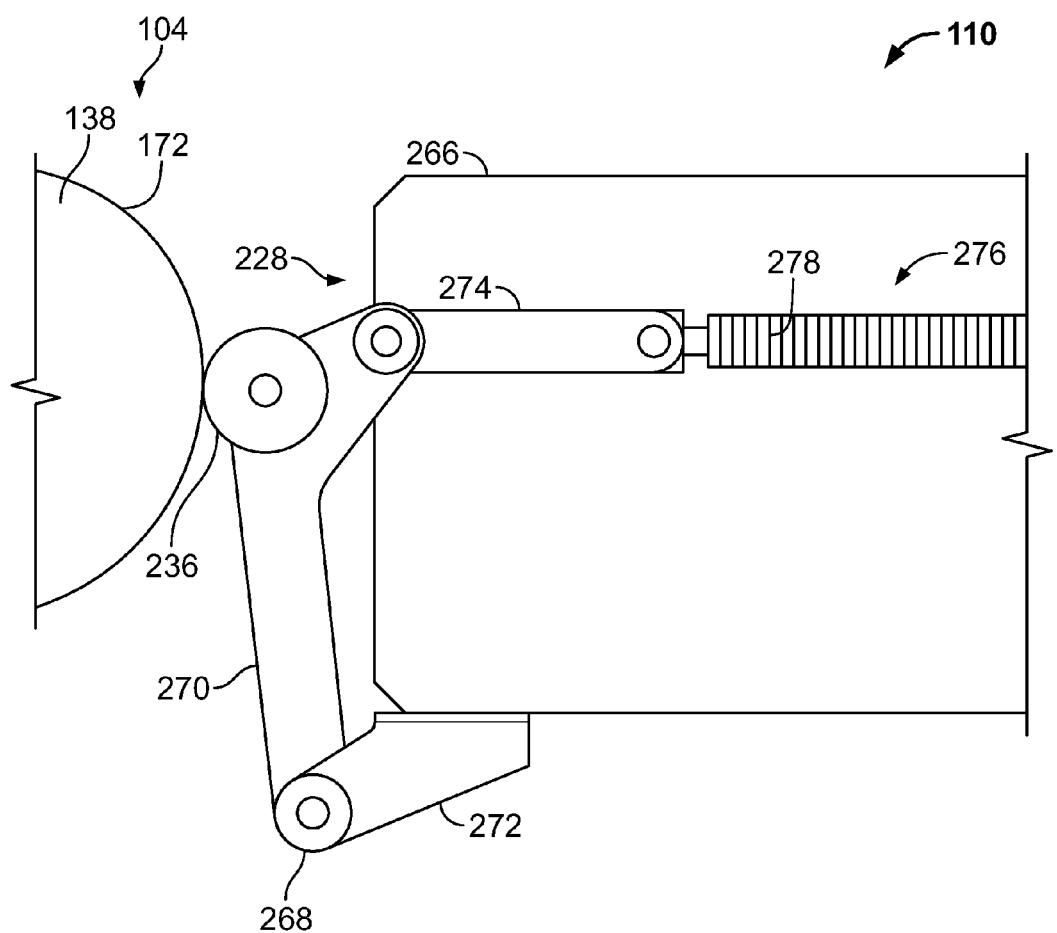
FIG. 21 is a detailed, partial top view of an exemplary platform assembly actuated by an exemplary cam system into a first fold position of an exemplary multi-stage rotary food product folder apparatus of FIG. 18.

As will be discussed in greater detail below with respect to FIG. 37, upon placement of, e.g., a tortilla, on the platform assembly 110 and dispensing of a food filling onto the tortilla at the first and second stations 115a, 115b, the upper platform 112 and the platform assemblies 110 can be indexed approximately sixty degrees to the third station 115c for creation of the first fold. Turning to FIGS. 18-21, an exemplary platform assembly 110 actuated into a first fold position at a third station 115c is provided. In particular, FIG. 18 shows a top view of the platform assembly 110 actuated into a first fold position. For clarity, FIGS. 19-21 show side and detailed views of the platform assembly 110 prior to and post-actuation into a first fold position including the components of the first actuating mechanism 228. However, it should be understood that the platform assembly 110 also includes the components for the second, third and fourth actuating mechanisms 230, 232, 234.

With respect to FIG. 18, the first actuating mechanism 228 is illustrated as actuated or engaged by the first cam 138. In particular, as the upper platform 112 and the platform assembly 110 are rotated about the central vertical axis $A_1$, the roller 236 can ride along the edge 172 of the fixed and asymmetrical first cam 138. When the platform assembly 110 is repositioned adjacent to the extending portion of the first cam 138, the first cam 138 can actuate the first actuating mechanism 228 through the roller 236 to position the first flap 204 of the platform assembly 110 into a first fold position, e.g., a top fold. As the platform assembly 110 is rotated into the third station 115c, the first cam 138 can gradually actuate the first actuating mechanism 228 to regulate the folding action of the food product. Optionally, as the platform assembly 110 is rotated into the third station 115c and the first flap 204 is repositioned into a first fold position, a hard press roller 198 of the hard press 106a of the third station 115c can be provided so as to roll over and provide pressure against the first flap 204. For example, the food product can be positioned on top of and in contact with a top surface 293 (see, e.g., FIG. 19) of the first flap 204. During creation of the first fold, the top surface 293 of the first flap 204 can remain in contact with the food product, while the hard press roller 198 can contact an opposing bottom surface 294 of the first flap 204. Thus, in some embodiments, the hard press roller 198 can assist in imparting a reinforcing folding or closing force against the first flap 204 to ensure that the food product can be properly folded.

In some embodiments, rather than providing pressure directly against the first flap 204 of the platform assembly 110, the first flap 204 of the platform assembly 110 can include a wearable block against which the hard press roller 198 can provide pressure (not shown). For example, the wearable block can allow wear over time and the springs 192 of the hard press 106a can maintain the desired pressure against the wearable block. In some embodiments, the wearable block can be interchangeable such that a wearable block of a different height can be utilized to regulate the amount of pressure imparted by the hard press roller 198 against the first flap 204 of the platform assembly 110, e.g., depending on the type of food product fold desired. In some embodiments, the wearable block can include a lead-in ramp on one or more sides to assist in receiving the hard press roller 198 thereon.

FIG. 19 shows a partial side view of the platform assembly 110 with the first actuating mechanism 228 in a non-actuated position, e.g., prior to actuation of the first flap 204 into a first fold position. The first actuating mechanism 228 includes the roller 236 rotatably connected to a shaft 264 such that the roller 236 can ride along the edge 172 of the first cam 138 as the upper platform 112 rotates about the central vertical axis $A_1$. The roller 236 can be hingedly connected to the frame 266 of the platform assembly 110 via a hinge 268, with a linkage 270 connecting the roller 236 to the hinge 268 and a linkage 272 connecting the hinge 268 to the frame 266. A linkage 274 can further connect the roller 236 to a rack and pinion mechanism 276.

The rack and pinion mechanism 276 can include a linear gear bar 278, e.g., a rack, a gear 280, e.g., a pinion, and a track 279 for aligning translation of the linear gear bar 278. The rack and pinion mechanism 276 can be utilized to convert linear motion of the linkage 274 into rotational motion. In particular, the linear gear bar 278 can be fixedly attached to the linkage 274 such that translation of the linkage 274 upon actuation by the first cam 138 simultaneously translates the linear gear bar 278. The gear 280 can be rotatably secured to the frame 266 and the teeth of the gear 280 can be engaged with the teeth of the linear gear bar 278 such that translation of the linear gear bar 278 causes rotation of the gear 280. A linkage 282 can be fixedly connected to the gear 280 at one end and hingedly connected to a proximal end 286 of an L-shaped linkage 284 at the opposing end. A linkage 288 substantially similar in configuration to the linkage 282 can further hingedly connect at one end to the L-shaped linkage 284 at a point spaced from the proximal end 286 and hingedly connect to the frame 266 at an opposing end. A linkage 290 can further hingedly connect to a distal end 292 of the L-shaped linkage 284 at one end and hingedly connect to a bottom surface 294 of the first flap 204 at an opposing end.

During rotation of the platform assembly 110 around the base curvature of the first cam 138, the roller 236 can ride along the edge 172 of the first cam 138 without actuation of the first actuating mechanism 228. With reference to FIGS. 20 and 21, upon rotation of the platform assembly 110 such that the roller 236 is positioned along the extended portion of the asymmetrical first cam 138, the roller 236 and the linkage 274 can be rotated about the hinge 268 such that the linkage 274 and the linear gear bar 278 are linearly translated in the direction of the first flap 204. Linear translation of the linear gear bar 278 can, in turn, force the gear 280 to rotate in a counter-clockwise direction. Rotation of the gear 280 can further force the linkage 282 to rotate in a counter-clockwise direction which, in turn, actuates the L-shaped linkage 284 and the linkage 290 to rotate, thereby repositioning the first flap 204 from an unfolded position to a first fold position. In particular, the first flap 204 can be actuated by the linkage 290 to rotate about the hinge 218 into a first fold position. The first flap 204 can thereby form a top fold of the food product at the third station 115c.

When the upper platform 112 and the platform assembly 110 are rotated about the central vertical axis $A_1$ to the fourth station 115d, the roller 236 can ride along the edge 172 of the first cam 138 away from the extended portion of the first cam 138. In some embodiments, a return spring (not shown) located at the hinge 268 can create a bias force to translate the linkage 274 into a non-actuated position. In particular, the spring can be biased when the first flap 204 is in a first fold position and unbiased when the first flap 204 is in an unfolded position. The spring can thereby translate the linear gear bar 278 away from the first flap 204, causing the L-shaped linkage 284 and the linkage 290 to rotate into the non-actuated position. Rotation of the linkage 290 into the non-actuated position, in turn, rotates the first flap 204 about the hinge 218 from a first fold position into a substantially coplanar position relative to the top surface 202. In some embodiments, rather than or in combination with the return spring, the roller 236 of the platform assembly 110 can be connected to the edge 172 of the first cam 138 such that the first cam 138 can push on the roller 236 to actuate the first actuating mechanism 228 and pull on the roller 236 to rotate the first flap 204 into a substantially coplanar position relative to the top surface 202 (not shown).

Figure 22:
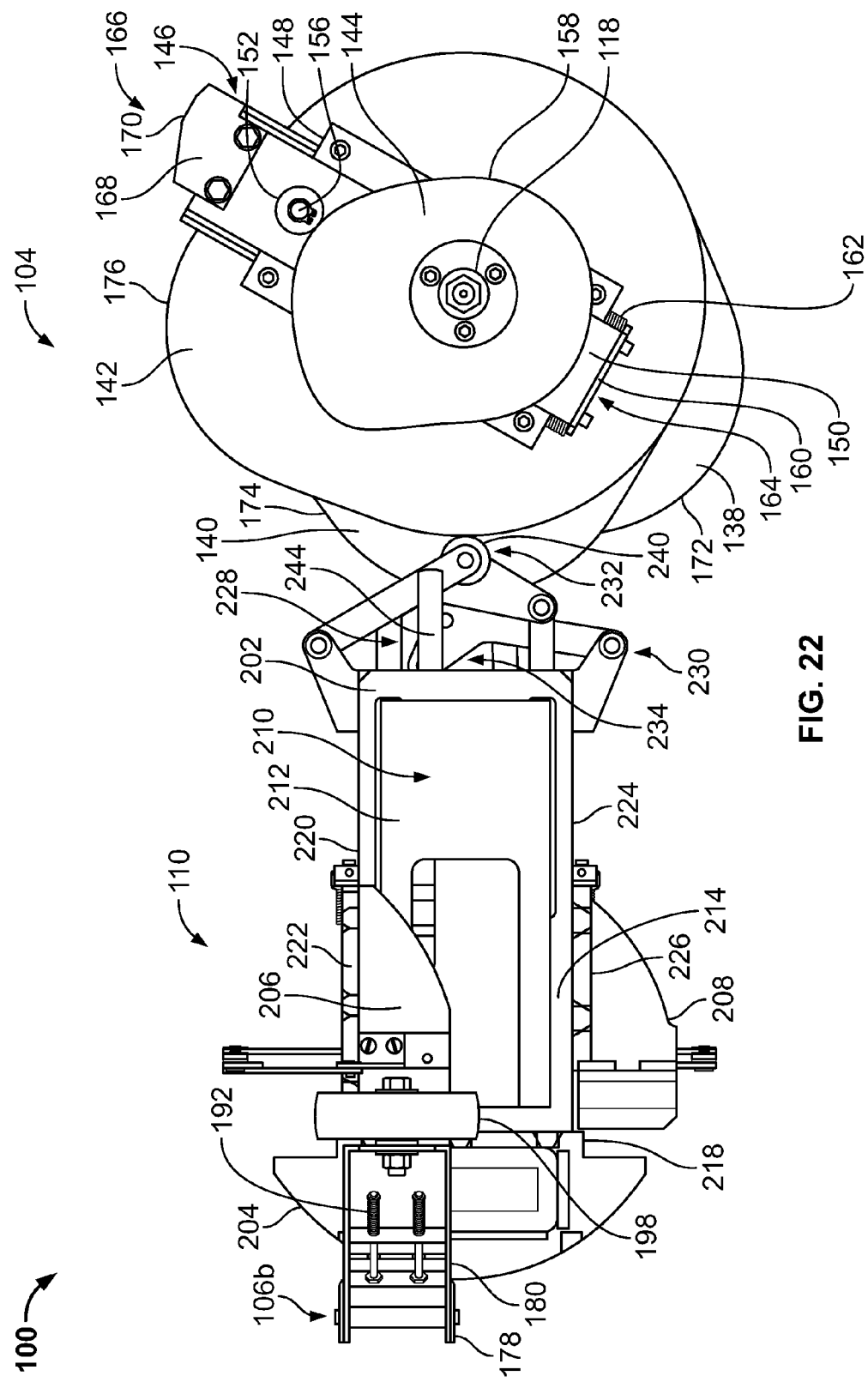
FIG. 22 is a top view of an exemplary platform assembly actuated into a second fold position by an exemplary cam system of an exemplary multi-stage rotary food product folder apparatus of FIGS. 3-5.
Figure 23:
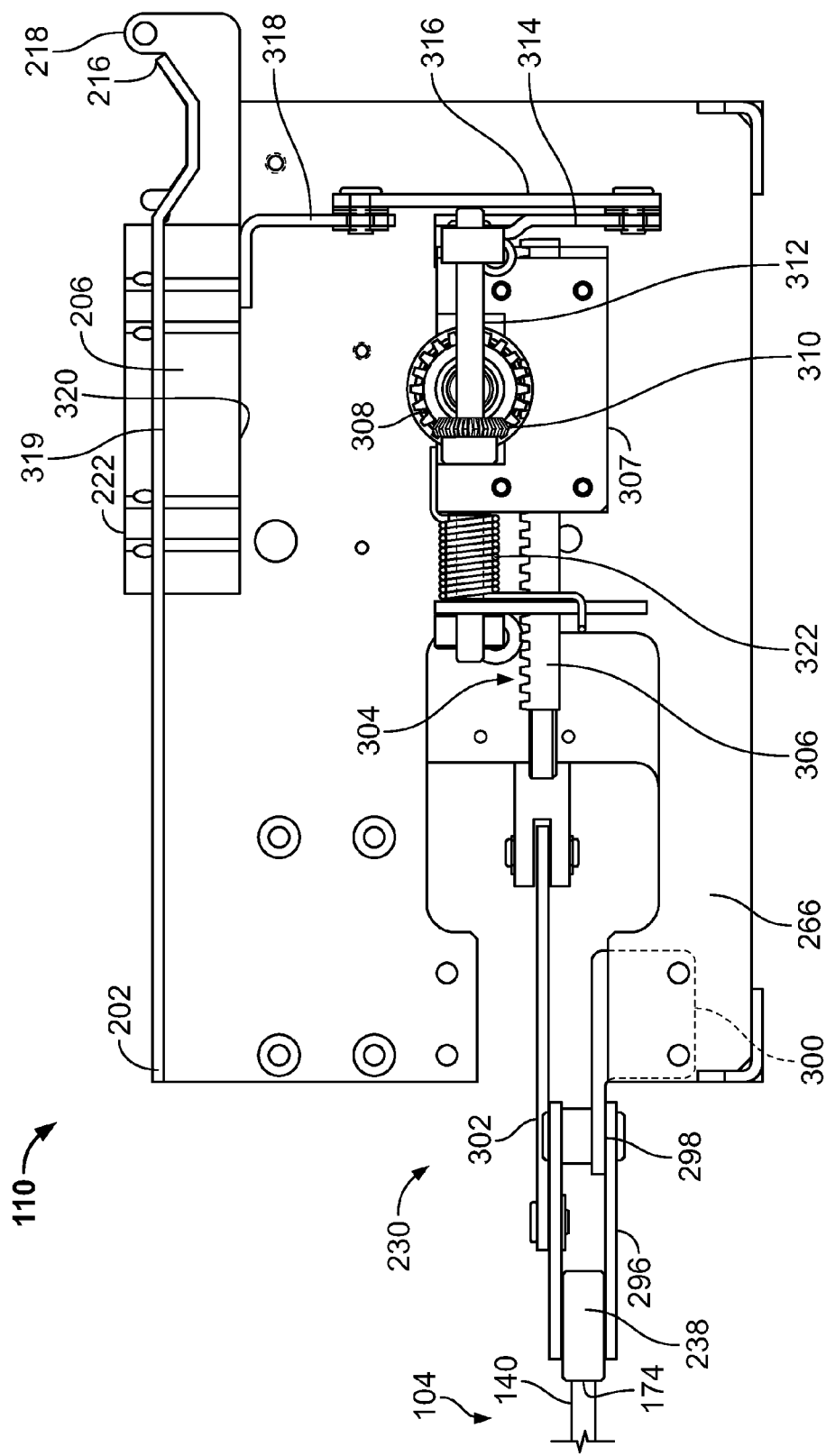
FIG. 23 is a partial side view of an exemplary platform assembly including components for actuating an exemplary platform assembly into a second fold position of an exemplary multi-stage rotary food product folder apparatus of FIG. 22.
Figure 24:
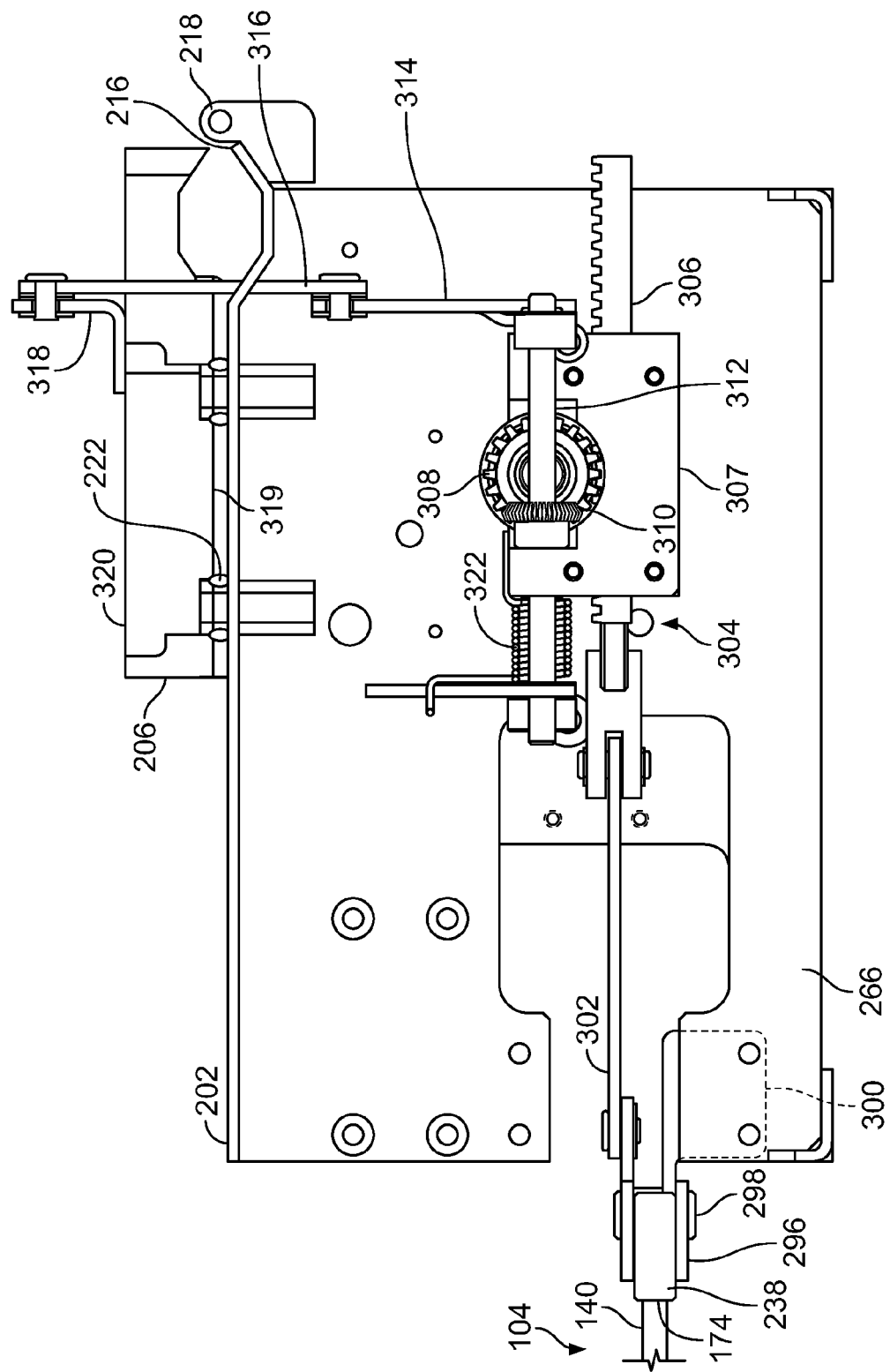
FIG. 24 is a partial side view of an exemplary platform assembly including components actuating an exemplary platform assembly into a second fold position of an exemplary multi-stage rotary food product folder apparatus of FIG. 22.
Figure 25:
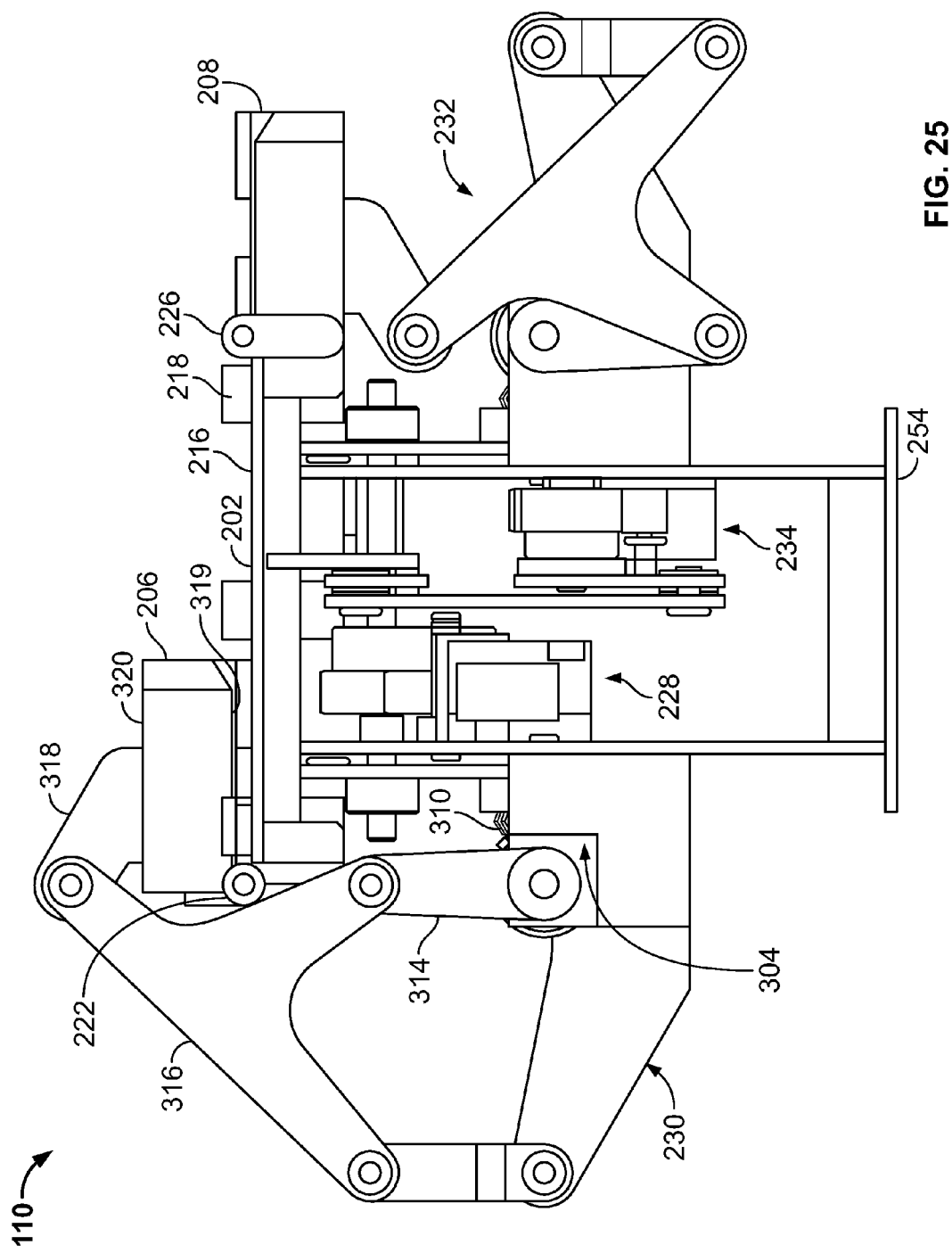
FIG. 25 is a front view of an exemplary platform assembly including components actuating an exemplary platform assembly into a second fold position of an exemplary multi-stage rotary food product folder apparatus of FIG. 22.
Figure 26:
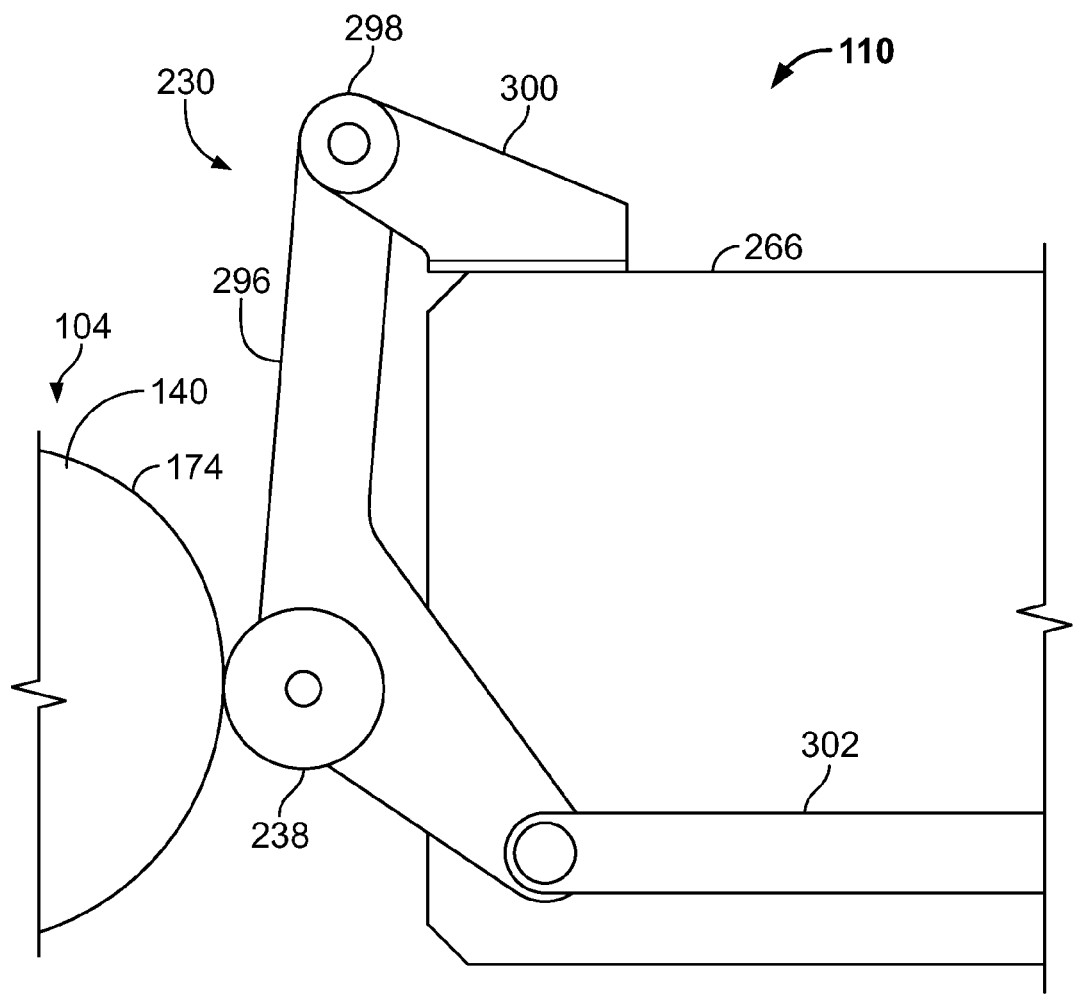
FIG. 26 is a detailed, partial top view of an exemplary platform assembly actuated by an exemplary cam system into a second fold position of an exemplary multi-stage rotary food product folder apparatus of FIG. 22.

As will be discussed in greater detail below with respect to FIG. 37, upon placement of, e.g., a tortilla, on the platform assembly 110, dispensing of a food filling onto the tortilla, and creation of the first fold at the first, second and third stations 115a, 115b, 115c, the upper platform 112 and the platform assemblies 110 can be indexed approximately sixty degrees to the fourth station 115d for creation of the second fold. Turning to FIGS. 22-26, an exemplary platform assembly 110 actuated into a second fold position at a fourth station 115d is provided. In particular, FIG. 22 shows a top view of the platform assembly 110 actuated into a second fold position. For clarity, FIGS. 23, 24 and 26 show side and detailed views of the platform assembly 110 prior to and post-actuation into a second fold position including the components of the second actuating mechanism 230. However, it should be understood that the platform assembly 110 also includes the components of the first, third and fourth actuating mechanisms 228, 232, 234. FIG. 25 shows a front view of the platform assembly 110 including the components of the first, second, third and fourth actuating mechanisms 228, 230, 232, 234.

With respect to FIG. 22, the second actuating mechanism 230 is illustrated as actuated or engaged by the second cam 140. In particular, as the upper platform 112 and the platform assembly 110 are rotated about the central vertical axis $A_1$, the roller 238 (see, e.g., FIG. 23) of the second actuating mechanism 230 can ride along the edge 174 of the fixed and asymmetrical second cam 140. When the platform assembly 110 is repositioned adjacent to the extending portion of the second cam 140, the second cam 140 can actuate the second actuating mechanism 230 through the roller 238 to position the second flap 206 of the platform assembly 110 into a second fold position, e.g., a right side fold. As the platform assembly 110 is rotated into the fourth station 115d, the second cam 140 can gradually actuate the second actuating mechanism 230 to regulate the folding action of the food product. Optionally, as the platform assembly 110 is rotated into the fourth station 115d and the second flap 206 is repositioned into a second fold position, a hard press roller 198 of the hard press 106b of the fourth station 115d can be provided so as to roll over and provide pressure against the second flap 206. For example, the food product can be positioned on top of and in contact with a top surface 319 (see, e.g., FIG. 23) of the second flap 206. During creation of the second fold, the top surface 319 of the second flap 206 can remain in contact with the food product, while the hard press roller 198 can contact an opposing bottom surface 320 of the second flap 206. Thus, in some embodiments, the hard press roller 198 can assist in imparting a folding or closing force against the second flap 206 to ensure that the food product can be properly folded.

In some embodiments, rather than providing pressure directly against the second flap 206 of the platform assembly 110, the second flap 206 of the platform assembly 110 can include a wearable block against which the hard press roller 198 can provide pressure (not shown). For example, the wearable block can allow wear over time and the springs 192 of the hard press 106b can maintain the desired pressure against the wearable block. In some embodiments, the wearable block can be interchangeable such that a wearable block of a different height can be utilized to regulate the amount of pressure imparted by the hard press roller 198 against the second flap 206 of the platform assembly 110, e.g., depending on the type of food product fold desired. In some embodiments, the wearable block can include a lead-in ramp on one or more sides to assist in receiving the hard press roller 198 thereon.

FIG. 23 shows a partial side view of the platform assembly 110 with the second actuating mechanism 230 in a non-actuated position, e.g., prior to actuation of the second flap 206 into a second fold position. The second actuating mechanism 230 includes the roller 238 rotatably connected to a linkage 296 such that the roller 238 can ride along the edge 174 of the second cam 140 as the upper platform 112 rotates about the central vertical axis $A_1$. The roller 238 can be hingedly connected to the frame 266 of the platform assembly 110 via a hinge 298, with the linkage 296 connecting the roller 238 to the hinge 298 and a linkage 300 connecting the hinge 298 to the frame 266. A linkage 302 can further connect the roller 238 to a rack and pinion mechanism 304.

The rack and pinion mechanism 304 can include a linear gear bar 306, e.g., a rack, a gear 308, e.g., a pinion, and a track 307 for aligning translation of the linear gear bar 306. The rack and pinion mechanism 304 can be utilized to convert linear motion of the linkage 302 into rotational motion. In particular, the linear gear bar 306 can be fixedly attached to the linkage 302 such that translation of the linkage 302 upon actuation by the second cam 140 simultaneously translates the linear gear bar 306. The gear 308 can be rotatably secured to the frame 266 and the teeth of the gear 308 can be engaged with the teeth of the linear gear bar 306 such that translation of the linear gear bar 306 causes rotation of the gear 308. A gear 310 can be fixedly secured to a rod 312 and the teeth of the gear 310 can be engaged with the teeth of the gear 308. Thus, rotation of the gear 308 can cause rotation of the gear 310. A linkage 314 can be hingedly connected at one end to the rod 312 and hingedly connected at an opposing end to a linkage 316. The linkage 316 can be hingedly connected at one end to the linkage 314 and hingedly connected at an opposing end to a linkage 318. The linkage 318 can, in turn, be hingedly connected at one end to the linkage 316 and fixedly connected to a bottom surface 320 of the second flap 206.

During rotation of the platform assembly 110 around the base curvature of the second cam 140, the roller 238 can ride along the edge 174 of the second cam 140 without actuation or engagement of the second actuating mechanism 230. With reference to FIGS. 24-26, upon rotation of the platform assembly 110 such that the roller 238 is positioned along the extended portion of the asymmetrical second cam 140, the roller 238 and the linkage 302 can be rotated about the hinge 298 such that the linkage 302 and the linear gear bar 306 are linearly translated in the direction of the hinge 218. Linear translation of the linear gear bar 306 can, in turn, force the gear 308 to rotate in a counter-clockwise direction. Rotation of the gear 308 can further force rotation of the gear 310 which, in turn, actuates the rod 312 and the linkages 314, 316, 318 to rotate, thereby repositioning the second flap 206 from an unfolded position to a second fold position. In particular, the second flap 206 can be actuated by the linkage 318 to rotate about the hinge 222 into a second fold position. The second flap 206 can thereby form a left side fold of the food product at the fourth station 115d.

When the upper platform 112 and the platform assembly 110 are rotated about the central vertical axis $A_1$ to the fifth station 115e, the roller 238 can ride along the edge 174 of the second cam 140 away from the extended portion of the second cam 140. In some embodiments, a return spring 322 positioned around the rod 312 can create a bias force to rotate the rod 312 in a direction opposing actuation of the second flap 206. In particular, the spring 322 can be biased when the second flap 206 is in a second fold position and unbiased when the second flap 206 is in an unfolded position. The bias force of the spring 322 can thereby rotate the gear 310 such that the gear 308 rotates in a clockwise direction, further translating the linear gear bar 306 away from the hinge 218 and causing the linkages 314, 316, 318 to rotate into the non-actuated position. Rotation of the linkages 314, 316, 318 into the non-actuated position, in turn, rotates the second flap 206 about the hinge 222 from a second fold position into a substantially coplanar position relative to the top surface 202. In some embodiments, rather than or in combination with the return spring 322, the roller 238 of the platform assembly 110 can be connected to the edge 174 of the second cam 140 such that the second cam 140 can push on the roller 238 to actuate or engage the second actuating mechanism 230 and pull on the roller 238 to rotate the second flap 206 into a substantially coplanar position relative to the top surface 202 (not shown).

Figure 27:
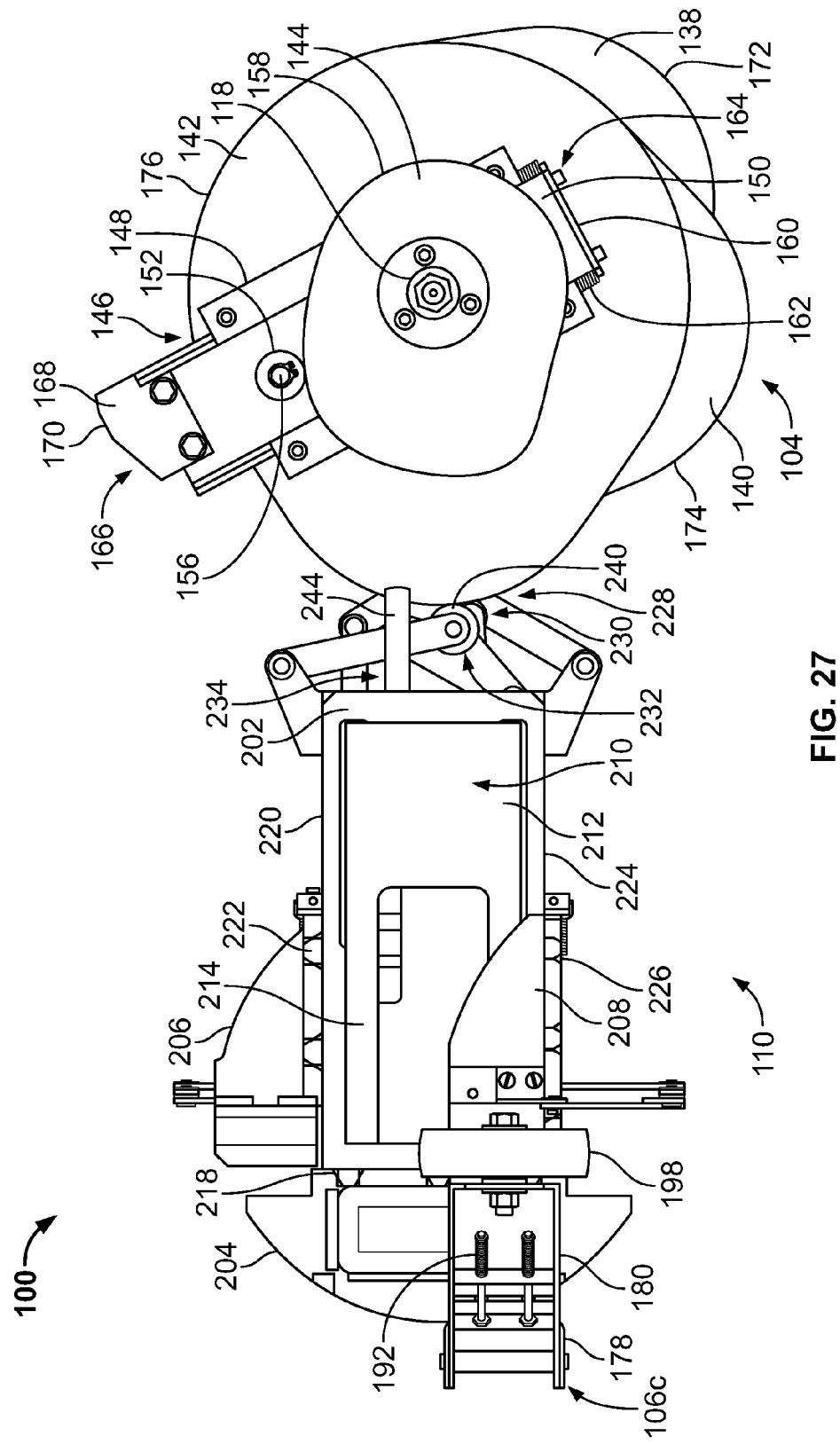
FIG. 27 is a top view of an exemplary platform assembly actuated into a third fold position by an exemplary cam system of an exemplary multi-stage rotary food product folder apparatus of FIGS. 3-5.
Figure 28:
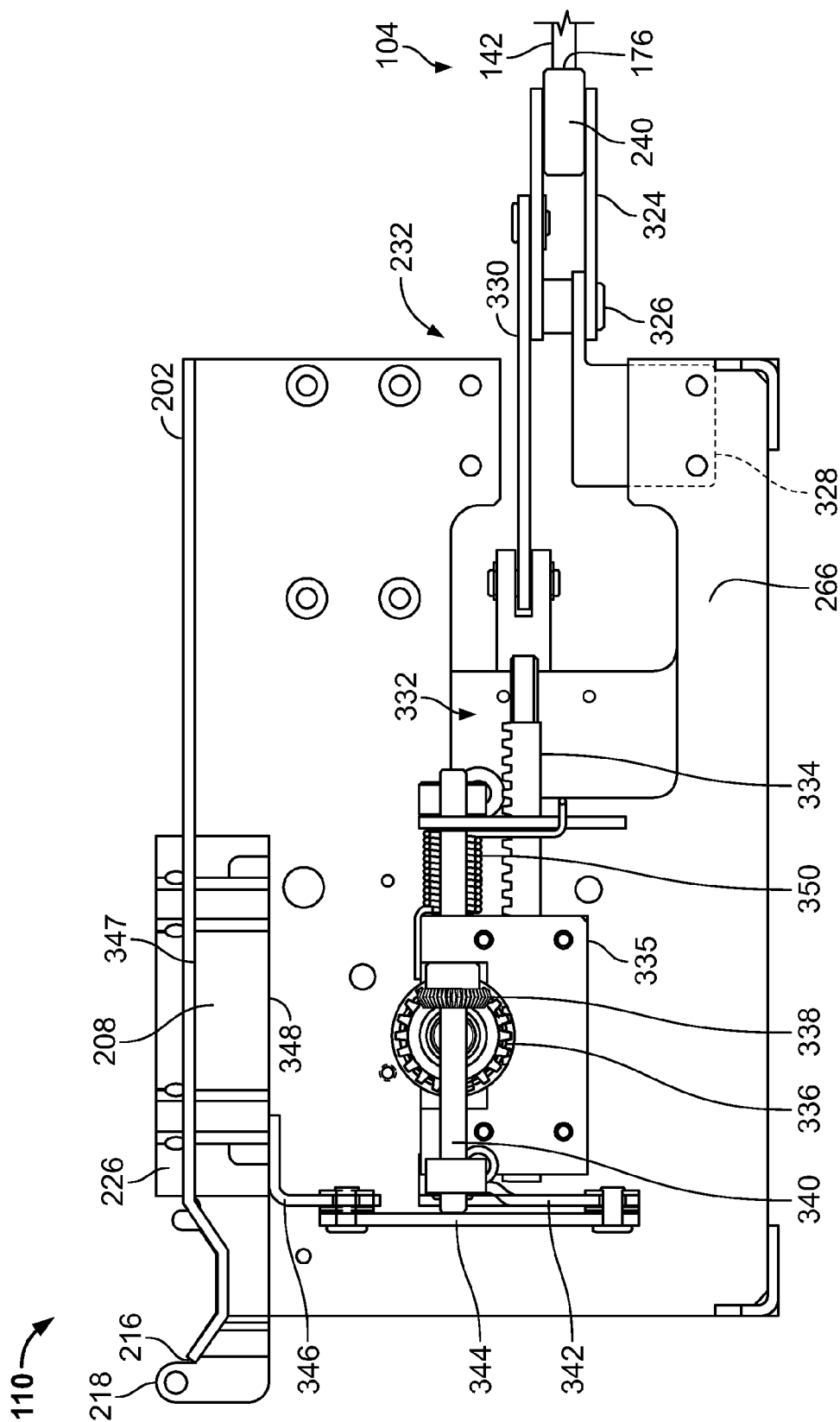
FIG. 28 is a partial side view of an exemplary platform assembly including components for actuating an exemplary platform assembly into a third fold position of an exemplary multi-stage rotary food product folder apparatus of FIG. 27.
Figure 29:
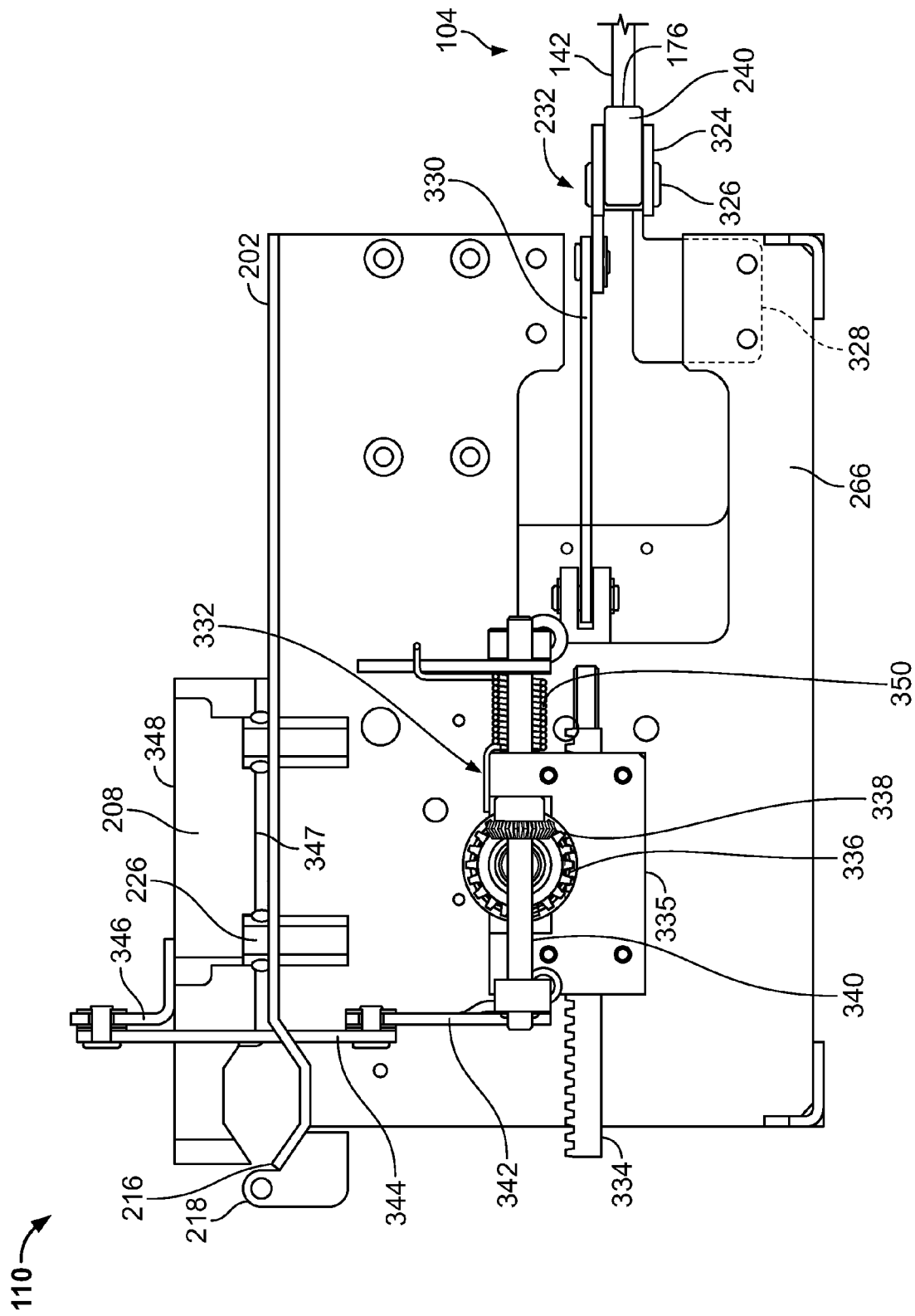
FIG. 29 is a partial side view of an exemplary platform assembly including components actuating an exemplary platform assembly into a second fold position of an exemplary multi-stage rotary food product folder apparatus of FIG. 27.
Figure 30:
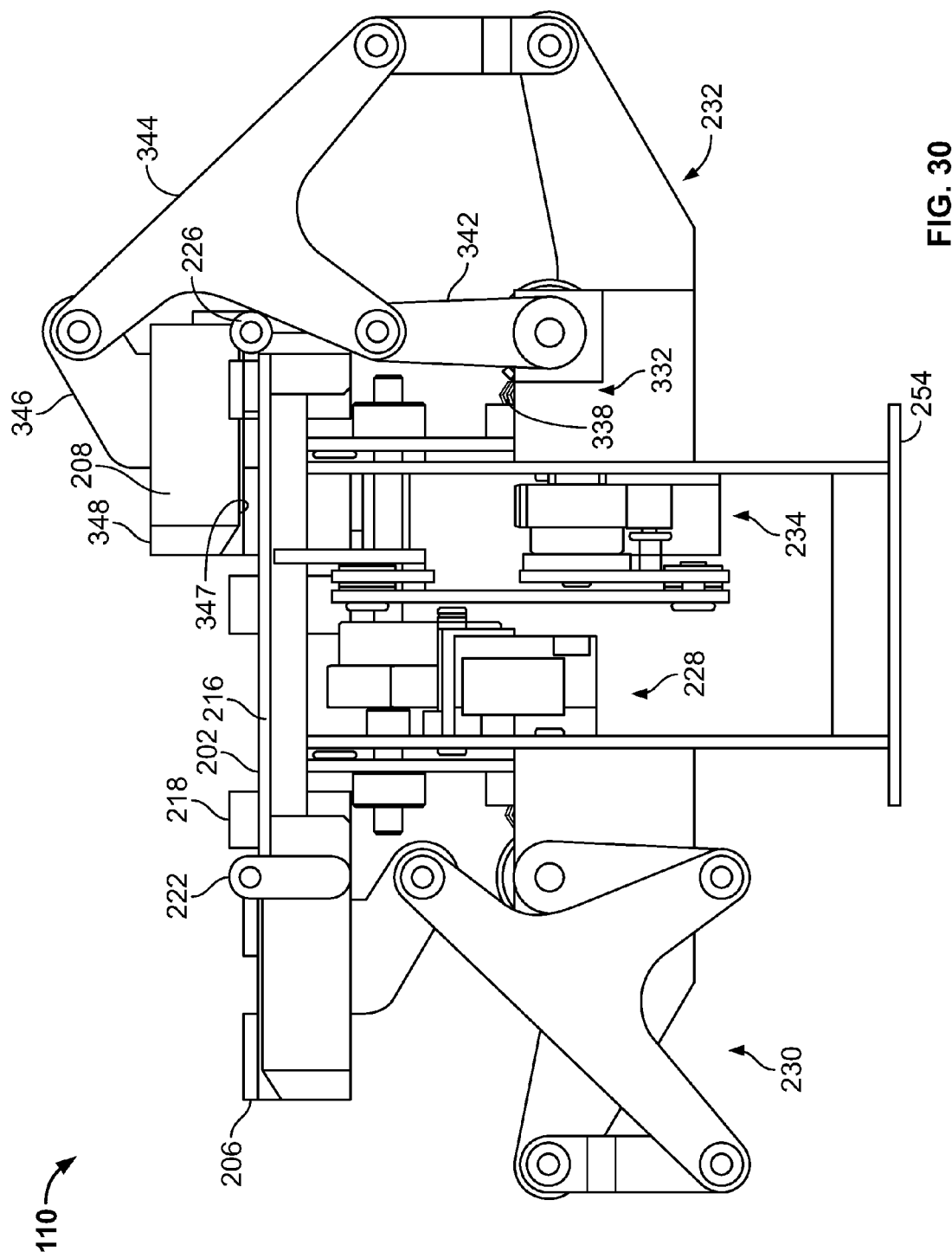
FIG. 30 is a front view of an exemplary platform assembly including components actuating an exemplary platform assembly into a third fold position of an exemplary multi-stage rotary food product folder apparatus of FIG. 27.
Figure 31:
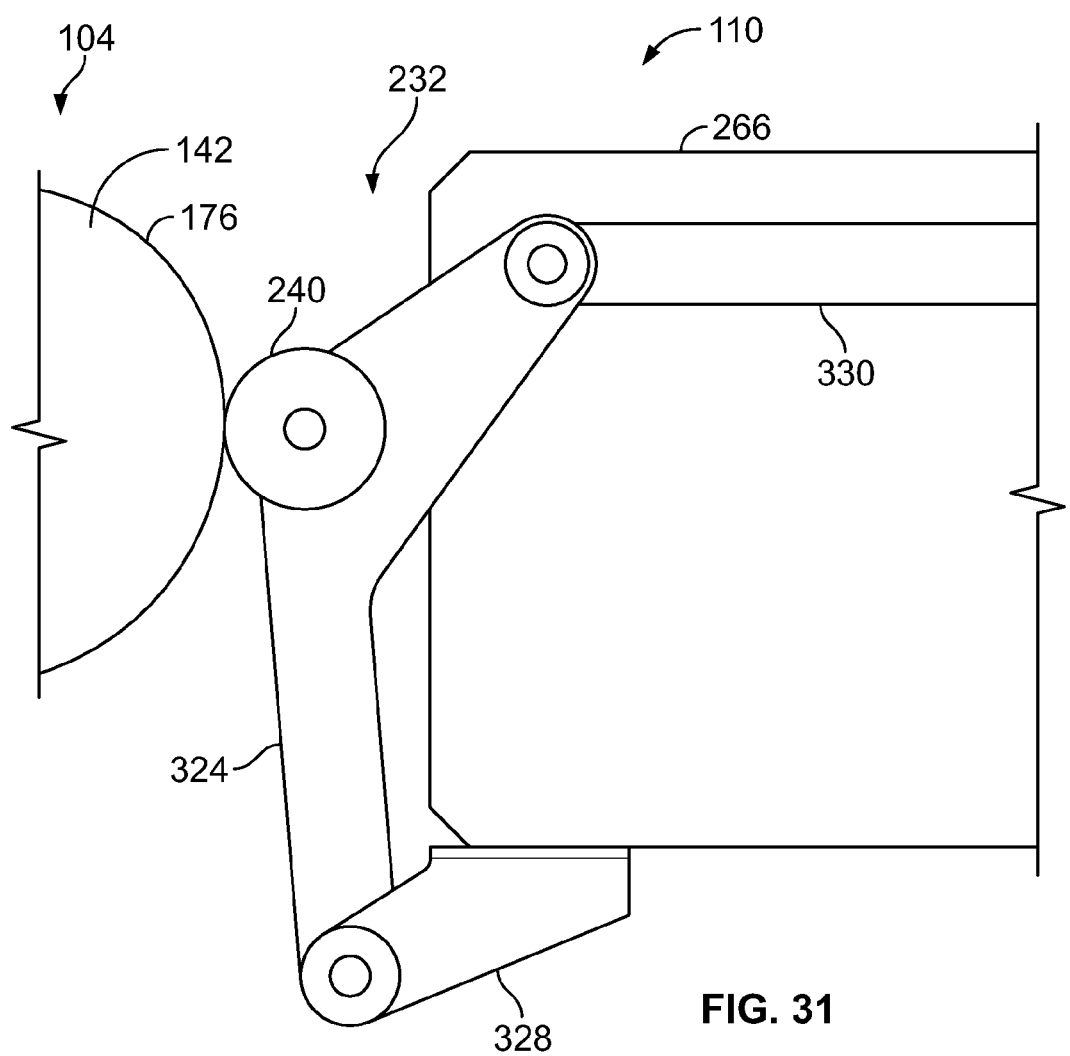
FIG. 31 is a detailed, partial top view of an exemplary platform assembly actuated by an exemplary cam system in a third fold position of an exemplary multi-stage rotary food product folder apparatus of FIG. 27.

As will be discussed in greater detail below with respect to FIG. 37, upon placement of, e.g., a tortilla, on the platform assembly 110, dispensing of a food filling onto the tortilla, and creation of the first and second folds at the first, second, third and fourth stations 115a, 115b, 115c, 115d, the upper platform 112 and the platform assemblies 110 can be indexed approximately sixty degrees to the fifth station 115e for creation of the third fold. Turning to FIGS. 27-31, an exemplary platform assembly 110 actuated into a third fold position at a fifth station 115e is provided. In particular, FIG. 27 shows a top view of the platform assembly 110 actuated into a third fold position. For clarity, FIGS. 28, 29 and 31 show side and detailed views of the platform assembly 110 prior to and post-actuation into a third fold position including the components of the third actuating mechanism 232. However, it should be understood that the platform assembly 110 also includes the components of the first, second and fourth actuating mechanisms 228, 230, 234. FIG. 30 shows a front view of the platform assembly 110 including the components of the first, second, third and fourth actuating mechanisms 228, 230, 232, 234.

With respect to FIG. 27, the third actuating mechanism 232 is illustrated as actuated or engaged by the third cam 142. In particular, as the upper platform 112 and the platform assembly 110 are rotated about the central vertical axis $A_1$, the roller 240 of the third actuating mechanism 232 can ride along the edge 176 of the fixed and asymmetrical third cam 142. When the platform assembly 110 is repositioned adjacent to the extending portion of the third cam 142, the third cam 142 can actuate the third actuating mechanism 232 through the roller 240 to position the third flap 208 of the platform assembly 110 into a third fold position, e.g., a left side fold. As the platform assembly 110 is rotated into the fifth station 115e, the third cam 142 can gradually actuate the third actuating mechanism 232 to regulate the folding action of the food product. Optionally, as the platform assembly 110 is rotated into the fifth station 115e and the third flap 208 is repositioned into a third fold position, the hard press roller 198 of the hard press 106c of the fifth station 115e can roll over and provide pressure against the third flap 208. For example, the food product can be positioned on top of and in contact with a top surface 347 (see, e.g., FIG. 28) of the third flap 208. During creation of the third fold, the top surface 347 of the third flap 208 can remain in contact with the food product, while the hard press roller 198 can contact an opposing bottom surface 348 of the third flap 208. Thus, in some embodiments, the hard press roller 198 can assist in imparting a folding or closing force against the third flap 208 to ensure that the food product can be properly folded.

In some embodiments, rather than providing pressure directly against the third flap 208 of the platform assembly 110, the third flap 208 of the platform assembly 110 can include a wearable block against which the hard press roller 198 can provide pressure (not shown). For example, the wearable block can allow wear over time and the springs 192 of the hard press 106c can maintain the desired pressure against the wearable block. In some embodiments, the wearable block can be interchangeable such that a wearable block of a different height can be utilized to regulate the amount of pressure imparted by the hard press roller 198 against the third flap 208 of the platform assembly 110, e.g., depending on the type of food product fold desired. In some embodiments, the wearable block can include a lead-in ramp on one or more sides to assist in receiving the hard press roller 198 thereon.

FIG. 28 shows a partial side view of the platform assembly 110 with the third actuating mechanism 232 in a non-actuated position, e.g., prior to actuation of the third flap 208 into a third fold position. The third actuating mechanism 232 includes the roller 240 rotatably connected to a linkage 324 such that the roller 240 can ride along the edge 176 of the third cam 142 as the upper platform 112 rotates about the central vertical axis $A_1$. The roller 240 can be hingedly connected to the frame 266 of the platform assembly 110 via a hinge 326, with the linkage 324 connecting the roller 240 to the hinge 326 and a linkage 328 connecting the hinge 326 to the frame 266. A linkage 330 can further connect the roller 240 to a rack and pinion mechanism 332.

The rack and pinion mechanism 332 can include a linear gear bar 334, e.g., a rack, a gear 336, e.g., a pinion, and a track 335 for aligning translation of the linear gear bar 334. The rack and pinion mechanism 332 can utilized to convert linear motion of the linkage 330 into rotational motion. In particular, the linear gear bar 334 can be fixedly attached to the linkage 330 such that translation of the linkage 330 upon actuation by the third cam 142 simultaneously translates the linear gear bar 334. The gear 336 can be rotatably secured to the frame 266 and the teeth of the gear 336 can be engaged with the teeth of the linear gear bar 334 such that translation of the linear gear bar 334 causes rotation of the gear 336. A gear 338 can be fixedly secured to a rod 340 and the teeth of the gear 338 can be engaged with the teeth of the gear 336. Thus, rotation of the gear 336 can cause rotation of the gear 338. A linkage 342 can be hingedly connected at one end to the rod 340 and hingedly connected at an opposing end to a linkage 344. The linkage 344 can be hingedly connected at one end to the linkage 342 and hingedly connected at an opposing end to a linkage 346. The linkage 346 can, in turn, be hingedly connected at one end to the linkage 344 and fixedly connected to a bottom surface 348 of the third flap 208.

During rotation of the platform assembly 110 around the base curvature of the third cam 142, the roller 240 can ride along the edge 176 of the third cam 142 without actuation or engagement of the third actuating mechanism 232. With reference to FIGS. 29-31, upon rotation of the platform assembly 110 such that the roller 240 is positioned along the extended portion of the asymmetrical third cam 142, the roller 240 and the linkage 330 can be rotated about the hinge 326 such that the linkage 330 and the linear gear bar 334 are linearly translated in the direction of the hinge 218. Linear translation of the linear gear bar 334 can, in turn, force the gear 336 to rotate in a clockwise direction. Rotation of the gear 336 can further force rotation of the gear 338 which, in turn, actuates the rod 340 and the linkages 342, 344, 346 to rotate, thereby repositioning the third flap 208 from an unfolded position to a third fold position. In particular, the third flap 208 can be actuated by the linkage 346 to rotate about the hinge 226 into a second fold position. The third flap 208 can thereby form a right side fold of the food product at the fifth station 115e.

When the upper platform 112 and the platform assembly 110 are rotated about the central vertical axis $A_1$ to the sixth station 115f, the roller 240 can ride along the edge 176 of the third cam 142 away from the extended portion of the third cam 142. In some embodiments, a return spring 350 positioned around the rod 340 can create a bias force to rotate the rod 340 in a direction opposing actuation of the third flap 208. In particular, the spring 350 can be biased when the third flap 208 is in a third fold position and unbiased when the third flap 208 is in an unfolded position. The bias force of the spring 350 can thereby rotate the gear 338 such that the gear 336 rotates in a counter-clockwise direction, further translating the linear gear bar 334 away from the hinge 218 and causing the linkages 342, 344, 346 to rotate into the non-actuated position. Rotation of the linkages 342, 344, 346 into the non-actuated position, in turn, rotates the third flap 208 about the hinge 226 from a third fold position into a substantially coplanar position relative to the top surface 202. In some embodiments, rather than or in combination with the return spring 350, the roller 240 of the platform assembly 110 can be connected to the edge 176 of the third cam 142 such that the third cam 142 can push on the roller 240 to actuate the third actuating mechanism 232 and pull on the roller 240 to rotate the third flap 208 into a substantially coplanar position relative to the top surface 202 (not shown).

Figure 32:
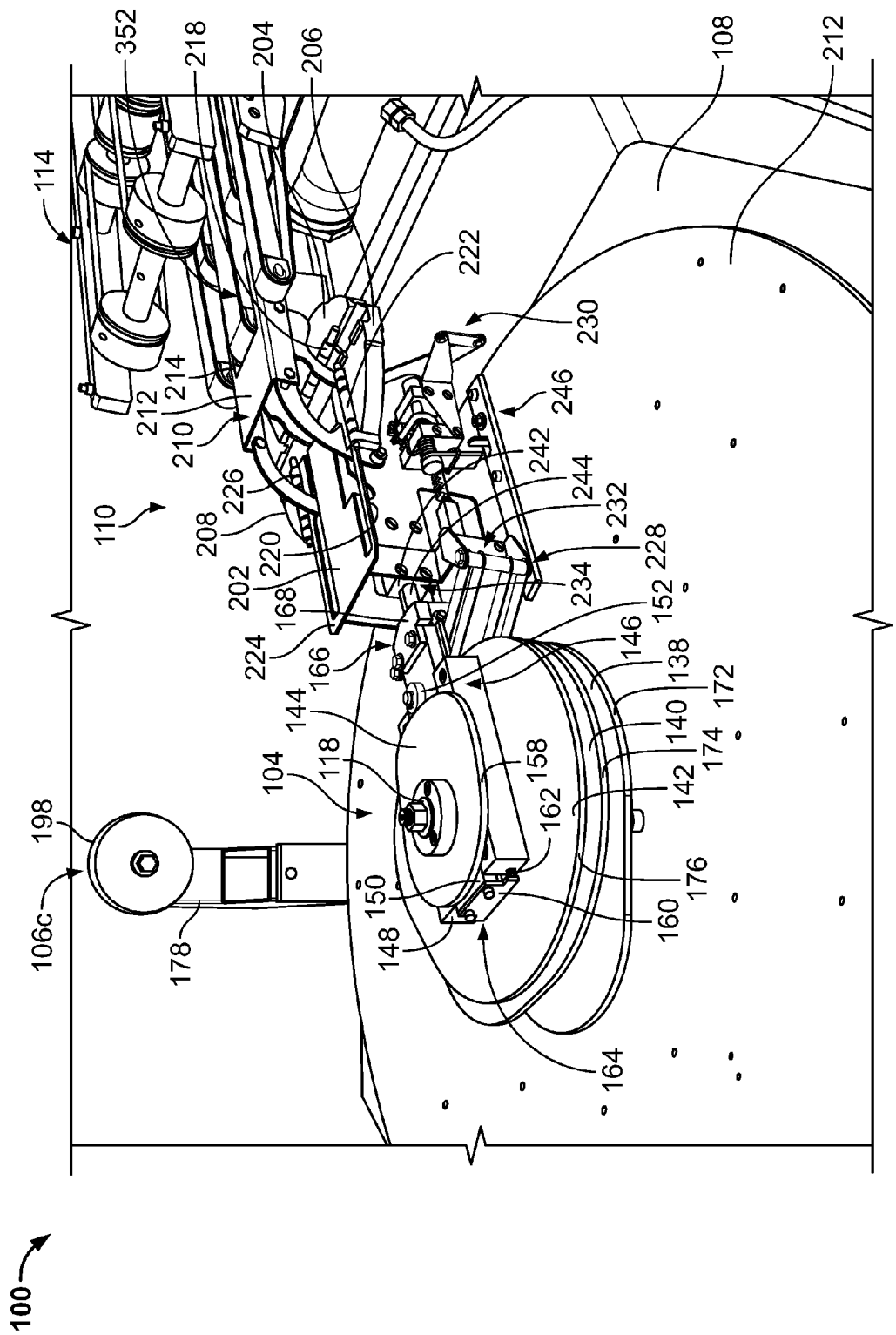
FIG. 32 is a perspective view of an exemplary platform assembly actuated by an exemplary cam system into an eject position of an exemplary multi-stage rotary food product folder apparatus of FIGS. 3-5.
Figure 33:
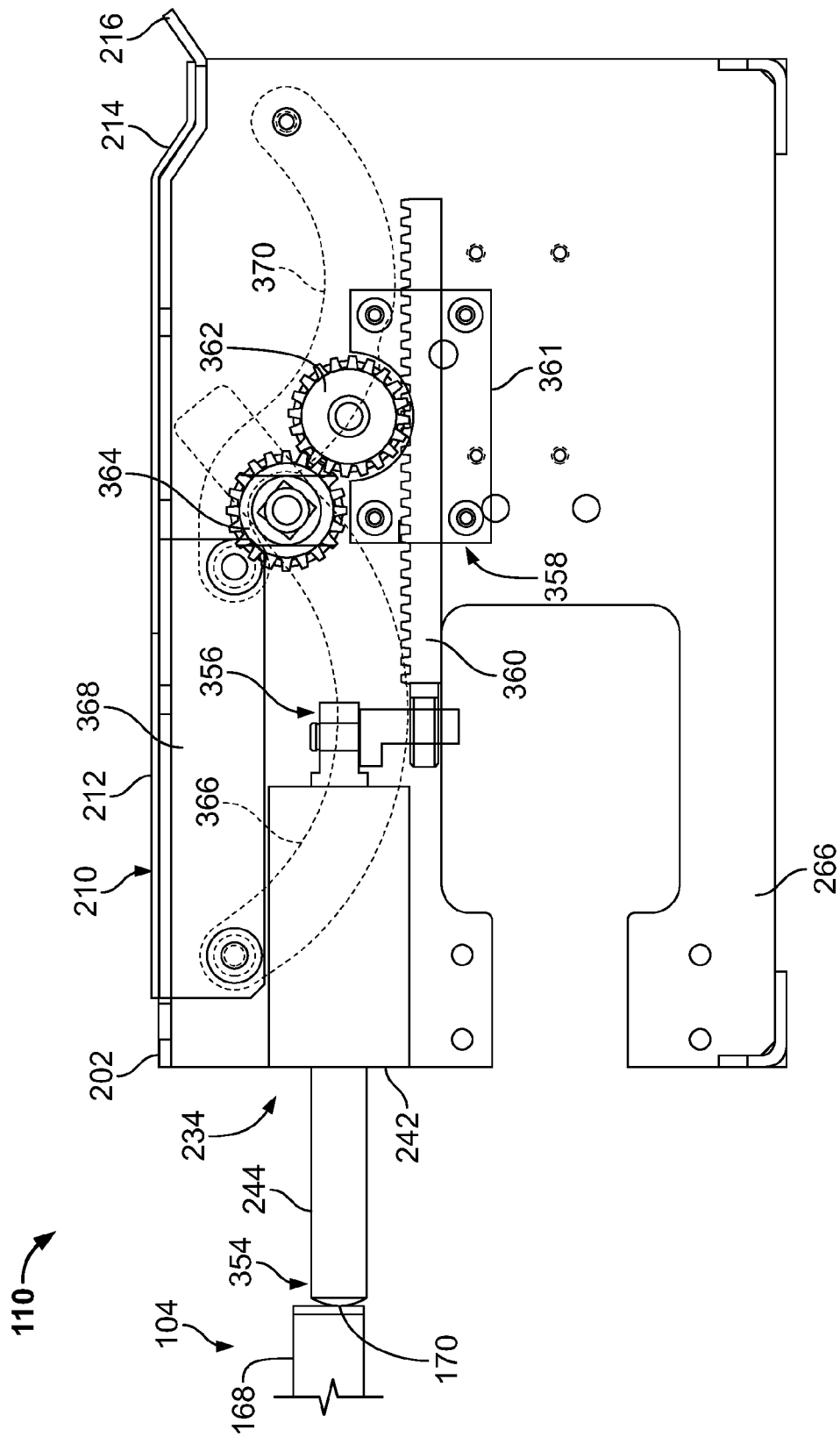
FIG. 33 is a partial side view of an exemplary platform assembly including components for actuating an exemplary platform assembly in an eject position of an exemplary multi-stage rotary food product folder apparatus of FIG. 32.
Figure 34:
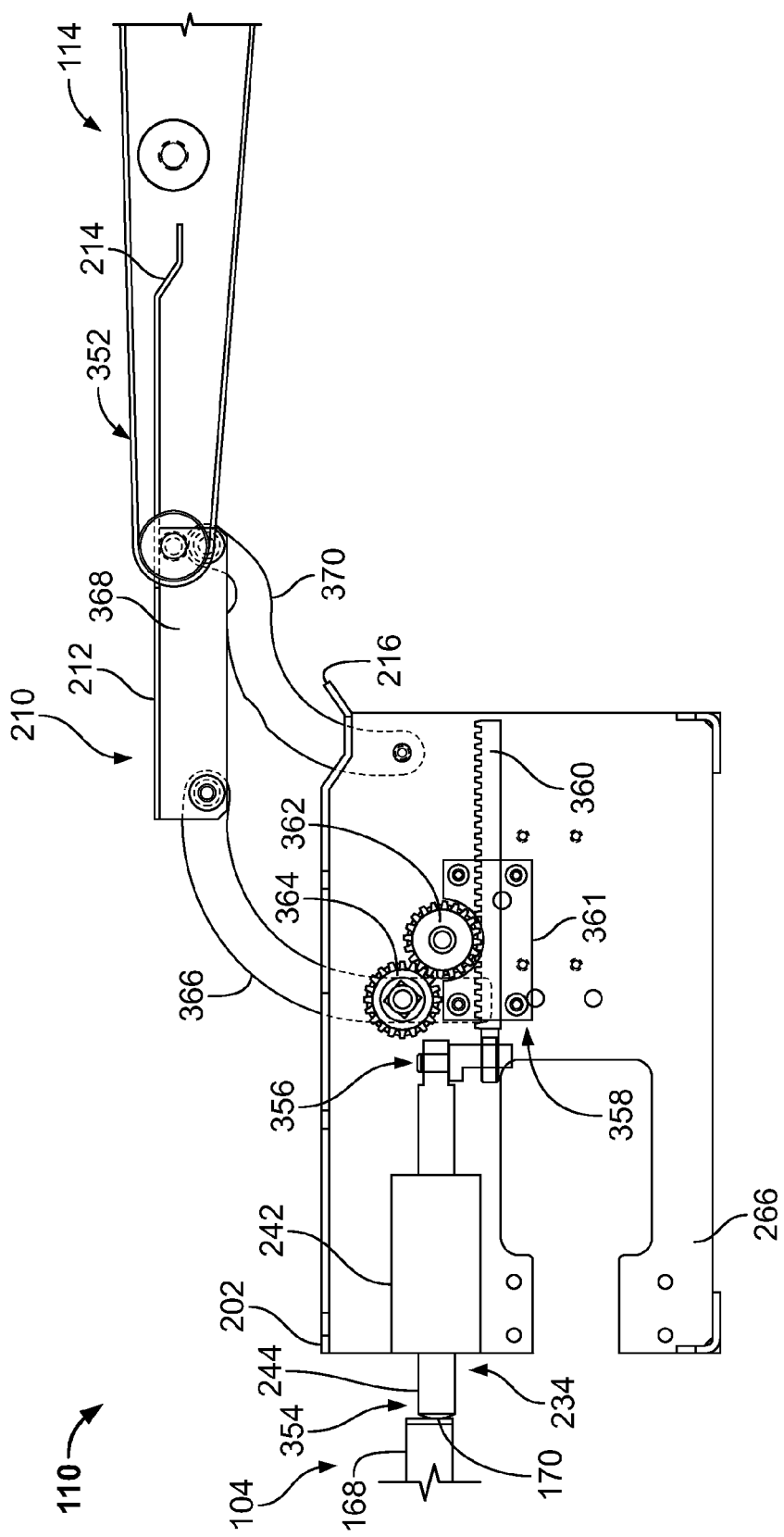
FIG. 34 is a partial side view of an exemplary platform assembly including components actuating an exemplary platform assembly into an eject position of an exemplary multi-stage rotary food product folder apparatus of FIG. 32.
Figure 35:
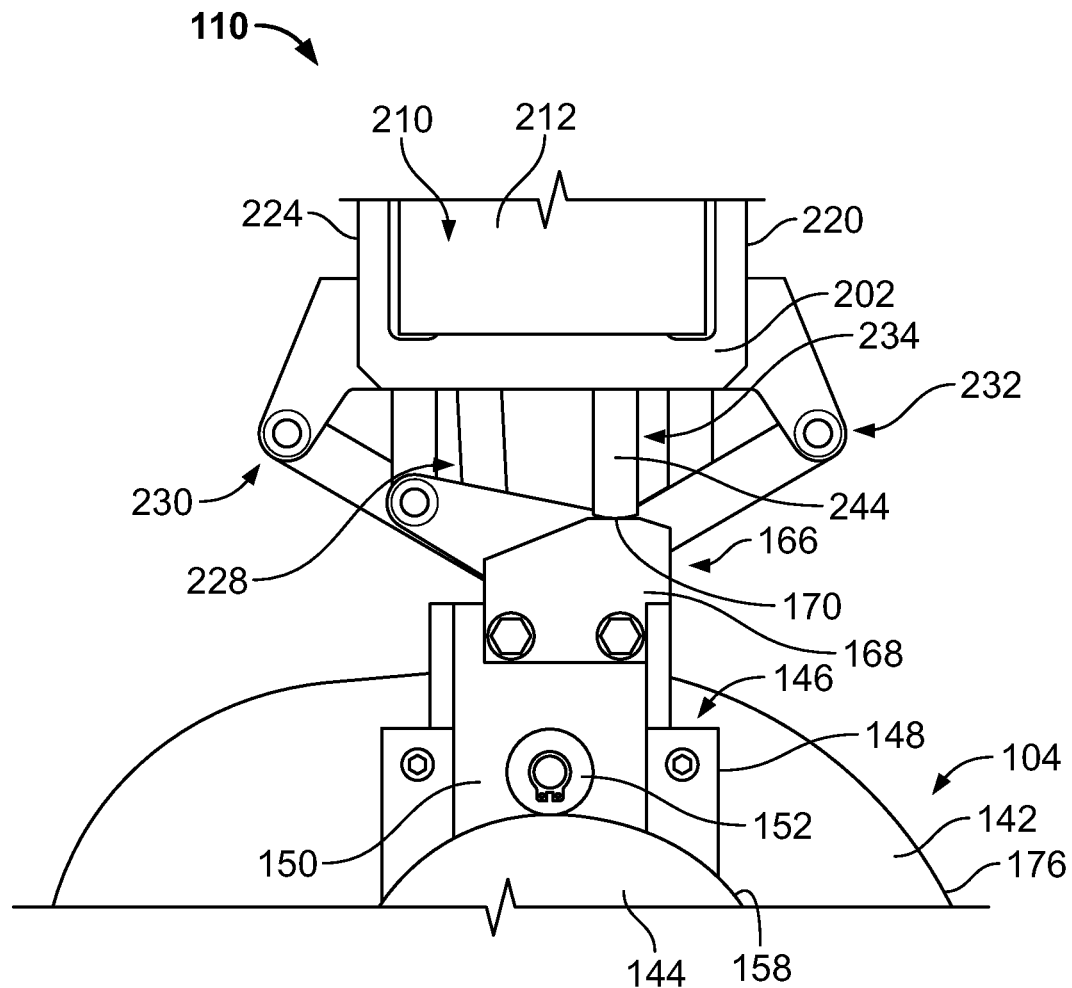
FIG. 35 is a detailed, top view of an exemplary platform assembly actuated by an exemplary cam system in an eject position of an exemplary multi-stage rotary food product folder apparatus of FIG. 32.

As will be discussed in greater detail below with respect to FIG. 37, upon placement of, e.g., a tortilla, on the platform assembly 110, dispensing of a food filling onto the tortilla, and creation of the first, second and third folds at the first, second, third, fourth and fifth stations 115a, 115b, 115c, 115d, 115e, the upper platform 112 and the platform assemblies 110 can be indexed approximately sixty degrees to the sixth station 115f for ejection of the thrice-folded tortilla to the conveyor belt assembly 114. Turning to FIGS. 32-35, an exemplary platform assembly 110 actuated into an eject position at a sixth station 115f is provided. For clarity, FIG. 32 shows a perspective view of the apparatus 100 with a platform assembly 110 only at the sixth station 115f. However, it should be understood that the apparatus 100 can include, e.g., six platform assemblies 110 positioned circumferentially around the cam system 104. Similarly, for clarity, FIGS. 33 and 34 show side views of the platform assembly 110 prior to and post-actuation into an eject position including the component of the fourth actuating mechanism 234. However, it should be understood that the platform assembly 110 also includes the components of the first, second and third actuating mechanisms 228, 230, 232. FIG. 35 shows a top detailed view of the cam system 104 and the platform assembly 110 including the components of the first, second, third and fourth actuating mechanisms 228, 230, 232, 234.

With respect to FIG. 32, the fourth actuating mechanism 242 is illustrated as actuated or engaged by the fourth cam 144 and the actuator 146 of the cam system 104. In particular, during or upon positioning the platform assembly 110 into the sixth station 115f, the fourth cam 144 can rotate on the central shaft 118. During rotation of the fourth cam 144, the roller 152 of the actuator 146 can ride along the edge 158 of the fourth cam 144. As the roller 152 travels along the edge 158 to the extending portion of the asymmetrical fourth cam 144, the fourth cam 144 can actuate translation of the slide rod 150 within the slide track 148 of the actuator 146 through the roller 152. Translation of the slide rod 150 can translate the actuating tip 168 in the direction of the platform assembly 110 such that the actuating surface 170 of the actuating tip 168 presses against and translates the slide rod 244 of the fourth actuating mechanism 234. As will be discussed in greater detail below, translation of the slide rod 244 of the fourth actuating mechanism 234 repositions the lift arm 210 from a position coplanar with the top surface 202 to an extended or eject position. The extended or eject position can be accomplished by initially positioning the forks 214 above the conveyor belts 352 of the conveyor belt assembly 114 and further positioning the forks 214 slightly below and between the conveyor belts 352 of the conveyor belt assembly 114. In particular, the central, middle and outer belts 372, 374, 376 of the conveyor belt assembly 114 can be spaced to permit passage of the forks 214 of the lift arm 210 therebetween. Thus, a food product can be lifted over and onto the conveyor belts 352 of the conveyor belt assembly 114 and the forks 214 can be positioned below the conveyor belts 352 of the conveyor belt assembly 114 to allow the conveyor belts 352 to grasp and remove the food product from the forks 214. The food product can thereby be transported to the seventh, eighth and ninth stations 115g, 115h, 115i along the conveyor belts 352.

FIG. 33 shows a partial side view of the platform assembly 110 with the fourth actuating mechanism 234 in a non-actuated position, e.g., prior to actuation of the lift arm 210 into an extended or eject position. The fourth actuating mechanism 234 includes the slide rod 244 translatable through an aperture in the slide track 242. The slide track 242 can be fixedly secured to the frame 266. A distal end 354 of the slide rod 244 can protrude from the slide track 242 in the direction of the central vertical axis $A_1$ for actuation by the actuator 146. A proximal end 356 of the slide rod 244 can pass through the slide track 242 and can further fixedly connect to a rack and pinion mechanism 358.

The rack and pinion mechanism 358 can include a linear gear bar 360, e.g., a rack, a gear 362, e.g., a pinion, and a track 361 for aligning translation of the linear gear bar 360. The rack and pinion mechanism 358 can be utilized to convert linear motion of the slide rod 244 into rotational motion. In particular, the linear gear bar 360 can be fixedly attached to the slide rod 244 such that translation of the slide rod 244 upon actuation by the fourth cam 144 simultaneously translates the linear gear bar 360. The gear 362 can be rotatably secured to the frame 266 and the teeth of the gear 362 can be engaged with the teeth of the linear gear bar 360 such that translation of the linear gear bar 360 causes rotation of the gear 362. A gear 364 can be fixedly secured to the frame 266 adjacent to the gear 362 and the teeth of the gear 364 can be engaged with the teeth of the gear 362. Thus, rotation of the gear 362 can cause rotation of the gear 364. A curved linkage 366 can be hingedly connected at one end to a flange 368 connected to and extending downward from the lower solid section 212 of the lift arm 210 and can be slidably connected at an opposing end to the gear 364. In particular, when the gear 364 rotates in a clockwise direction, the linkage 366 can be driven to extend in a left and upward direction to lift the lift arm 210 from the top surface 202 and into an extended or eject position. Similarly, when the gear 364 rotates in a counter-clockwise direction, the linkage 366 can be driven to retract in a right and downward direction to lower the lift arm 210 from the extended or eject position in the direction of the top surface 202. In some embodiments, the rack and pinion mechanism 358 can include a spring (not shown) to provide a bias force which can reposition the lift arm 210 in a non-extended position against the top surface 202 after the extended portion of the fourth cam 144 rotates away from the roller 152. In particular, the spring can be biased when the lift arm 210 is in an extended or eject position and unbiased when the lift arm 210 is in a non-extended position. A second curved linkage 370, e.g., an S-shaped linkage, can be hingedly connected at one end to the flange 368 of the lower solid section 212 of the lift arm 210 and hingedly connected at an opposing end to the frame 266. Actuation of the linkage 366 by the gear 364 can simultaneously actuate the linkage 370 to assist in repositioning the lift arm 210 into an extended or eject position.

During rotation of the roller 152 along the base curvature of the fourth cam 144, the roller 152 can ride along the edge 158 of the fourth cam 144 without actuation or engagement of the actuator 146 and the fourth actuating mechanism 234. With reference to FIGS. 34 and 35, upon rotation of the fourth cam 144 such that the roller 152 is positioned along the extended portion of the asymmetrical fourth cam 144, the slide rod 150 can be translated along the slide track 148 to provide pressure against the slide rod 244. The pressure applied to the slide rod 244 can linearly translate the slide rod 244 and, in turn, the linear gear bar 360 in a direction away from the cam system 104. Linear translation of the linear gear bar 360 can rotate the gears 362, 364, thereby actuating the linkages 366, 370 to reposition the lift arm 210 from a non-extended position to an extended or eject position. In particular, the lift arm 210 can be actuated to rise from the top surface 202 in the direction of the conveyor belts 352 of the conveyor belt assembly 114. As the linkages 366, 370 rotate, the forks 214 of the lift arm 210 can initially be positioned slightly over the conveyor belts 352 and further lowered slightly below the conveyor belts 352 as a final extended position. The food product on the forks 214 can thereby by positioned on the conveyor belts 352 and removed from the forks 214 of the lift arm 210 when the forks 214 are lowered below the conveyor belts 352. The conveyor belts 352 can then transport the food product to the seventh station 115g.

When the food product has been transported to along the conveyor belts 352 away from the forks 214 of the lift arm 210, the fourth cam 144 can rotate about the central shaft 118 and the roller 152 can ride along the edge 158 of the fourth cam 144 away from the extended portion of the fourth cam 144. As discussed above, a spring (not shown) in the rack and pinion mechanism 358 can provide a bias force to rotate the linkages 366, 370 in a direction opposing actuation of the lift arm 210 into an extended or eject position. The bias force of the spring can thereby rotate the gear 364 in a counter-clockwise direction, rotate the gear 362 in a clockwise direction, and further translate the linear gear bar 360 in the direction of the cam system 104, causing the linkages 366, 370 to rotate into the non-actuated position. Rotation of the linkages 366, 370 into the non-actuated position, in turn, lowers the lift arm 210 from the conveyor belts 352 of the conveyor belt assembly 114 into a substantially coplanar position relative to the top surface 202.

Figure 36:
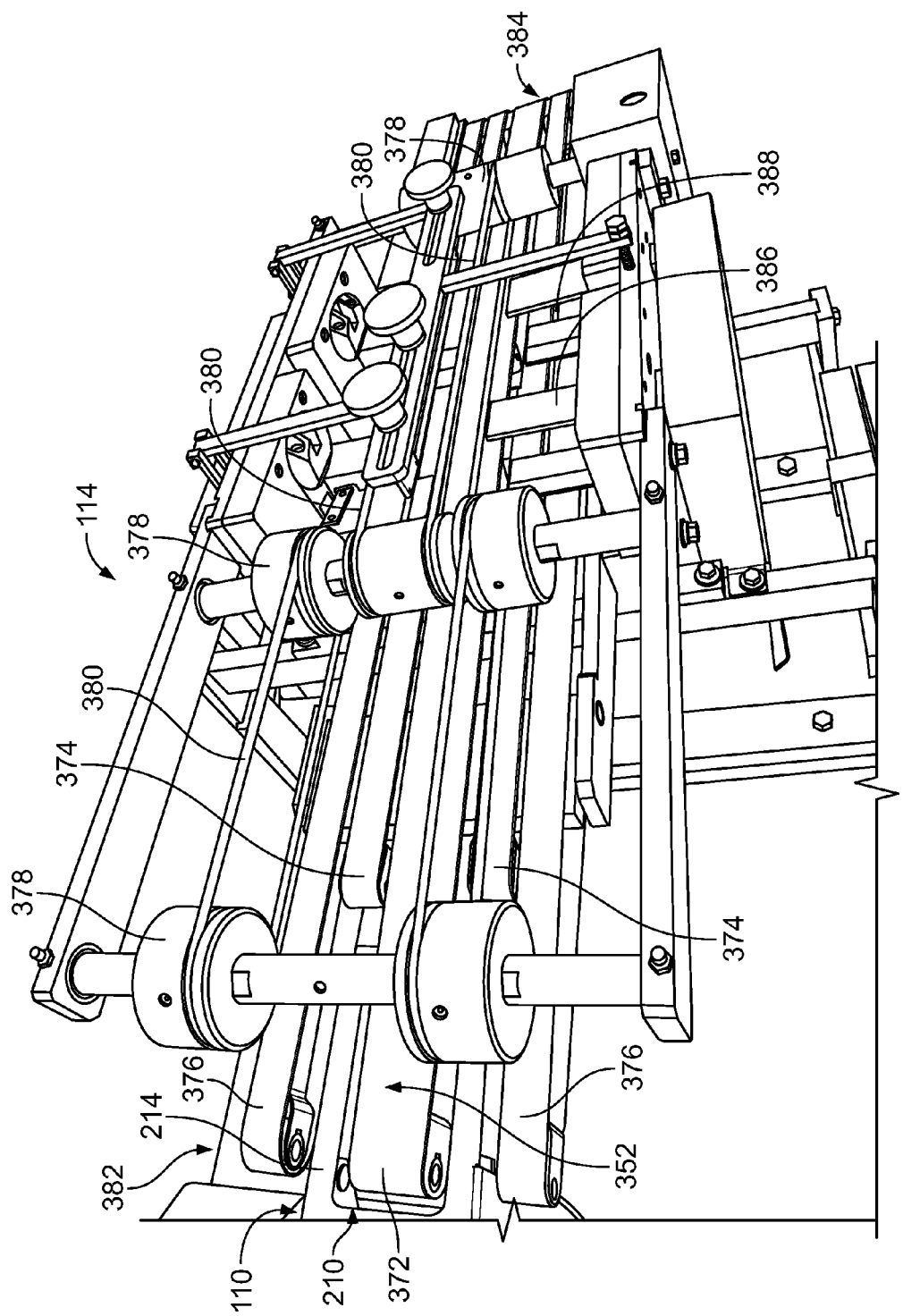
FIG. 36 is a perspective view of an exemplary conveyor belt assembly for forming a fourth and fifth fold of an exemplary multi-stage rotary food product folder apparatus of FIGS. 3-5.

As will be discussed in greater detail below with respect to FIG. 37, upon placement of, e.g., a tortilla, on the platform assembly 110, dispensing of a food filling onto the tortilla, and creation of the first, second and third folds, and ejection onto the conveyor belt assembly 114 at the first, second, third, fourth, fifth and sixth stations 115a, 115b, 115c, 115d, 115e, 115f, the thrice-folded tortilla can be transported along the conveyor belt assembly 114 for creation of the fourth and fifth folds. Turning to FIG. 36, a perspective view of an exemplary conveyor belt assembly 114 is provided. The conveyor belt assembly 114 includes a plurality of conveyor belts 352 extending the length of the conveyor belt assembly 114. In some embodiments, the conveyor belt assembly 114 includes a central belt 372, a middle belt 374 positioned adjacent to the central belt 372 on each side, and an outer belt 376 positioned adjacent to the middle belt 374 on each side. In some embodiments, rather than separate central, middle and outer belts 372, 374, 376, the conveyor belt assembly 114 can include, e.g., one, two, three, four, five, six, and the like, conveyor belts 352.

In some embodiments, the motor 134 and gearbox 136 of FIG. 6 can drive one or more rollers 378 of the conveyor belt assembly 114. For example, the motor 134, the gearbox 136 and/or the plurality of rollers 378 can be connected relative to each other with belts 380 such that rotation of one roller 378 simultaneously actuates rotation of the remaining rollers 378. In some embodiments, two or more motors 134 can be utilized for separate actuation and rotation of the rollers 378 (not shown). In some embodiments, the rollers 378 can drive rotation of the conveyor belts 352. In some embodiments, the one or more motors 134 can separately actuate and rotate the conveyor belts 352. In particular, the conveyor belts 352 can rotate in a clockwise direction to transport the food product from the proximal end 382 to the distal end 384 of the conveyor belt assembly 114.

The conveyor belt assembly 114 includes a first pair of folding jaws 386 at the seventh station 115g and a second pair of folding jaws 388 spaced in the direction of the distal end 384 from the first pair of folding jaws 386. In some embodiments, the conveyor belt assembly 114 can include two or more folding jaws depending on the size of the folded food product being formed. Each of the folding jaws 386, 388 can be actuated by, e.g., the motor 134, to grasp and rotate or flip the food product from the proximal end 382 to the distal end 384 of the conveyor belt assembly 114 to create the fourth and fifth folds, respectively, as the food product is transported along the conveyor belts 352. For example, when the lift arm 210 has positioned the food product onto the conveyor belts 352, the conveyor belts 352 can transport the food product to the first pair of folding jaws 386, e.g., the seventh station 115g. The food product can be positioned between the first pair of folding jaws 386, the folding jaws 386 can grip the food product, and the folding jaws 386 can rotate in a counter-clockwise direction to roll the food product, thereby forming the fourth fold of the food product. In some embodiments, the folding jaws 386 can rotate the food product approximately 180 degrees to form the fourth fold. The conveyor belts 352 can further transport the food product in the direction of the distal end 384 to the second pair of folding jaws 388, e.g., the eighth station 115h. The food product can be positioned between the second pair of folding jaws 388, the folding jaws 388 can grip the food product, and the folding jaws 388 can rotate in a counter-clockwise direction to roll the food product, thereby forming the fifth fold of the food product. In some embodiments, the folding jaws 388 can rotate the food product approximately 180 degrees to form the fifth fold. The conveyor belts 352 can further transport the food product to the distal end 384 of the conveyor belts 352 to produce or discharge the fully folded food product at the ninth station 115i.

Turning now to FIGS. 37-44, an exemplary apparatus 100 is provided as utilized for forming a folded food product 390. Although the folded food product 390 is illustrated as a burrito including a tortilla 392 and food filling 394, in some embodiments, the apparatus 100 can be utilized for forming a variety of folded food products 390, e.g., folded food products including grape leaves, egg rolls, and the like. In some embodiments, the platform assemblies 110 can be interchangeable based on the type of folded food product 390 being formed. For example, smaller platform assemblies 110 including a substantially similar structure and functionality as the platform assemblies 110 discussed herein can be utilized for forming a folded food product 390 including grape leaves. It should be understood that while the platform assemblies 110 can be interchangeable for different folded food products 390, the same cam system 104 can be utilized for actuation of the different platform assemblies 110.

Figure 37:
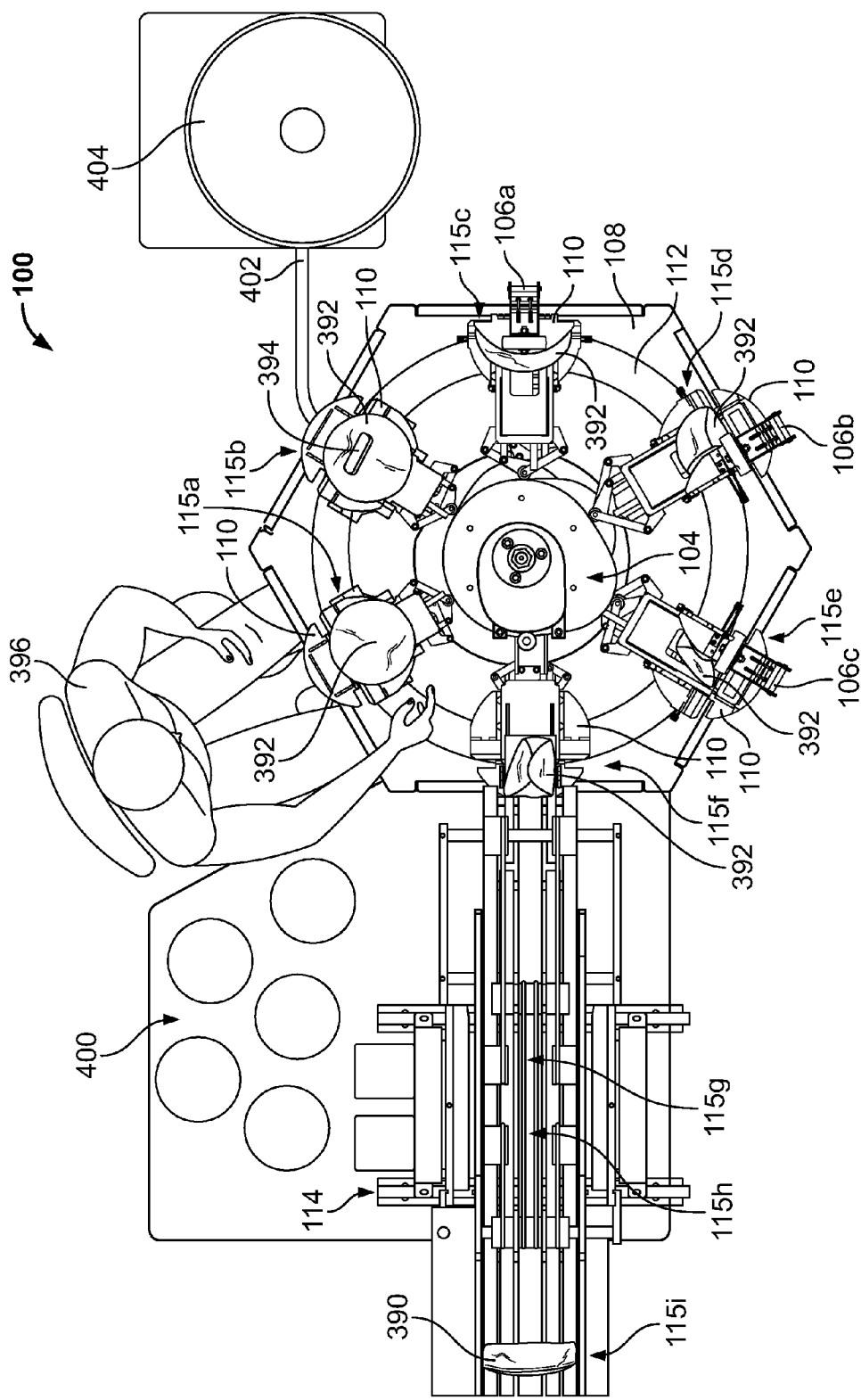
FIG. 37 is a top view of an exemplary multi-stage rotary food product folder apparatus of FIGS. 3-5.
Figure 38:
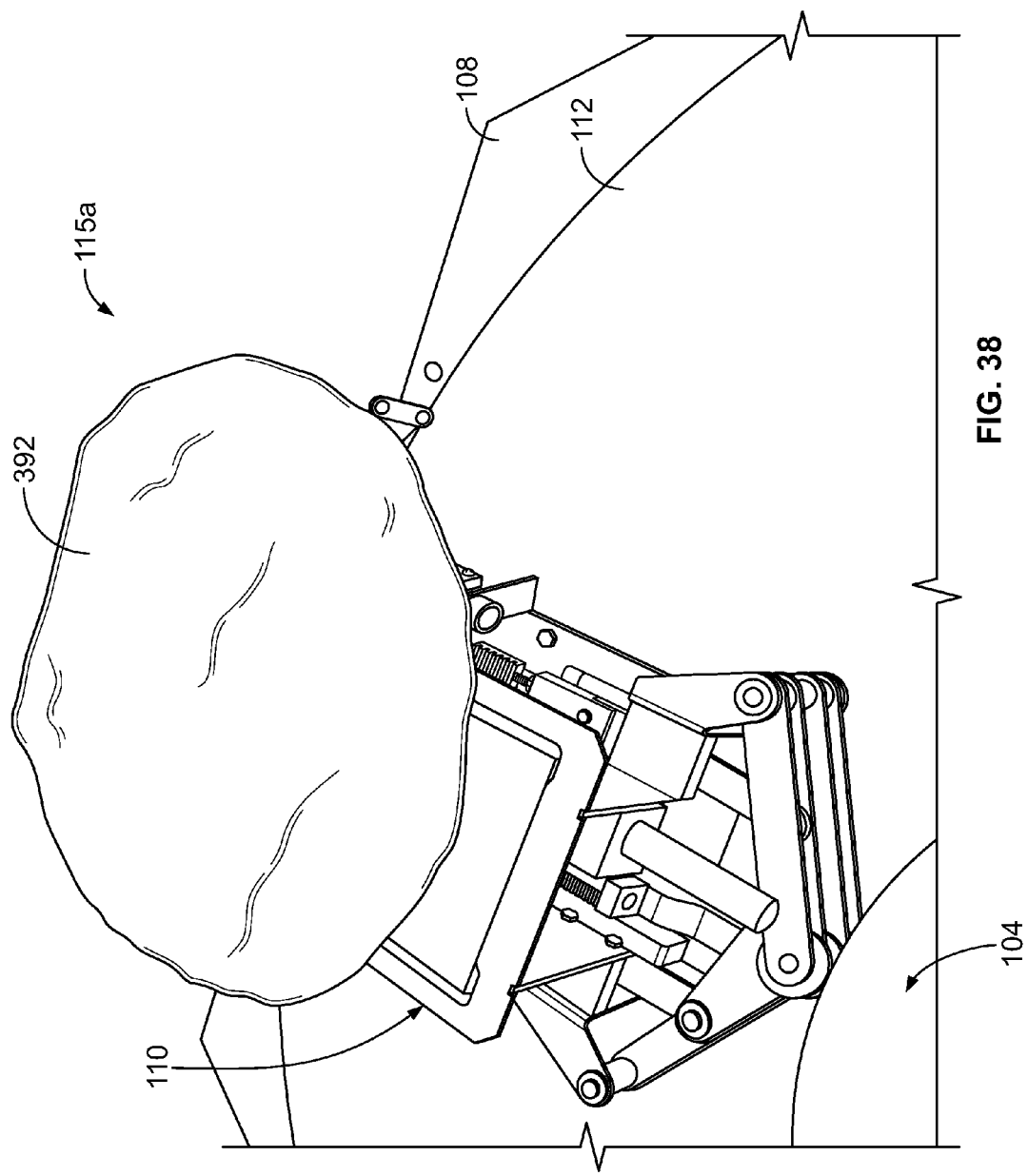
FIG. 38 is a perspective view of an exemplary platform assembly with an unfolded food product of an exemplary multi-stage rotary food product folder apparatus of FIG. 37.

With respect to FIGS. 37 and 38, in some embodiments, an operator 396 can manually load tortillas 392 from a storage location 400 to the platform assembly 110 at the first station 115a. In some embodiments, a destacker (not shown) can be utilized for automatically loading tortillas 392 from a storage location 400 to the platform assembly 110 at the first station 115a. For example, the destacker can be actuated to load a tortilla 392 on the platform assembly 110 based on a signal sent from a sensor, e.g., a photoelectric sensor, (not shown) which can detect if a tortilla 392 is on the platform assembly 110 and can indicate that an empty platform assembly 110 has been rotated into the first station 115a. In some embodiments, a smart belt (not shown) can be used to deposit tortillas 392 on the platform assembly 110 at the first station 115a. Although illustrated in FIG. 38 as including only one platform assembly 110 on the upper platform 112, it should be understood that the apparatus 100 can include a plurality of platform assemblies 110 secured to the upper platform 112 at one time. Preferably, the apparatus 100 can include a platform assembly 110 secured to the upper platform 112 for each of the six stations.

Figure 1:
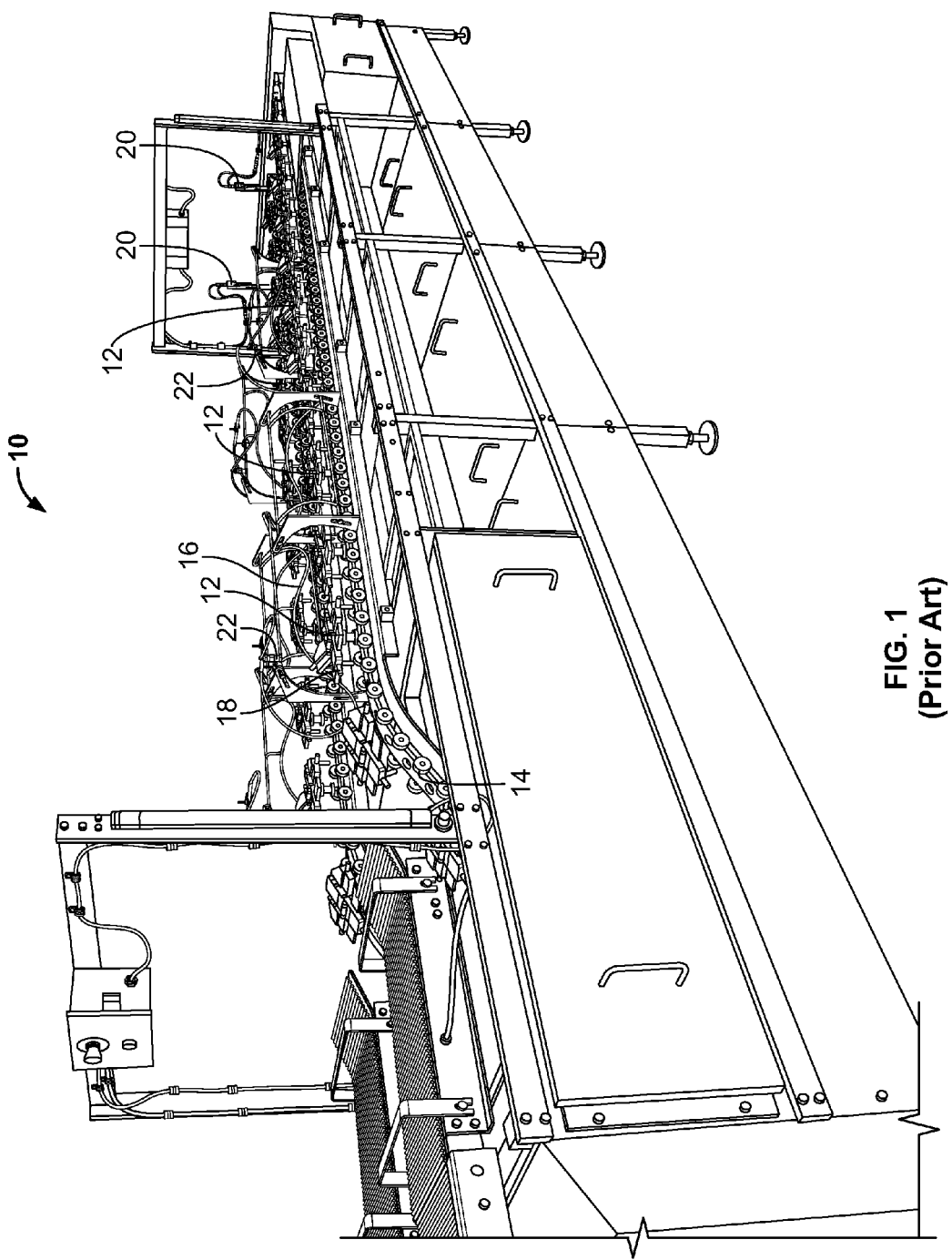
FIG. 1 is a perspective view of a food product forming apparatus of the prior art.
Figure 2:
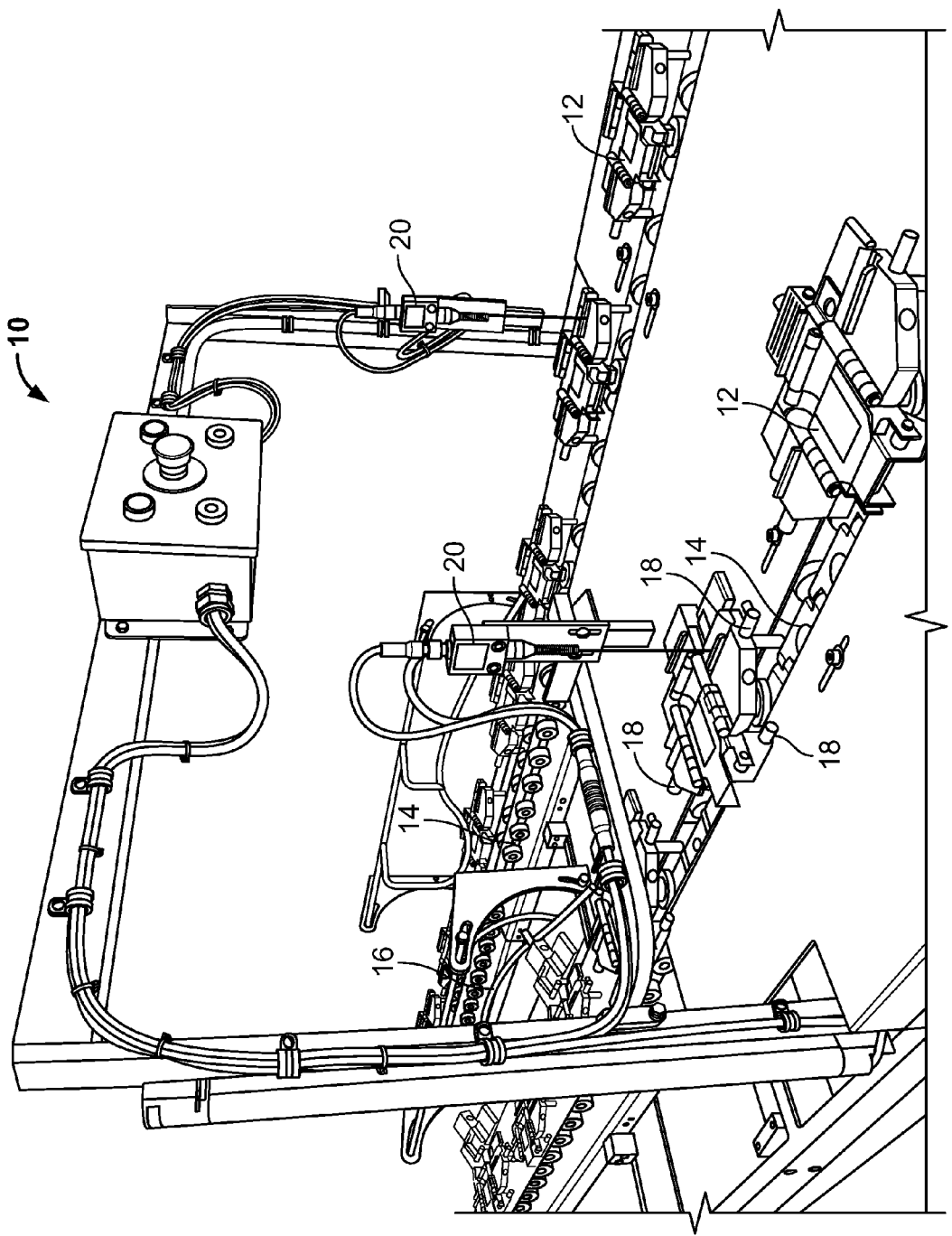
FIG. 2 is a detailed perspective view of a food product forming apparatus of the prior art.
Figure 39:
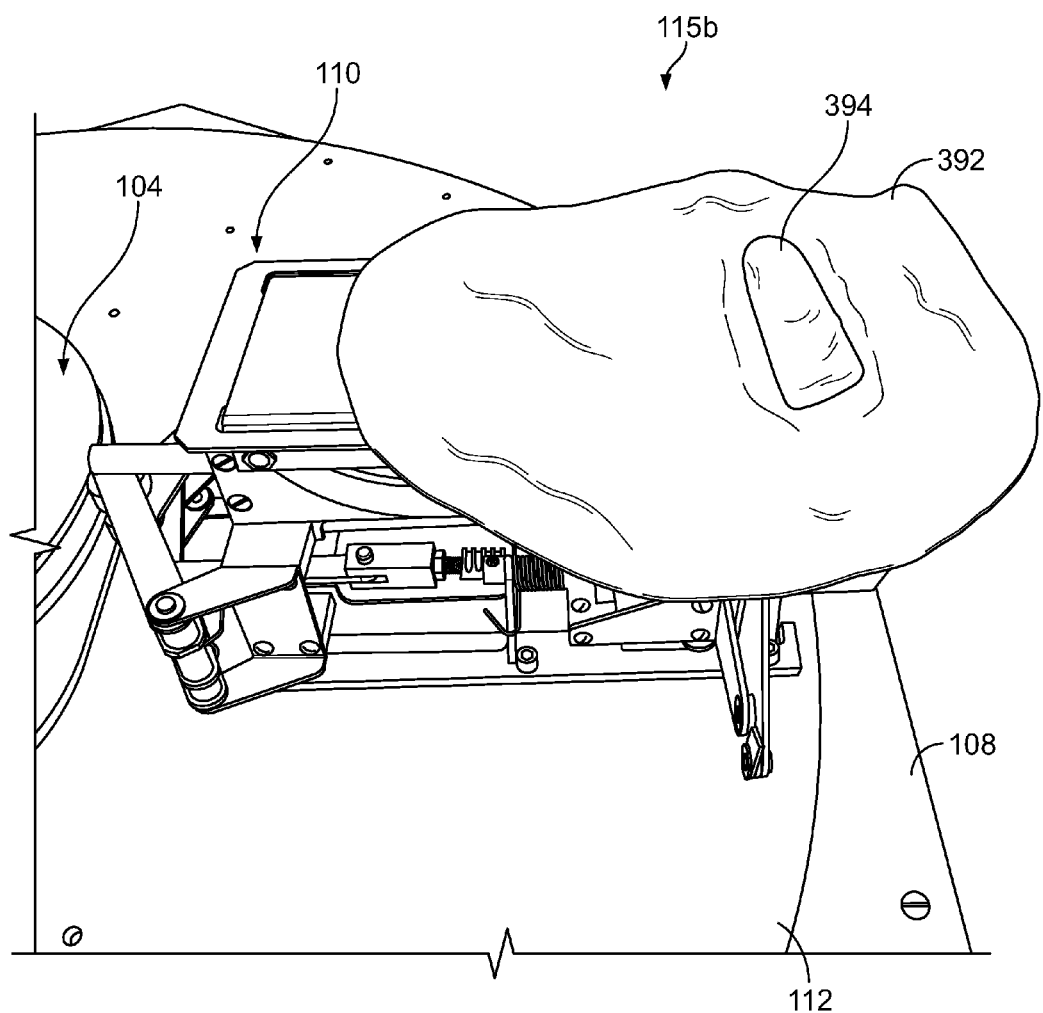
FIG. 39 is a perspective view of an exemplary platform assembly with an unfolded food product of an exemplary multi-stage rotary food product folder apparatus of FIG. 37.

With respect to FIGS. 37 and 39, once the tortilla 392 has been loaded onto the platform assembly 110 at the first station 115a, the upper platform 112 can rotate and the platform assembly 110 can be repositioned to the second station 115b. The food filling 394 can be dispensed onto the tortilla 392 from a tube 402 extending from the food filling storage 404 over the tortilla 392 at the second station 115b. In some embodiments, the apparatus 100 can be used in combination with an alternative food filling dispenser, e.g., the food filling dispenser 20 of FIG. 1. Although illustrated in FIG. 39 as including only one platform assembly 110 on the upper platform 112, it should be understood that the apparatus 100 can include a plurality of platform assemblies 110 secured to the upper platform 112 at one time.

Figure 40:
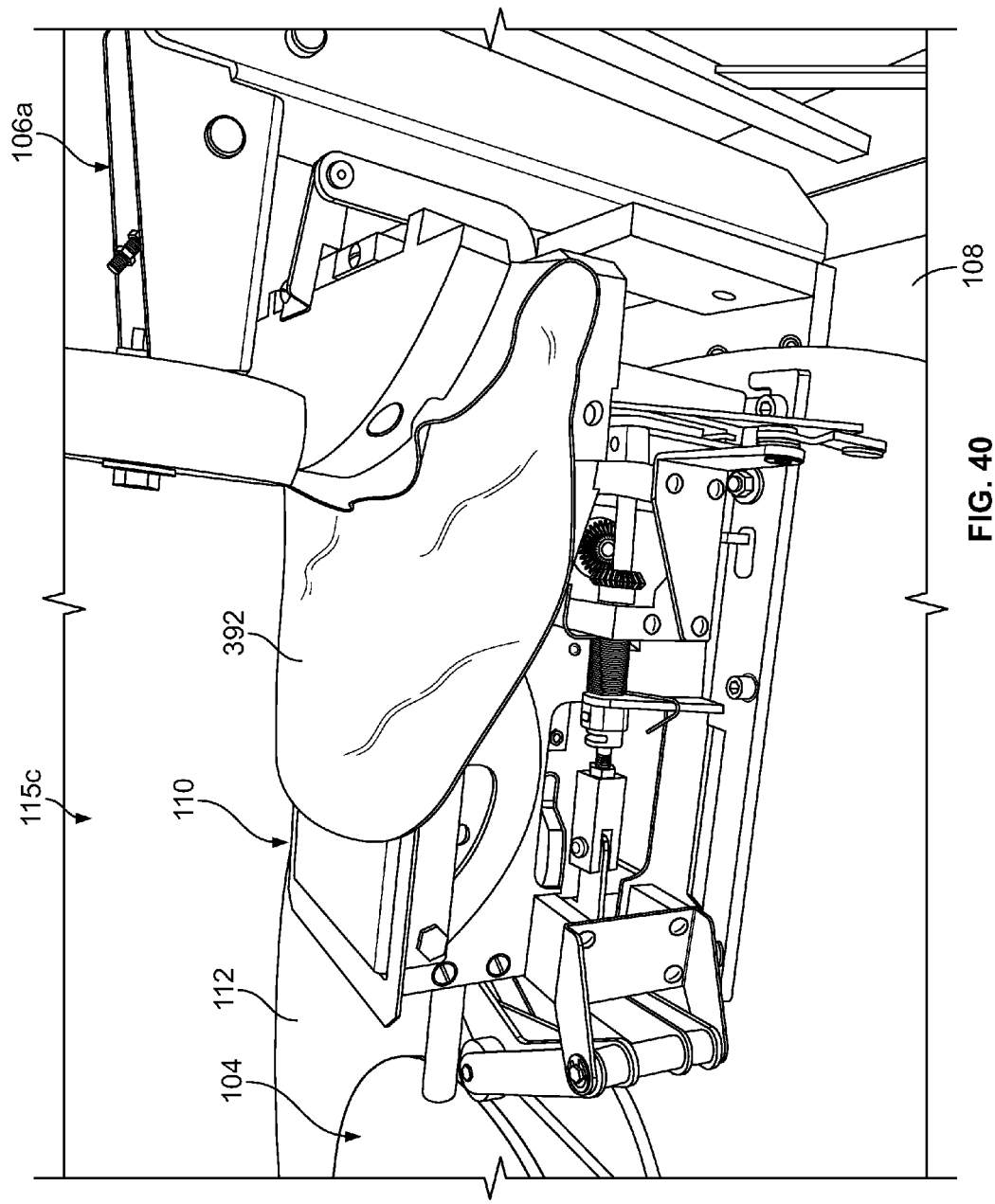
FIG. 40 is a perspective view of an exemplary platform assembly with a food product in a first fold position of an exemplary multi-stage rotary food product folder apparatus of FIG. 37.

With respect to FIGS. 37 and 40, the upper platform 112 can further rotate clockwise to reposition the platform assembly 110 at the third station 115c. As discussed above, the first actuating mechanism 228 of the platform assembly 110 can be actuated by the first cam 138 to form the first fold of the tortilla 392 with the first flap 204. The hard press 106a of the third station 115c can assist in creating the first fold of the tortilla 392. The first actuating mechanism 228 can then be actuated to retract the first flap 204 into the unfolded position. In some embodiments, a liquid dispenser 22 (see, e.g., FIG. 1) can be utilized in combination with the apparatus 100 to spray a liquid, e.g., water, onto the tortilla 392 after the first fold is formed. The dispensed liquid can assist in creating and maintaining a tight fold of the tortilla 392. Although illustrated in FIG. 40 as including only one platform assembly 110 on the upper platform 112, it should be understood that the apparatus 100 can include a plurality of platform assemblies 110 secured to the upper platform 112 at one time.

Figure 41:
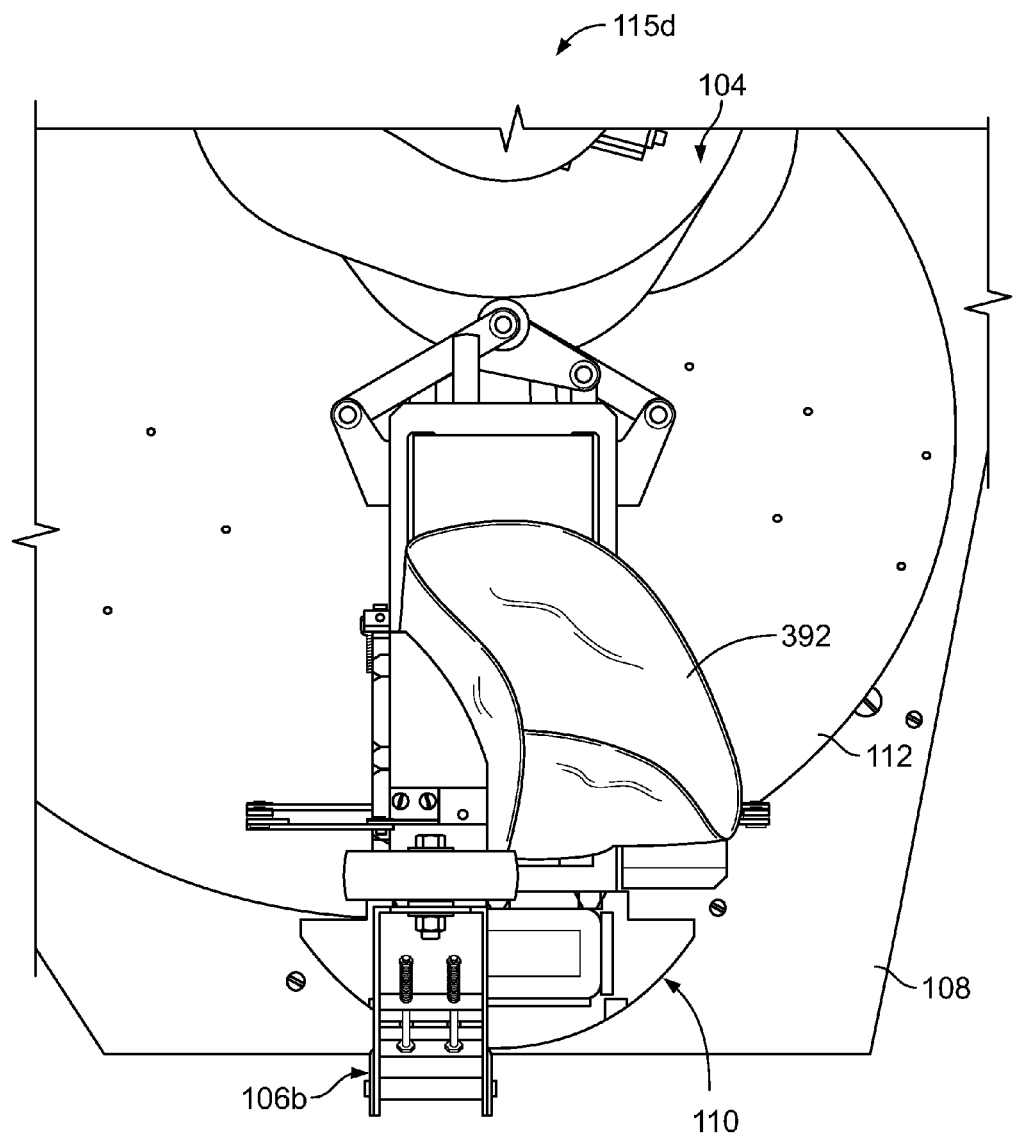
FIG. 41 is a top view of an exemplary platform assembly with a food product in a second fold position of an exemplary multi-stage rotary food product folder apparatus of FIG. 37.

With respect to FIGS. 37 and 41, the upper platform 112 can further rotate clockwise to reposition the platform assembly 110 at the fourth station 115d. As discussed above, the second actuating mechanism 230 of the platform assembly 110 can be actuated by the second cam 140 to form the second fold of the tortilla 392 with the second flap 206. The hard press 106b of the fourth station 115d can assist in creating the second fold of the tortilla 392. The second actuating mechanism 230 can then be actuated to retract the second flap 206 into the unfolded position. In some embodiments, a liquid dispenser (see, e.g., FIG. 1) can be utilized in combination with the apparatus 100 to spray a liquid, e.g., water, onto the tortilla 392 after the second fold is formed. Although illustrated in FIG. 41 as including only one platform assembly 110 on the upper platform 112, it should be understood that the apparatus 100 can include a plurality of platform assemblies 110 secured to the upper platform 112 at one time.

Figure 42:
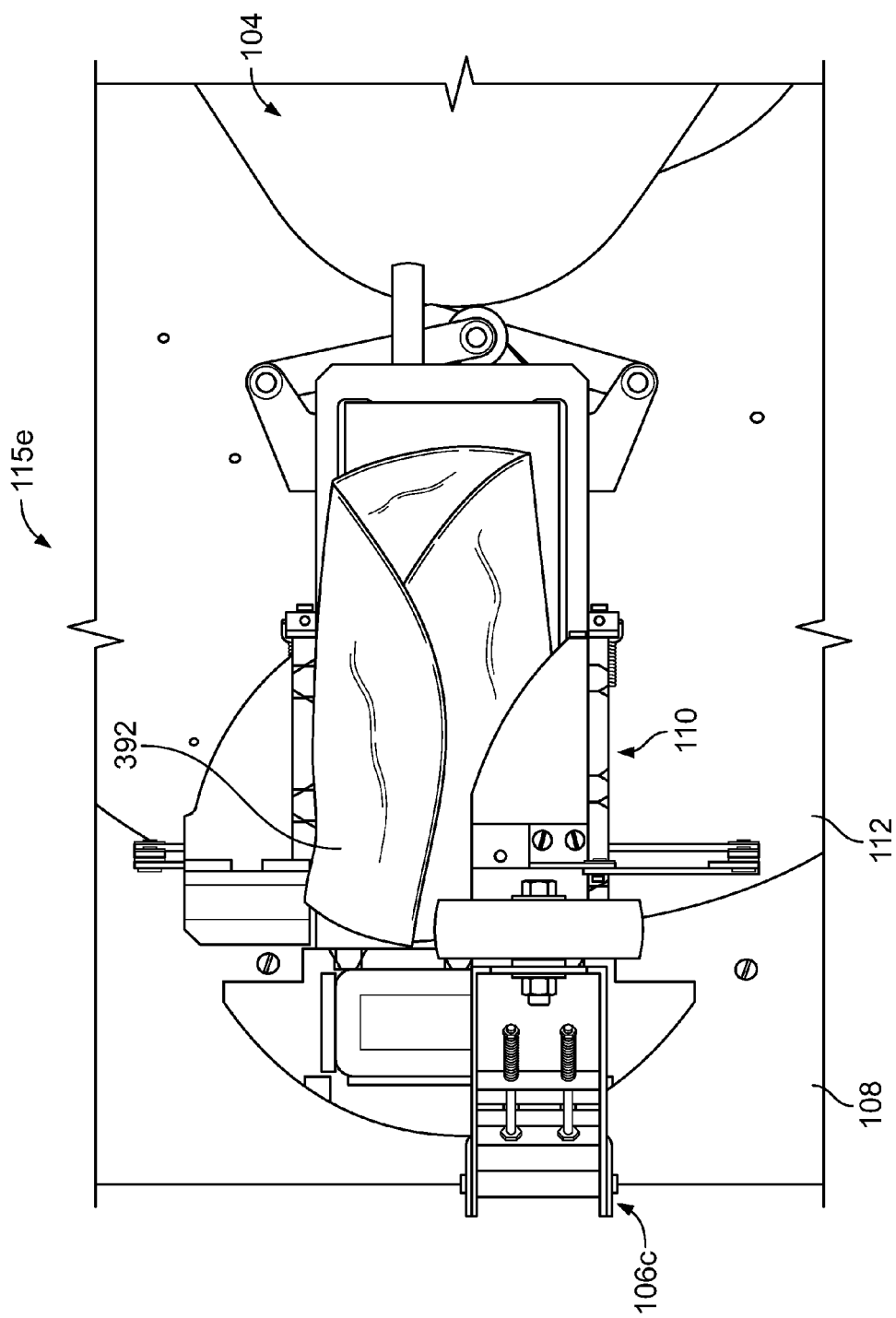
FIG. 42 is a top view of an exemplary platform assembly with a food product in a third fold position of an exemplary multi-stage rotary food product folder apparatus of FIG. 37.

With respect to FIGS. 37 and 42, the upper platform 112 can further rotate clockwise to reposition the platform assembly 110 at the fifth station 115e. As discussed above, the third actuating mechanism 232 of the platform assembly 110 can be actuated by the third cam 142 to form the third fold of the tortilla 392 with the third flap 208. The hard press 106c of the fifth station 115e can assist in creating the third fold of the tortilla 392. The third actuating mechanism 232 can then be actuated to retract the third flap 208 into the unfolded position. In some embodiments, a liquid dispenser (see, e.g., FIG. 1) can be utilized in combination with the apparatus 100 to spray a liquid, e.g., water, onto the tortilla 392 after the third fold is formed. For example, the liquid can be sprayed on an exposed tip of the tortilla 392 to assist in sealing the folded food product 390 when the subsequent fourth and fifth folds are formed at the seventh and eighth stations 115g, 115h. Although illustrated in FIG. 42 as including only one platform assembly 110 on the upper platform 112, it should be understood that the apparatus 100 can include a plurality of platform assemblies 110 secured to the upper platform 112 at one time.

Figure 43:
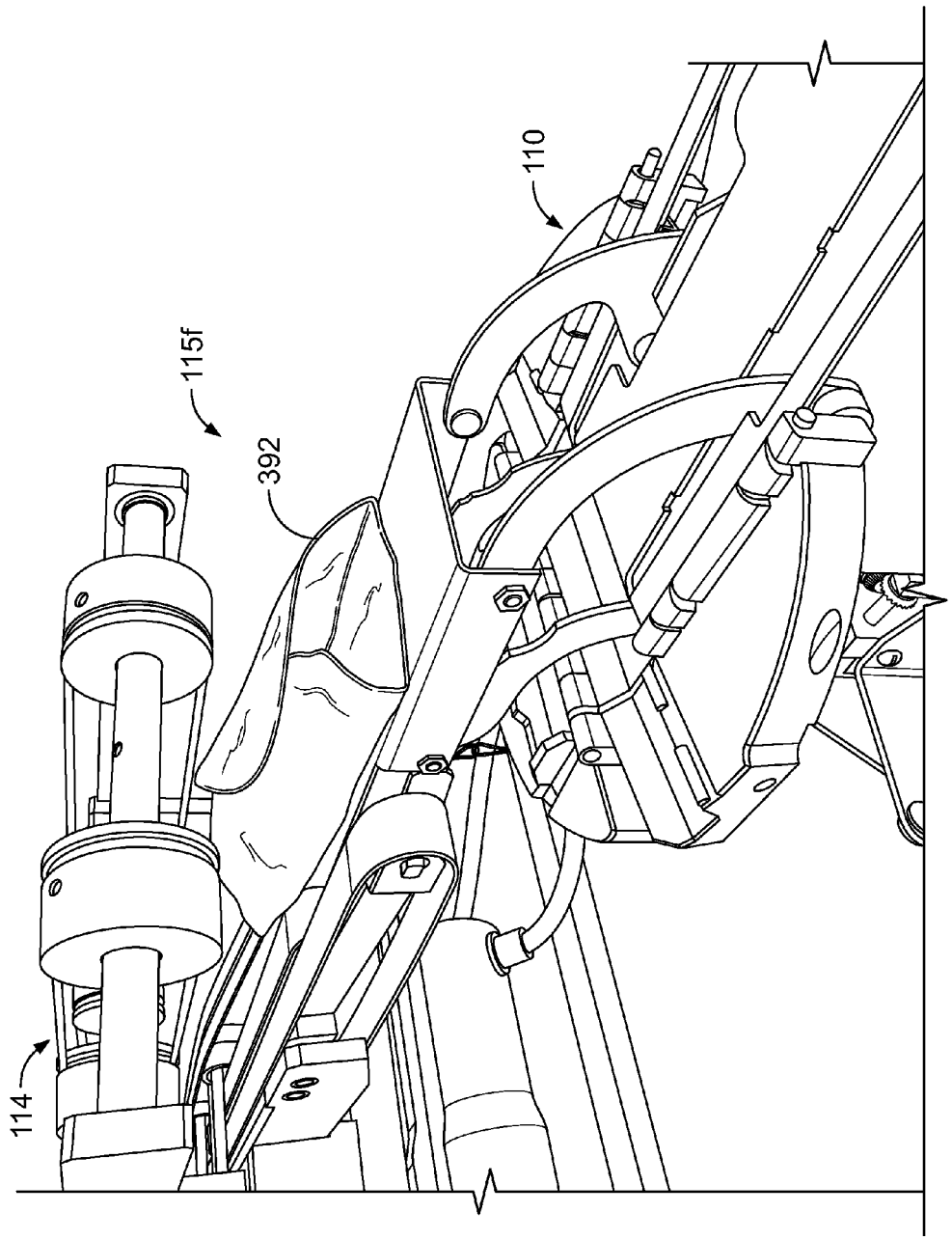
FIG. 43 is a perspective view of an exemplary platform assembly with a food product in an eject position of an exemplary multi-stage rotary food product folder apparatus of FIG. 37.

With respect to FIGS. 37 and 43, the upper platform 112 can further rotate clockwise to reposition the platform assembly 110 at the sixth station 115f. As discussed above, the fourth actuating mechanism 234 of the platform assembly 110 can be actuated by the fourth cam 144 to lift the tortilla 392 filled with the food filling 394 with the lift arm 210 from the platform assembly 110 and position the tortilla 392 onto the conveyor belts 352 of the conveyor belt assembly 114. When the conveyor belts 352 transport the tortilla 392 in the direction of the seventh station 115g, the fourth actuating mechanism 234 can be actuated to lower the lift arm 210 back to the platform assembly 110. The upper platform 112 can then rotate clockwise to reposition the platform assembly 110 at the first station 115a and the operator 396 can load a new tortilla 392 on the platform assembly 110. Although illustrated in FIG. 43 as including only one platform assembly 110 on the upper platform 112, it should be understood that the apparatus 100 can include a plurality of platform assemblies 110 secured to the upper platform 112 at one time. It should be understood that the rotating upper platform 112 with the six platform assemblies 110 allows multiple folded food products 390 to be simultaneously folded and produced.

Figure 44:
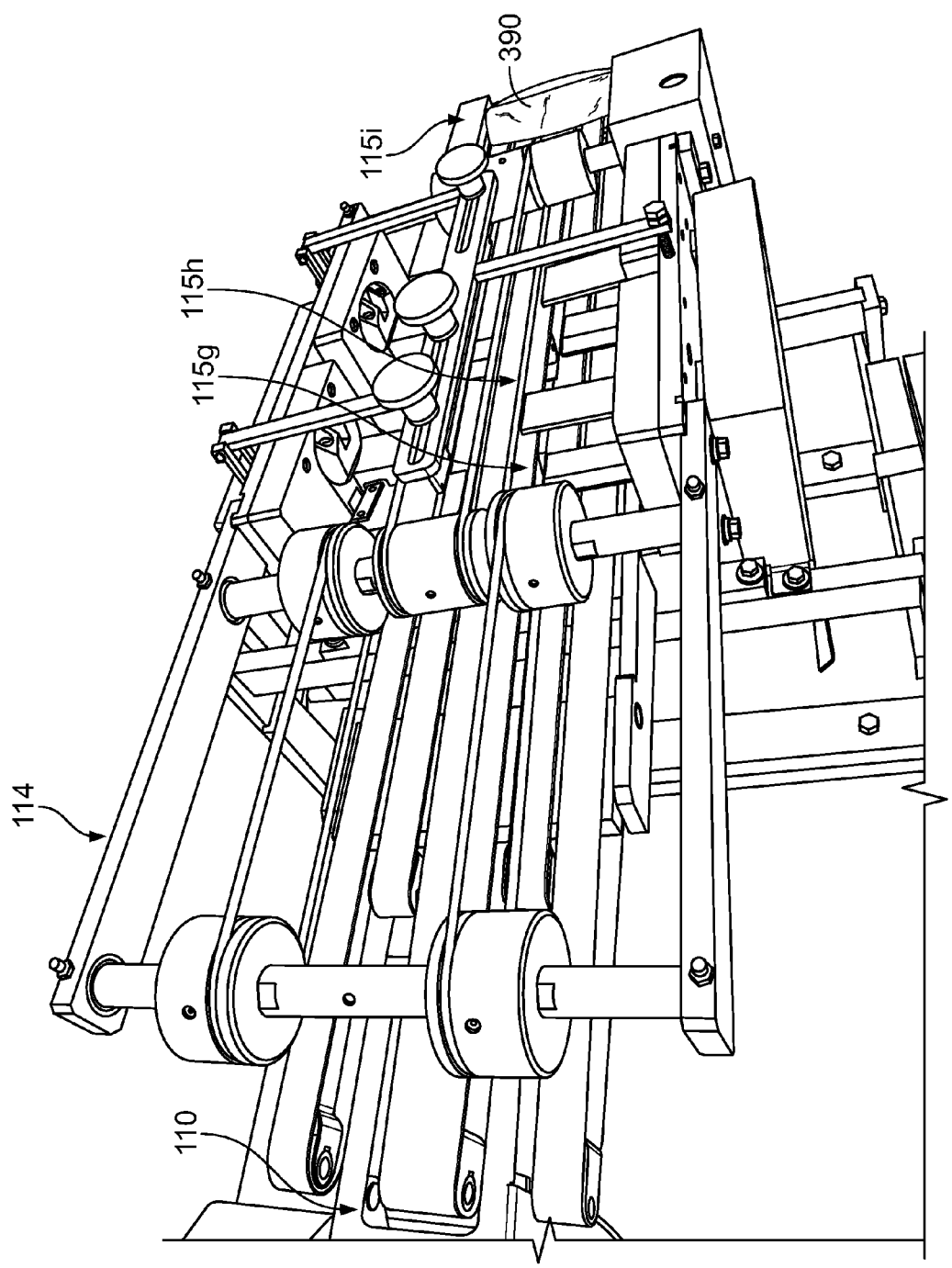
FIG. 44 is a perspective view of an exemplary conveyor belt assembly with a food product in a fully folded position of an exemplary multi-stage rotary food product folder apparatus of FIG. 37.

As discussed above, upon placement of the tortilla 392 filled with the food filling 394 onto the conveyor belts 352 of the conveyor belt assembly 114, the tortilla 392 can be transported to the seventh station 115g, where the first pair of folding jaws 386 can rotate the tortilla 392 to form the fourth fold. The conveyor belts 352 can then transport the tortilla 392 to the eighth station 115h, where the second pair of folding jaws 388 can rotate the tortilla 392 to form the fifth fold. In some embodiments, additional folding jaws can be utilized for forming a larger folded food product 390 which are provided with additional folds. With reference to FIGS. 37 and 44, the fully formed folded food product 390 can be dispensed by the conveyor belts 352 at the ninth station 115i. In some embodiments, additional machinery can be implemented in combination with the apparatus 100 to remove the fully formed folded food product 390 from the conveyor belt assembly 114 and package the folded food product 390 for shipping (not shown).

Although discussed herein as being actuated or engaged by the first, second, third and/or fourth cams 138, 140, 142, 144, in some embodiments, the first, second, third and/or fourth actuating mechanisms 228, 230, 232, 234 can be actuated with a linear actuator coupled to electric position sensors, e.g., optical sensors, and the like (not shown). For example, one or more position sensors can detect the position of the platform assemblies 110 during indexing and can actuate the appropriate linear actuator for forming the desired fold of the food product and/or for ejecting the food product.

Although discussed herein as being utilized for forming a burrito including a tortilla 392, those of ordinary skill in the art should understand that the exemplary apparatus 100 can be utilized for forming a variety of food products, e.g., egg rolls, cabbage rolls, taquitos, tacos, enchiladas, and the like. In some embodiments, the apparatus 100 can be utilized for forming a food product via folding and/or rolling of the food product. In some embodiments, one or more of the platform assemblies 110 can be utilized for rolling the food product. In some embodiments, the apparatus 100 can include less than six stations of the platform assemblies 110, e.g., three stations, four stations, five stations, and the like. In some embodiments, the apparatus 100 can include more than six stations of the platform assemblies 110, e.g., seven stations, eight stations, nine stations, and the like.

In some embodiments, the first, second, third and/or fourth cams 138, 140, 142, 144 of the cam system 104 can be interchangeable to vary the actuation or engagement with the platform assemblies 110 based on the type of food product being formed. For example, the configuration of the first, second, third and/or fourth cams 138, 140, 142, 144 can be varied to define, e.g., a larger or shorter lobe or extended portion, a larger or smaller base curvature, and the like, to create more or less throw during actuation or engagement of the first, second, third and/or fourth actuating mechanisms 228, 230, 232, 234. Although discussed herein as being utilized for forming a food product, those of ordinary skill in the art should understand that the exemplary apparatus 100 can be utilized for folding a variety of items, e.g., clothing, and the like.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A food product folding apparatus for forming a folded food product, comprising:
    a drive system including at least one motor and a shaft,
    a cam system, wherein rotation of at least one cam of the cam system is driven by the shaft of the drive system, and
    a platform assembly secured to a platform, wherein the platform is rotatably driven by the drive system,
    wherein the cam system engages the platform assembly to fold the folded food product.

2. The food product folding apparatus according to claim 1, wherein the drive system comprises an indexing drive to regulate rotation of the platform.

3. The food product folding apparatus according to claim 1, wherein the cam system comprises a first cam, a second cam, a third cam, and a fourth cam, each defining an asymmetrical and disc-shaped configuration.

4. The food product folding apparatus according to claim 3, wherein the fourth cam of the cam system rotates with the shaft of the drive system.

5. The food product folding apparatus according to claim 3, wherein the first cam, the second cam, and the third cam are fixedly secured relative to the rotatable platform assembly and the rotatable platform.

6. The food product folding apparatus according to claim 5, wherein the platform assembly comprises a first actuating mechanism, a second actuating mechanism, a third actuating mechanism, and a fourth actuating mechanism.

7. The food product folding apparatus according to claim 6, wherein:
    the first actuating mechanism engages the first cam to position a first flap of the platform assembly into a first fold position to form a first fold of the folded food product,
    the second actuating mechanism engages the second cam to position a second flap of the platform assembly into a second fold position to form a second fold of the folded food product,
    the third actuating mechanism engages the third cam to position a third flap of the platform assembly into a third fold position to form a third fold of the folded food product, and
    the fourth actuating mechanism engages the fourth cam to position a lift arm of the platform assembly into an extended position to eject the folded food product onto a conveyor belt assembly.

8. The food product folding apparatus according to claim 7, wherein the conveyor belt assembly comprises a first pair of folding jaws and a second pair of folding jaws.

9. The food product folding apparatus according to claim 8, wherein the first pair of folding jaws rotates the folded food product to form a fourth fold of the folded food product.

10. The food product folding apparatus according to claim 8, wherein the second pair of folding jaws rotates the folded food product to form a fifth fold of the folded food product.

11. The food product folding apparatus according to claim 1, comprising a hard press including a hard press roller and a spring.

12. The food product folding apparatus according to claim 11, wherein the spring provides a bias force of the hard press roller against at least one of (i) a first flap of the platform assembly to form a first fold of the folded food product, (ii) a second flap of the platform assembly to form a second fold of the folded food product, and (iii) a third flap of the platform assembly to form a third fold of the folded food product.

13. The food product folding apparatus according to claim 1, comprising an attachment mechanism secured to the platform configured and dimensioned to receive the platform assembly to secure the platform assembly to the platform.

14. The food product folding apparatus according to claim 1, wherein the cam system comprises an actuator including a slide rod translatable through a slide track.

15. The food product folding apparatus according to claim 14, wherein the slide rod includes a roller secured thereon for actuation by a fourth cam of the cam system.

16. The food product folding apparatus according to claim 15, wherein actuation of the roller by the fourth cam of the cam system translates the slide rod through the slide track to actuate a fourth actuating mechanism of the platform assembly with an actuating tip of the slide rod.

17. A platform assembly for forming a folded food product, comprising:
    a top surface,
    a first flap hingedly connected to the top surface and a first actuating mechanism for positioning the first flap into a first fold position,
    a second flap hingedly connected to the top surface and a second actuating mechanism for positioning the second flap into a second fold position,
    a third flap hingedly connected to the top surface and a third actuating mechanism for positioning the third flap into a third fold position, and
    a lift arm hingedly connected to the top surface and a fourth actuating mechanism for positioning the lift arm into an extended position, wherein the first, second, third and fourth actuating mechanisms are configured to be engaged by a cam system.

18. The platform assembly according to claim 17, wherein the first actuating mechanism, the second actuating mechanism, the third actuating mechanism, and the fourth actuating mechanism comprises a roller, a plurality of linkages, and a rack and pinion mechanism.

19. The platform assembly according to claim 17, wherein the fourth actuating mechanism comprises a slide rod and a slide track configured and dimensioned to mechanically interact with an actuator of the cam system to position the lift arm into the extended position.

20. The platform assembly according to claim 19, wherein the lift arm comprises a solid section and a pair of forks protruding from the solid section.

21. A cam system for actuating a platform assembly for forming a folded food product, the platform assembly including a first actuating mechanism, a second actuating mechanism, a third actuating mechanism, and a fourth actuating mechanism, the cam system comprising:
a first cam, a second cam, a third cam, and a fourth cam, and
an actuator secured to at least one of the first cam, the second cam, and the third cam,
wherein the first cam, the second cam, and the third cam are fixedly secured relative to each other,
wherein the fourth cam rotates relative to the first cam, the second cam, and the third cam,
wherein the first cam is configured to engage the first actuating mechanism of the platform assembly,
wherein the second cam is configured to engage the second actuating mechanism of the platform assembly,
wherein the third cam is configured to engage the third actuating mechanism of the platform assembly, and
wherein the fourth cam is configured to engage the fourth actuating mechanism of the platform assembly.

22. The cam system according to claim 21, wherein the first cam, the second cam, the third cam, and the fourth cam are disposed in a stacked configuration.

23. The cam system according to claim 21, wherein the first cam, the second cam, the third cam, and the fourth cam define a disc-shaped configuration.

24. The cam system according to claim 21, wherein the first cam, the second cam, the third cam, and the fourth cam defines an asymmetrical configuration.

25. The cam system according to claim 21, wherein the actuator comprises a slide rod translatable through a slide track.

26. The cam system according to claim 25, wherein the slide rod includes a roller secured thereon for engagement by the fourth cam of the cam system.

27. The cam system according to claim 26, wherein engagement of the roller by the fourth cam of the cam system translates the slide rod through the slide track to actuate the fourth actuating mechanism of the platform assembly with an actuating tip of the slide rod.

28. A hard press for providing a force to a platform assembly for forming a folded food product, the platform assembly including a first flap, a second flap, and a third flap, the hard press comprising:
a fixed linkage hingedly connected to a movable linkage,
a spring disposed between the fixed linkage and the movable linkage, and
a roller disposed on a distal end of the movable linkage,
wherein the spring creates a bias force to the movable linkage upon rotation of the movable linkage relative to the fixed linkage, and
wherein the bias force provides the force to at least one of the first flap, the second flap, and the third flap of the platform assembly with the roller to assist in folding or closing the folded food product.

29. A food product folding apparatus for forming a folded food product, comprising:
a rotary platform including six platform assemblies secured thereto, and
a drive system including at least one motor and a shaft,
wherein a first platform assembly of the six platform assemblies represents a first station,
wherein a second platform assembly of the six platform assemblies represents a second station,
wherein a third platform assembly of the six platform assemblies represents a third station,
wherein a fourth platform assembly of the six platform assemblies represents a fourth station,
wherein a fifth platform assembly of the six platform assemblies represents a fifth station,
wherein a sixth platform assembly of the six platform assemblies represents a sixth station, and
wherein the drive system indexes rotation of the platform about the shaft between the first station, the second station, the third station, the fourth station, the fifth station, and the sixth station.

* * * * *